US011733783B2

(12) United States Patent
Richter et al.

(10) Patent No.: US 11,733,783 B2
(45) Date of Patent: Aug. 22, 2023

(54) METHOD AND DEVICE FOR PRESENTING A SYNTHESIZED REALITY USER INTERFACE

(71) Applicant: Apple Inc., Cupertino, CA (US)

(72) Inventors: Ian M. Richter, Los Angeles, CA (US); Christopher Eubank, Sunnyvale, CA (US); Tomlinson Holman, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/690,568

(22) Filed: Mar. 9, 2022

(65) Prior Publication Data

US 2022/0197399 A1 Jun. 23, 2022

Related U.S. Application Data

(63) Continuation of application No. 17/059,814, filed as application No. PCT/US2019/034327 on May 29, 2019, now Pat. No. 11,301,050.

(Continued)

(51) Int. Cl.
*G06F 3/048* (2013.01)
*G06F 3/01* (2006.01)
*G06F 3/04815* (2022.01)
*G06T 19/00* (2011.01)
*G06F 3/0482* (2013.01)

(52) U.S. Cl.
CPC ............. *G06F 3/017* (2013.01); *G06F 3/013* (2013.01); *G06F 3/04815* (2013.01); *G06T 19/006* (2013.01); *G06F 3/0482* (2013.01)

(58) Field of Classification Search
CPC ...... G06F 3/013; G06F 3/017; G06F 3/04815; G06F 3/0482
See application file for complete search history.

(56) References Cited

U.S. PATENT DOCUMENTS

| 8,977,963 B1 | 3/2015 | Joyce et al. | |
|---|---|---|---|
| 2003/0036848 A1* | 2/2003 | Sheha | H04W 4/02 340/990 |

(Continued)

OTHER PUBLICATIONS

International Search Report and Written Opinion dated Aug. 6, 2019, International Application No. PCT/US2019/034327, pp. 1-11.

(Continued)

*Primary Examiner* — Claudia Dragoescu
(74) *Attorney, Agent, or Firm* — Fernando & Partners, LLP

(57) ABSTRACT

In various implementations, a method comprises: identifying a plurality of data items, each of the plurality of data items having at least a first metadata field or a second metadata field; displaying a volumetric environment including a first plurality of SR objects corresponding to a first plurality of data items among the plurality of data items, wherein the first plurality of data items includes the first metadata field with first metadata field values; detecting a first user input indicative of the second metadata field; and in response to detecting the first user input, replacing the first plurality of SR objects within the volumetric environment with a second plurality of SR objects corresponding to a second plurality of data items among the plurality of data items, wherein each of the second plurality of data items includes the second metadata field with second metadata field values.

23 Claims, 59 Drawing Sheets

Related U.S. Application Data

(60) Provisional application No. 62/679,842, filed on Jun. 3, 2018.

(56) References Cited

U.S. PATENT DOCUMENTS

| | | | | |
|---|---|---|---|---|
| 2006/0036568 | A1* | 2/2006 | Moore | G06F 16/168 |
| 2007/0005576 | A1* | 1/2007 | Cutrell | G06F 16/90324 |
| | | | | 707/E17.14 |
| 2007/0162872 | A1* | 7/2007 | Hong | G06F 3/0482 |
| | | | | 715/828 |
| 2009/0327921 | A1* | 12/2009 | Holm-Peterson | G06F 16/219 |
| | | | | 715/753 |
| 2011/0055203 | A1 | 3/2011 | Gutt et al. | |
| 2011/0167365 | A1* | 7/2011 | Wingrove | G06F 3/0482 |
| | | | | 715/765 |
| 2012/0038669 | A1* | 2/2012 | Lee | G06T 19/006 |
| | | | | 345/633 |
| 2012/0060111 | A1* | 3/2012 | Kim | G06F 3/0483 |
| | | | | 715/777 |
| 2017/0038943 | A1 | 2/2017 | Seligmann et al. | |
| 2019/0235729 | A1* | 8/2019 | Day | G06F 3/011 |

OTHER PUBLICATIONS

Communication Pursuant to Article 94(3) EPC dated Jul. 27, 2022, European Application No. 19731080.8, pp. 1-5.

* cited by examiner

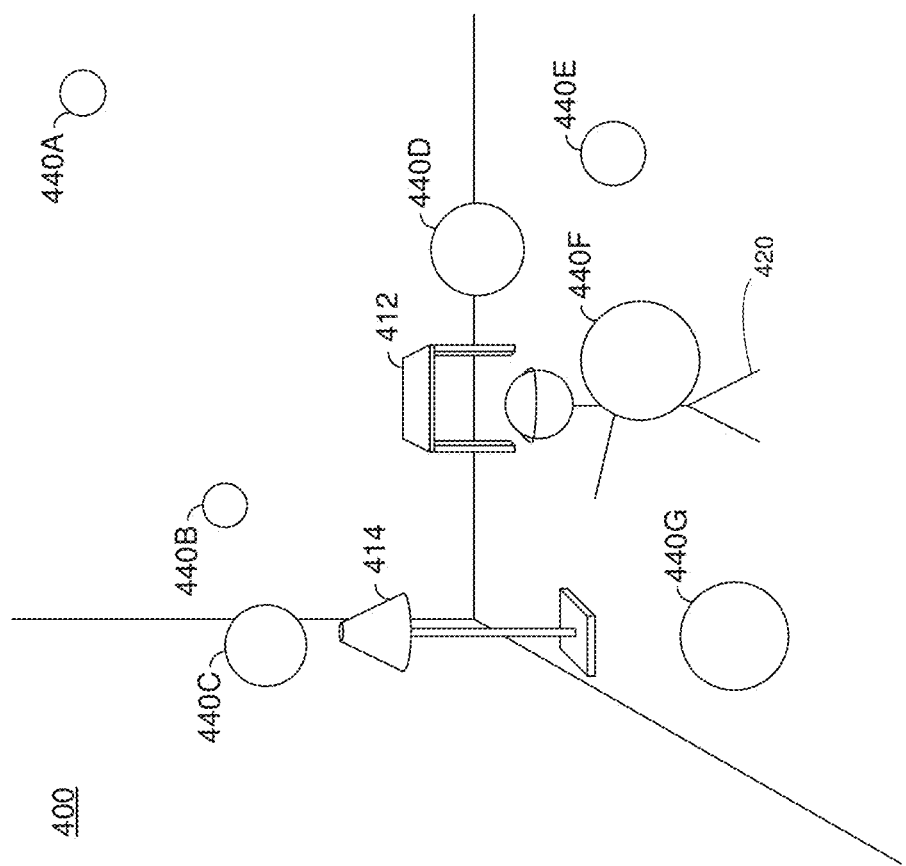

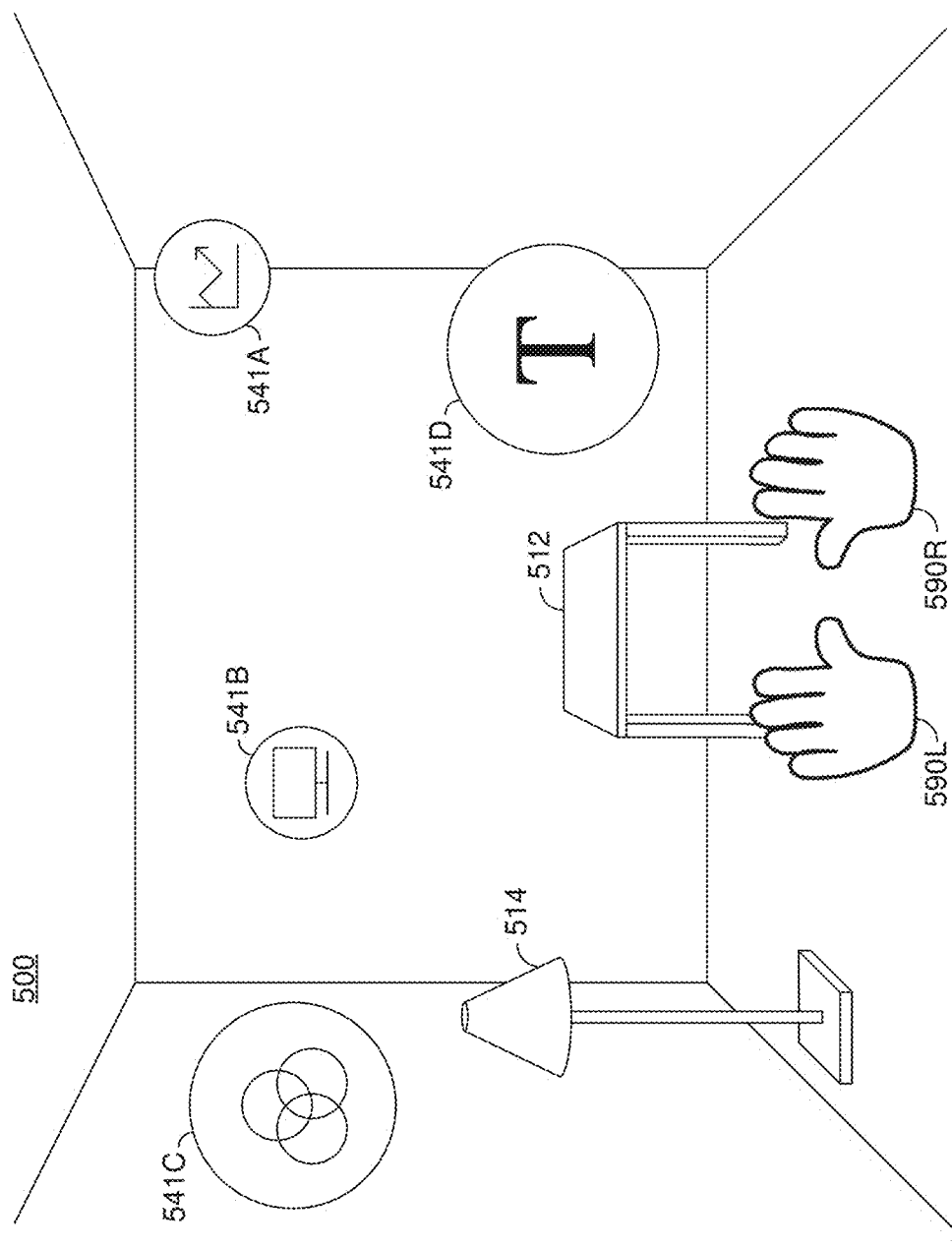

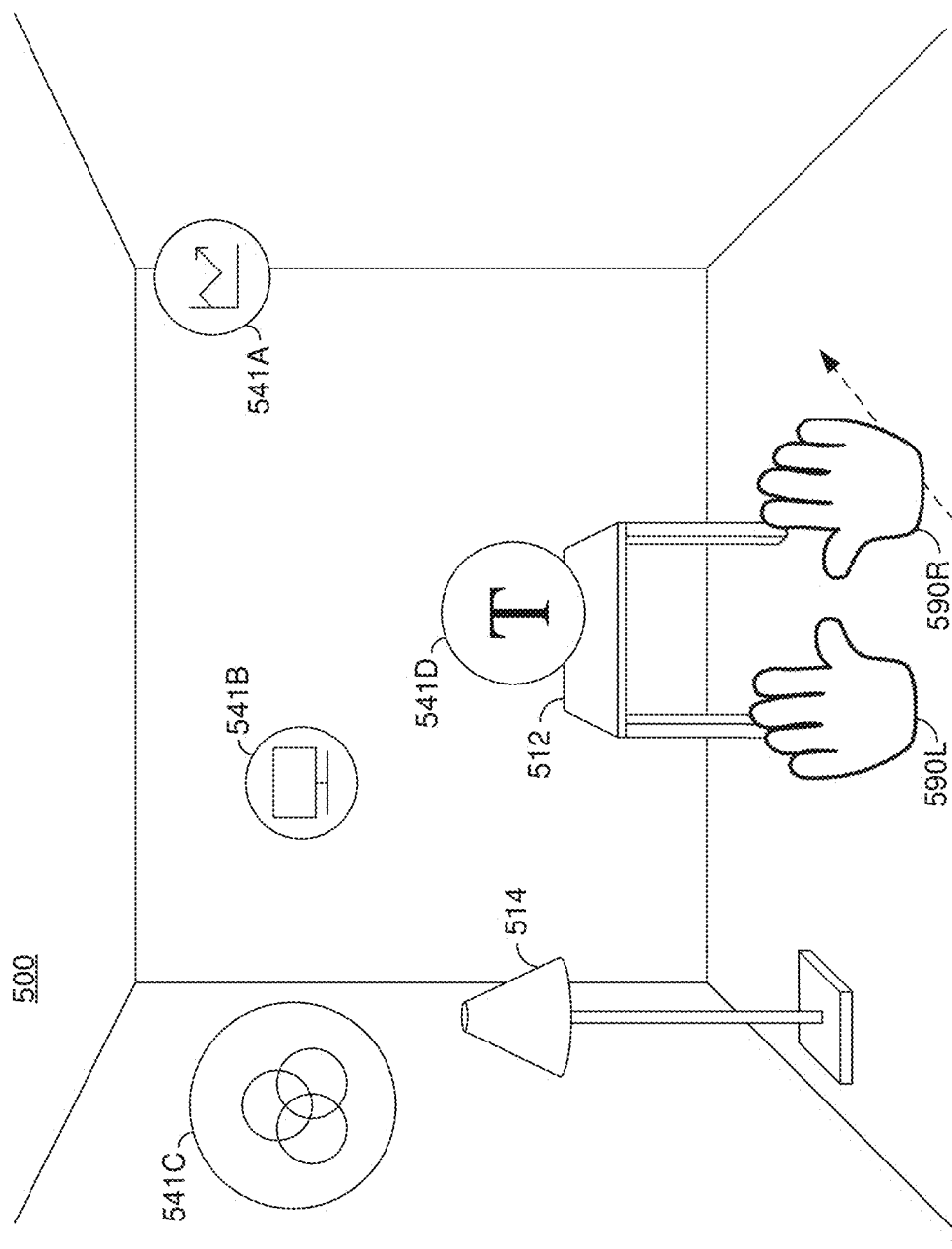

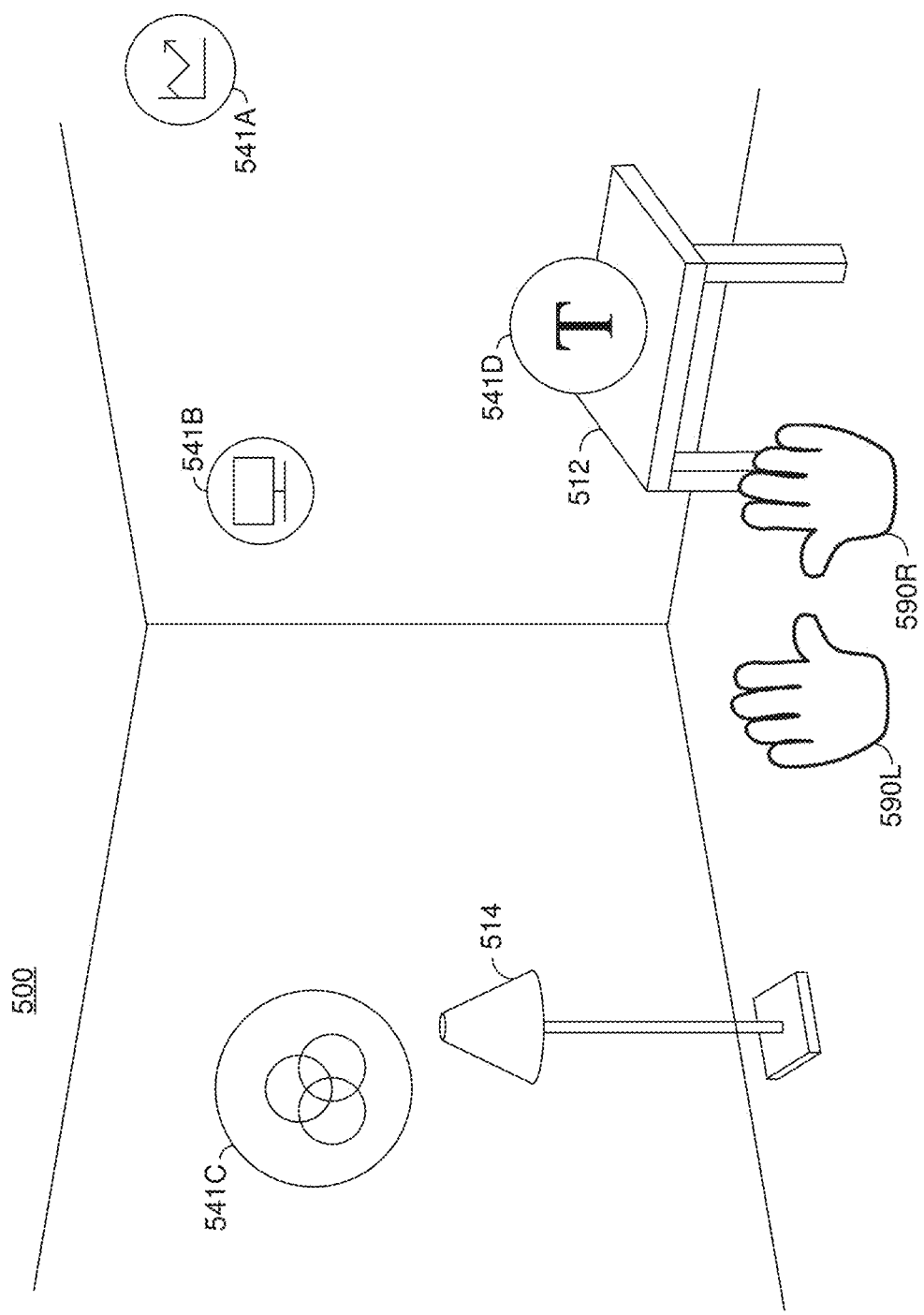

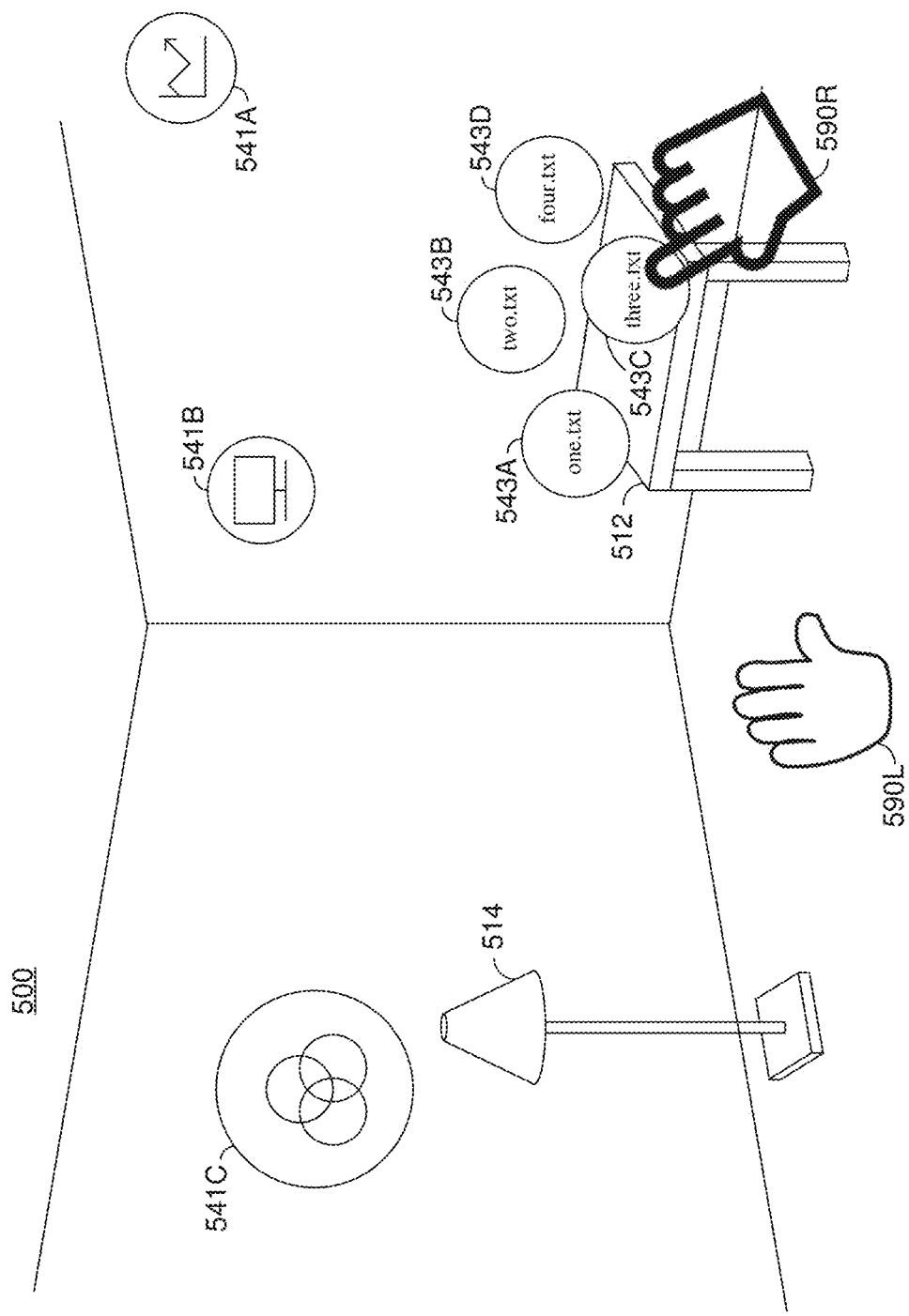

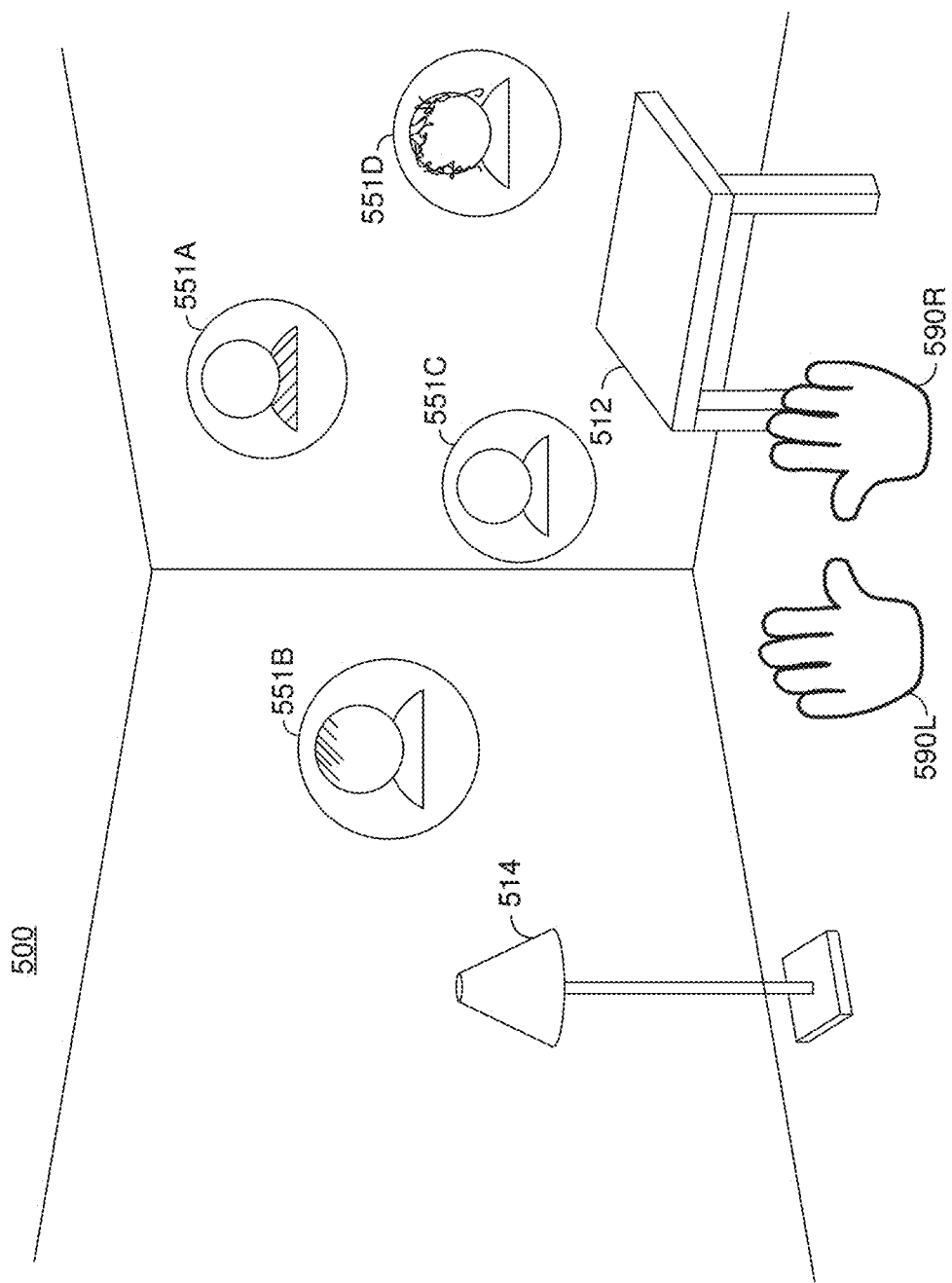

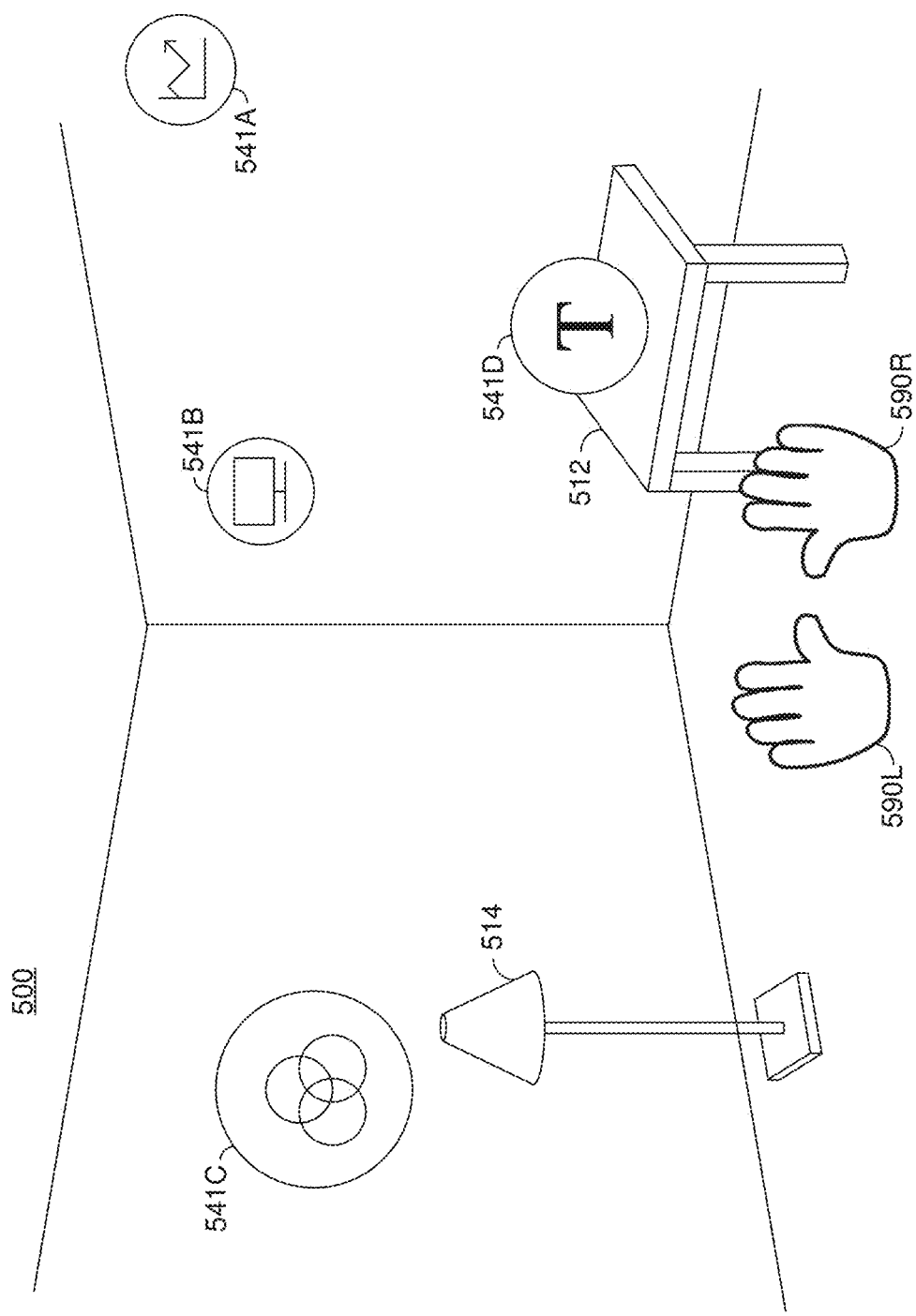
Figure 5L1

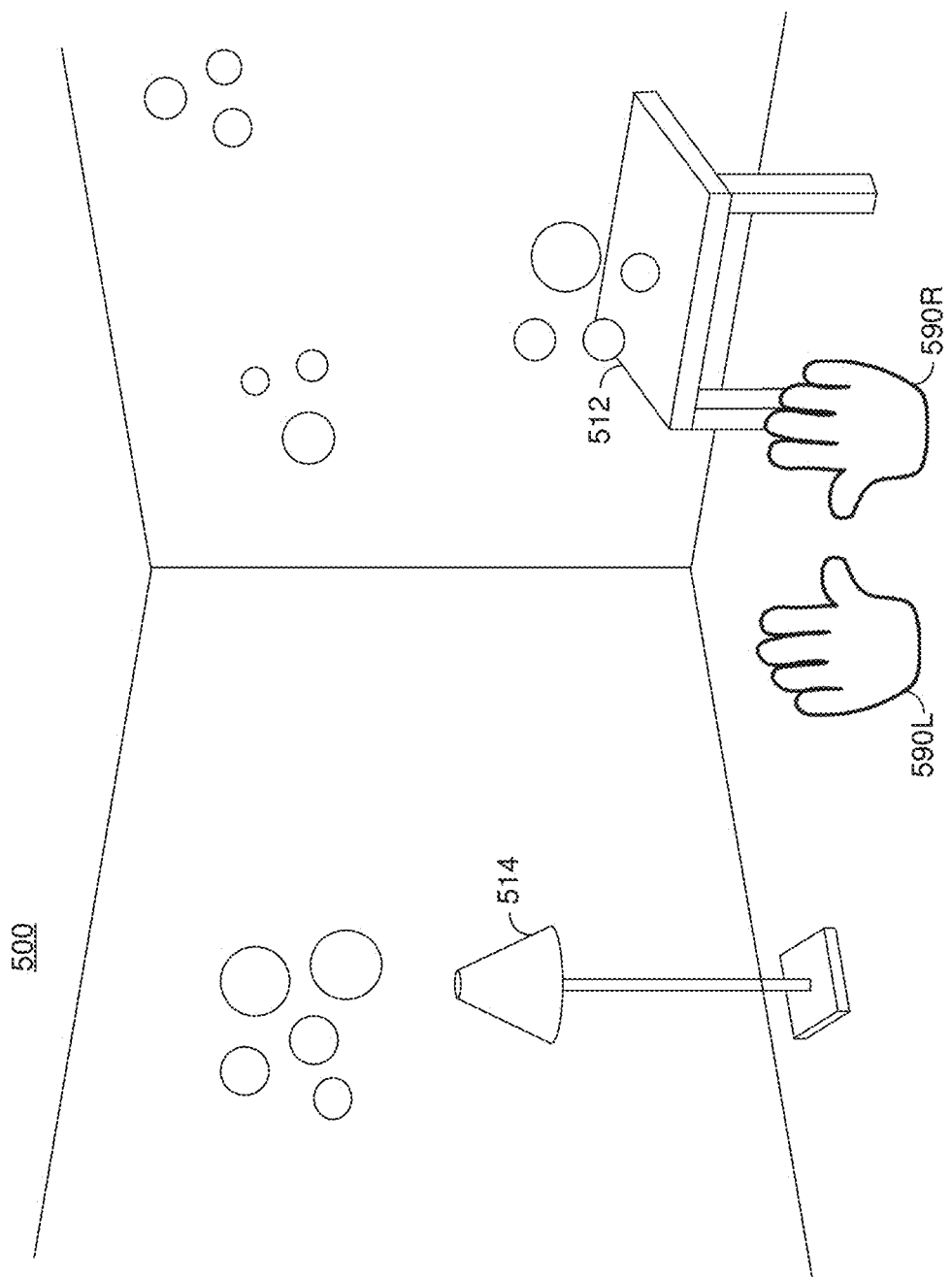
Figure 5L2

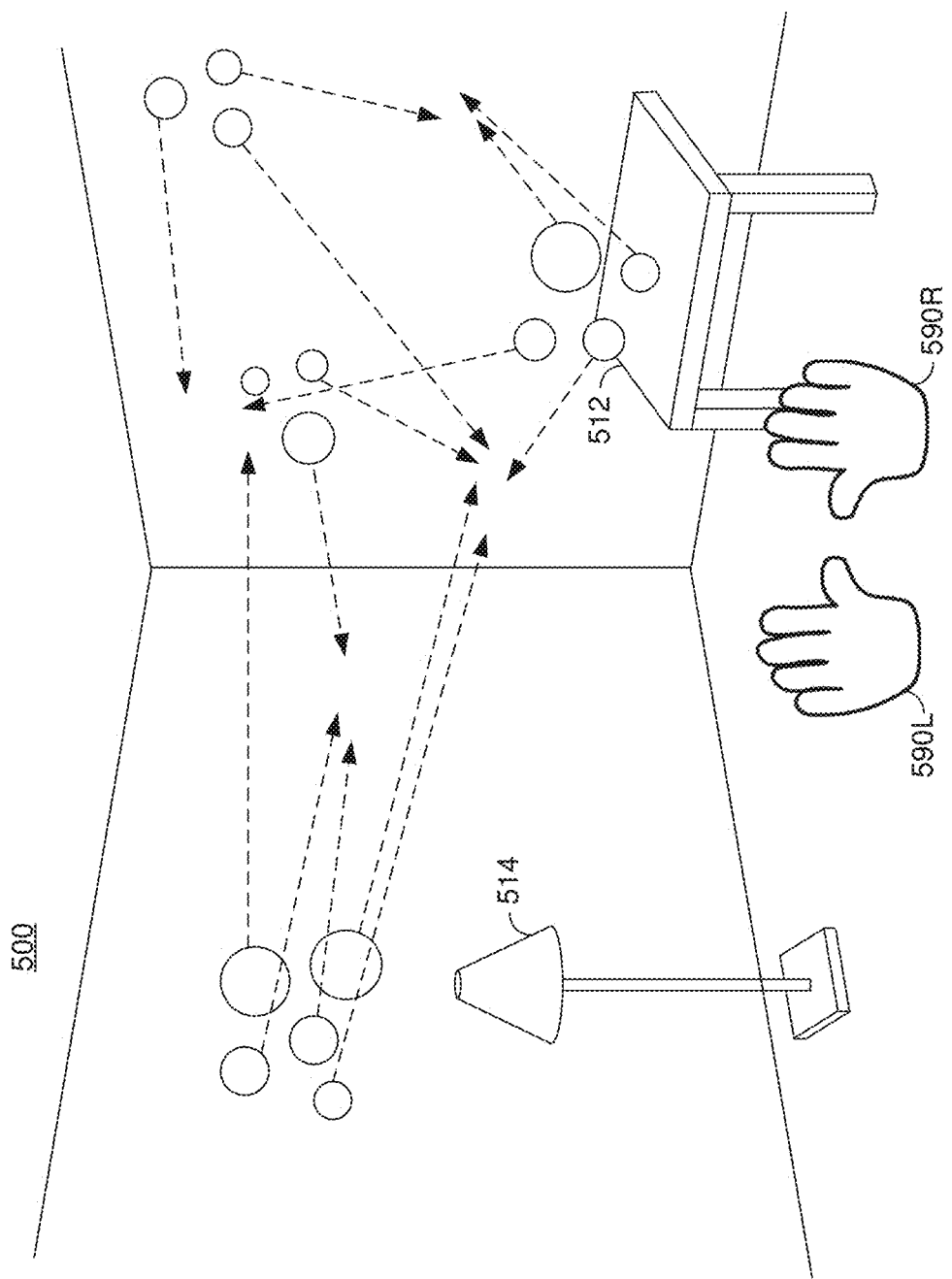
Figure 5L3

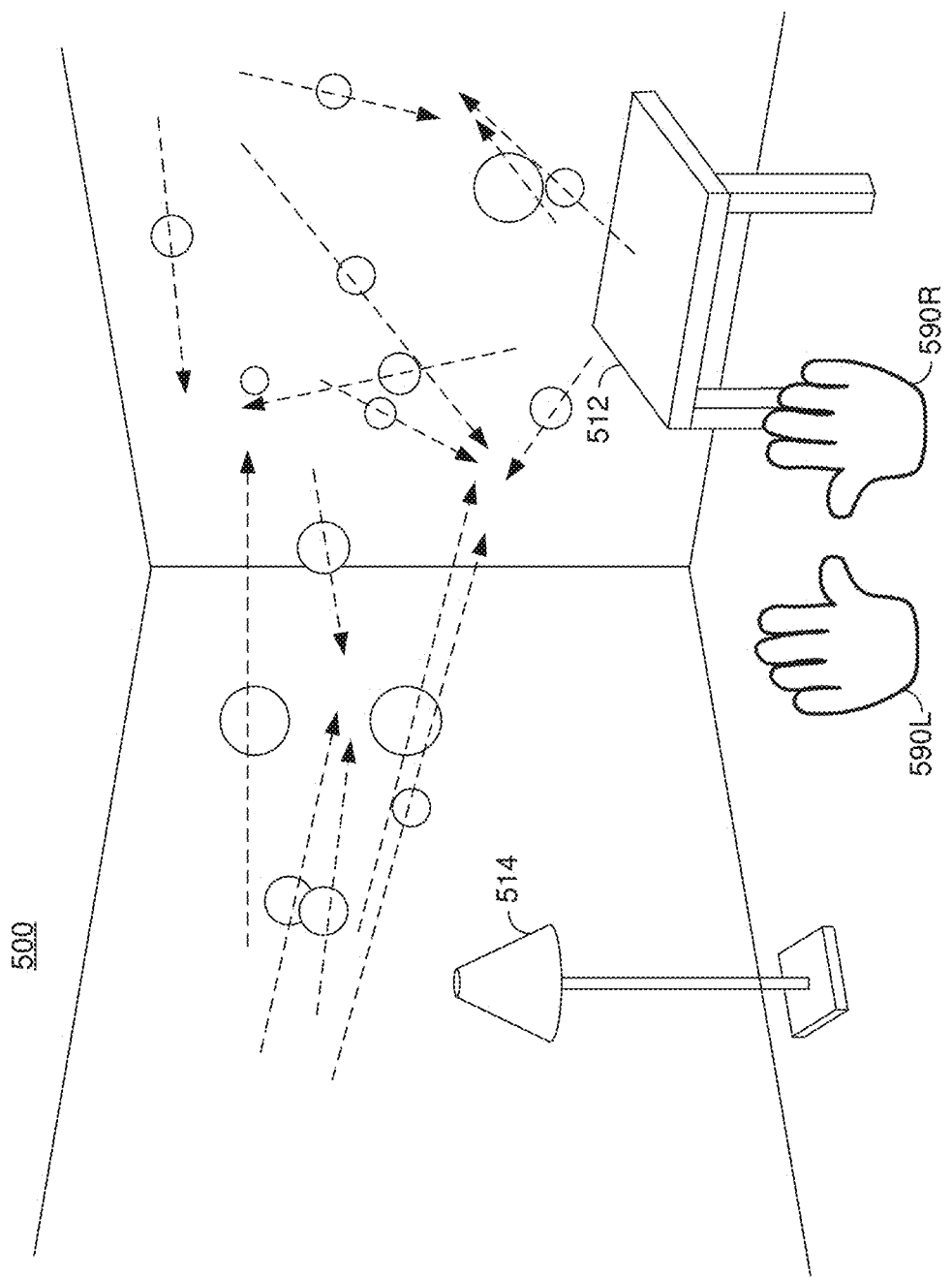
Figure 5L4

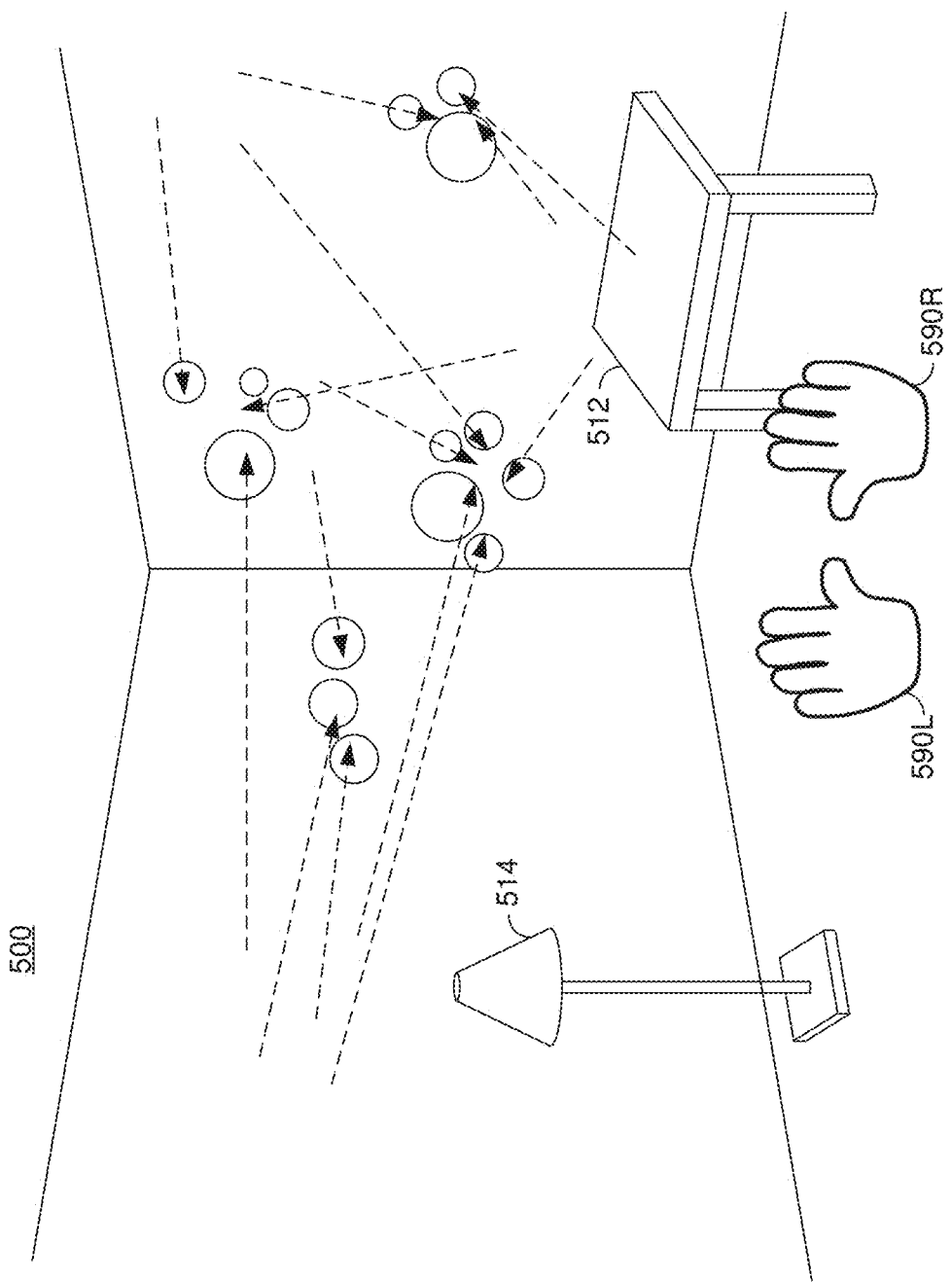
Figure 5L5

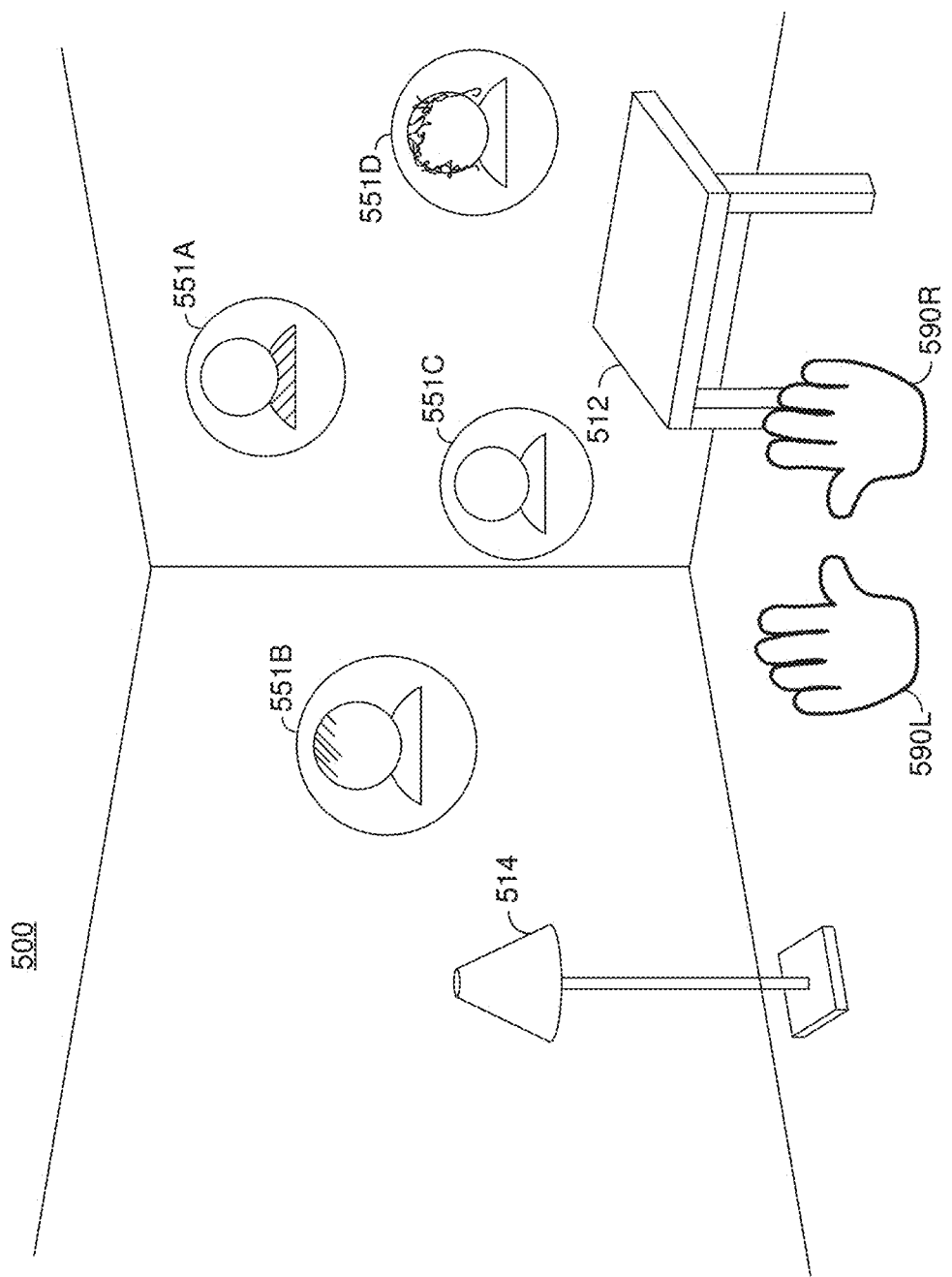

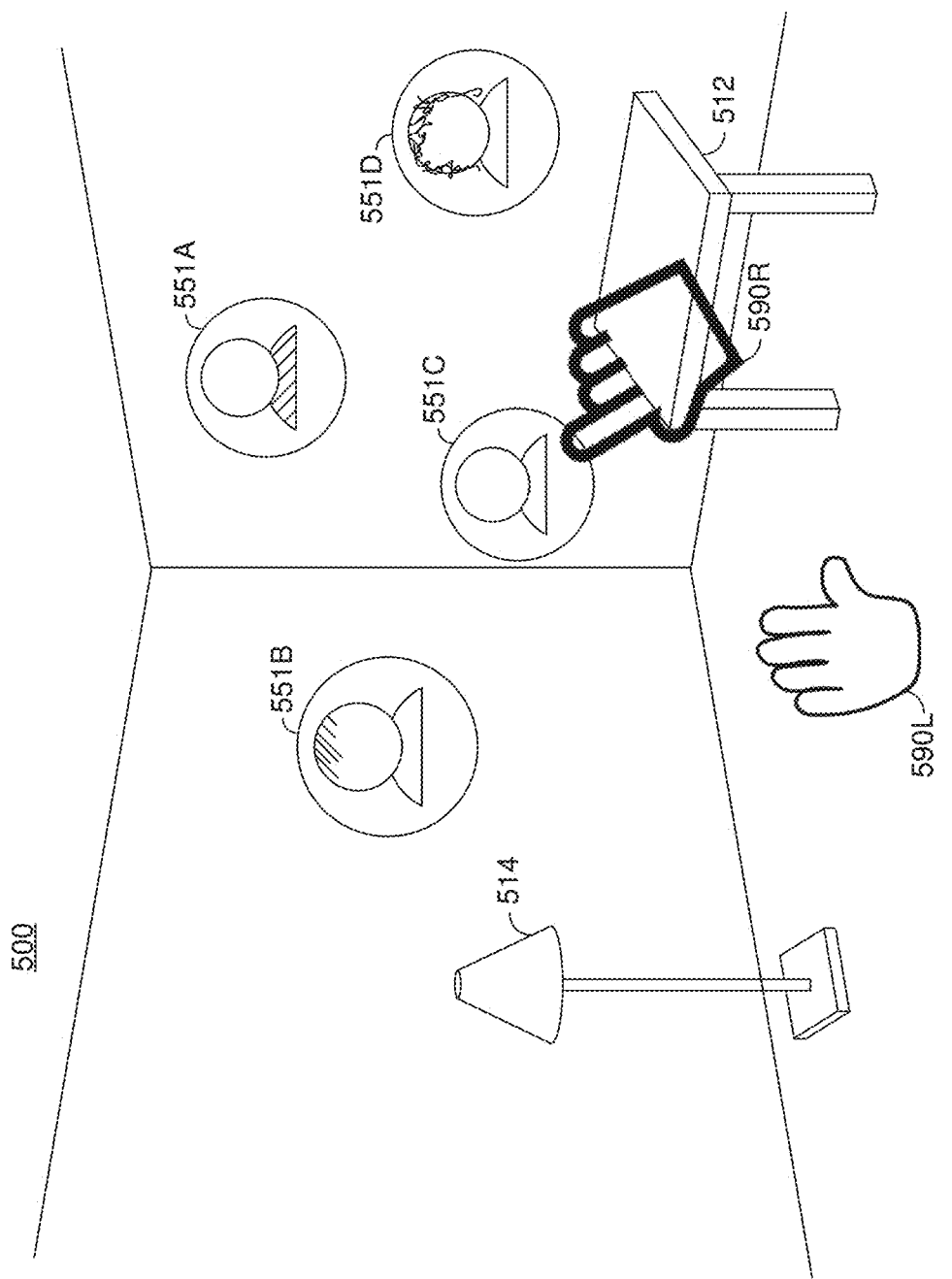

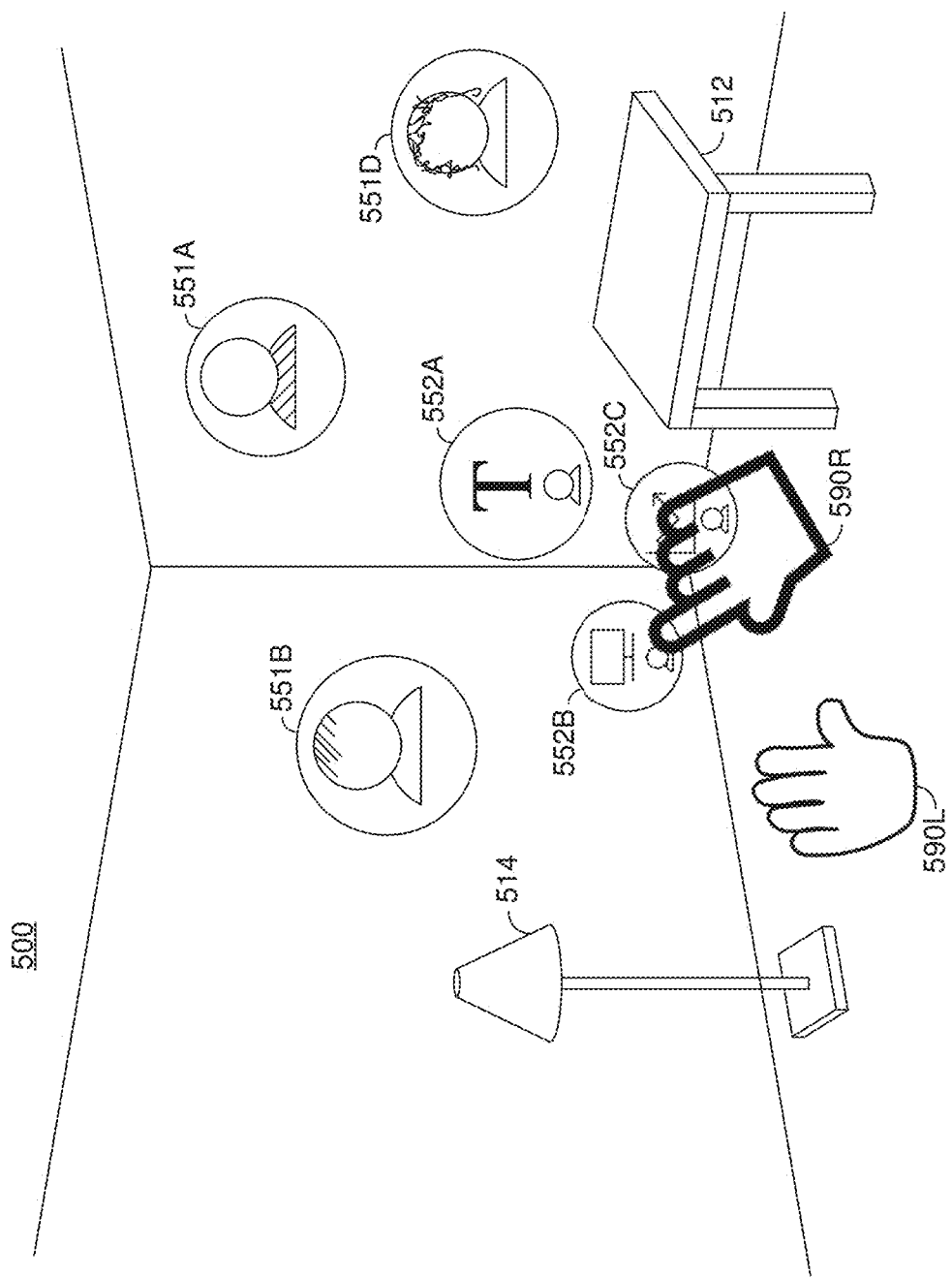

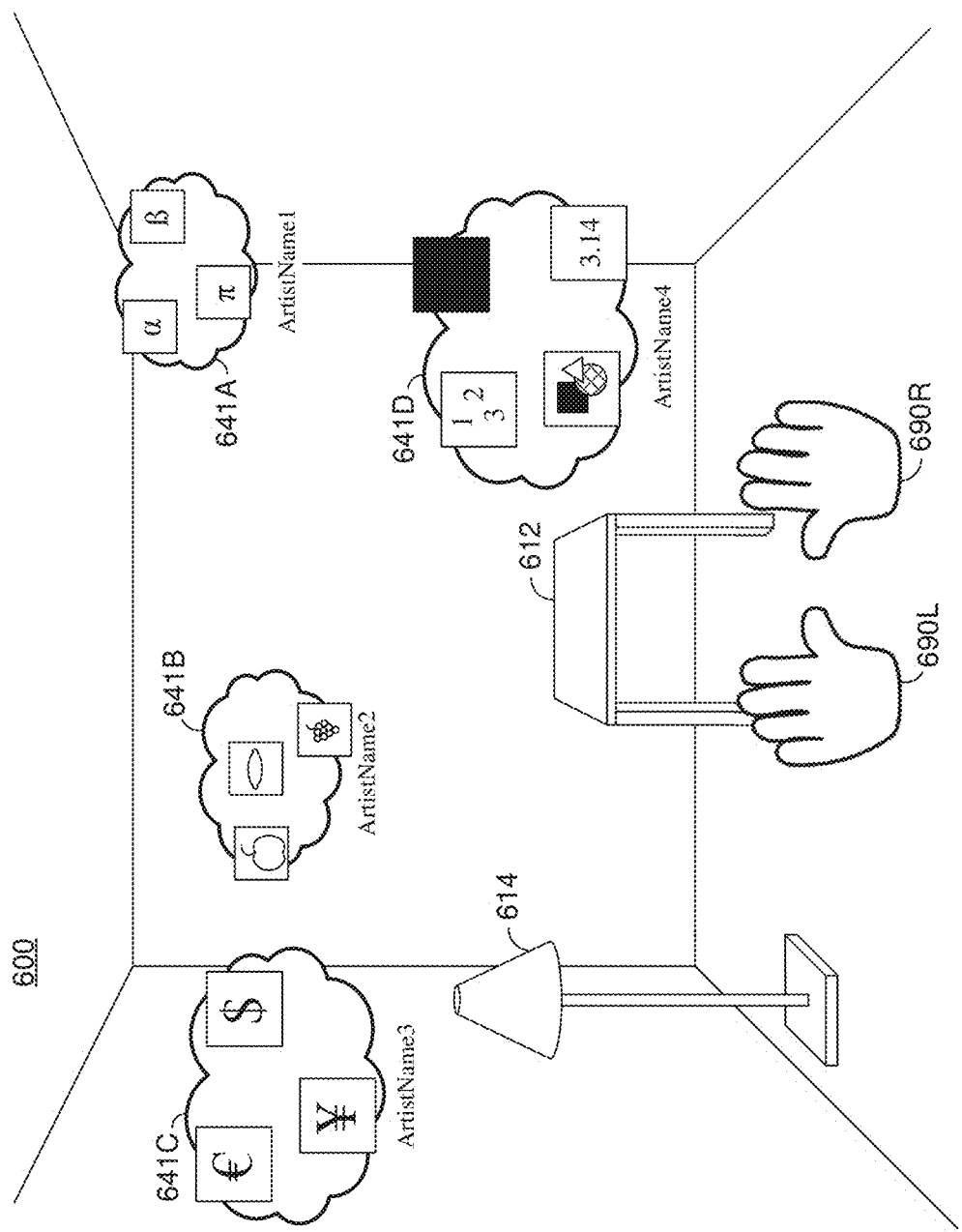
Figure 6F1

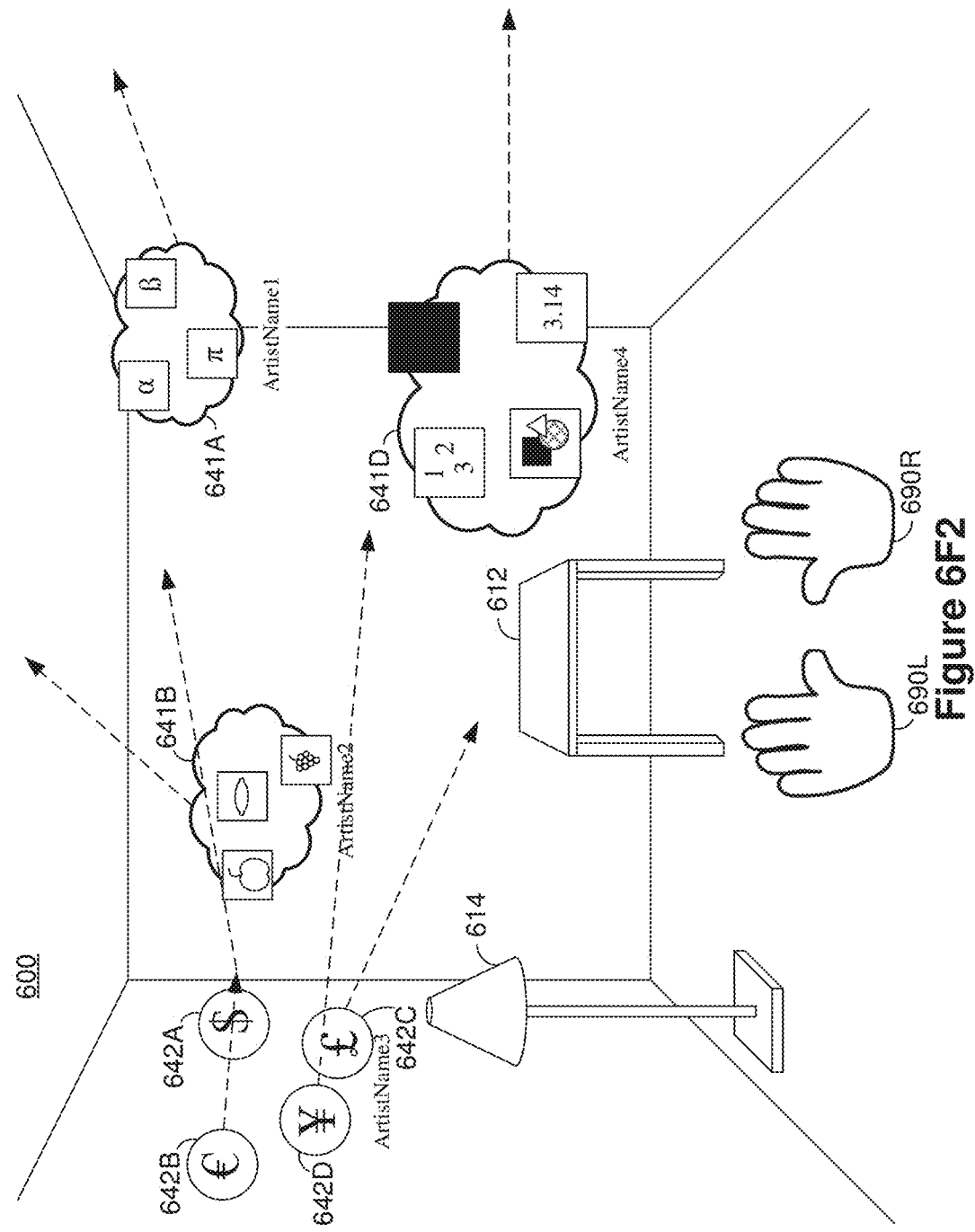
Figure 6F2

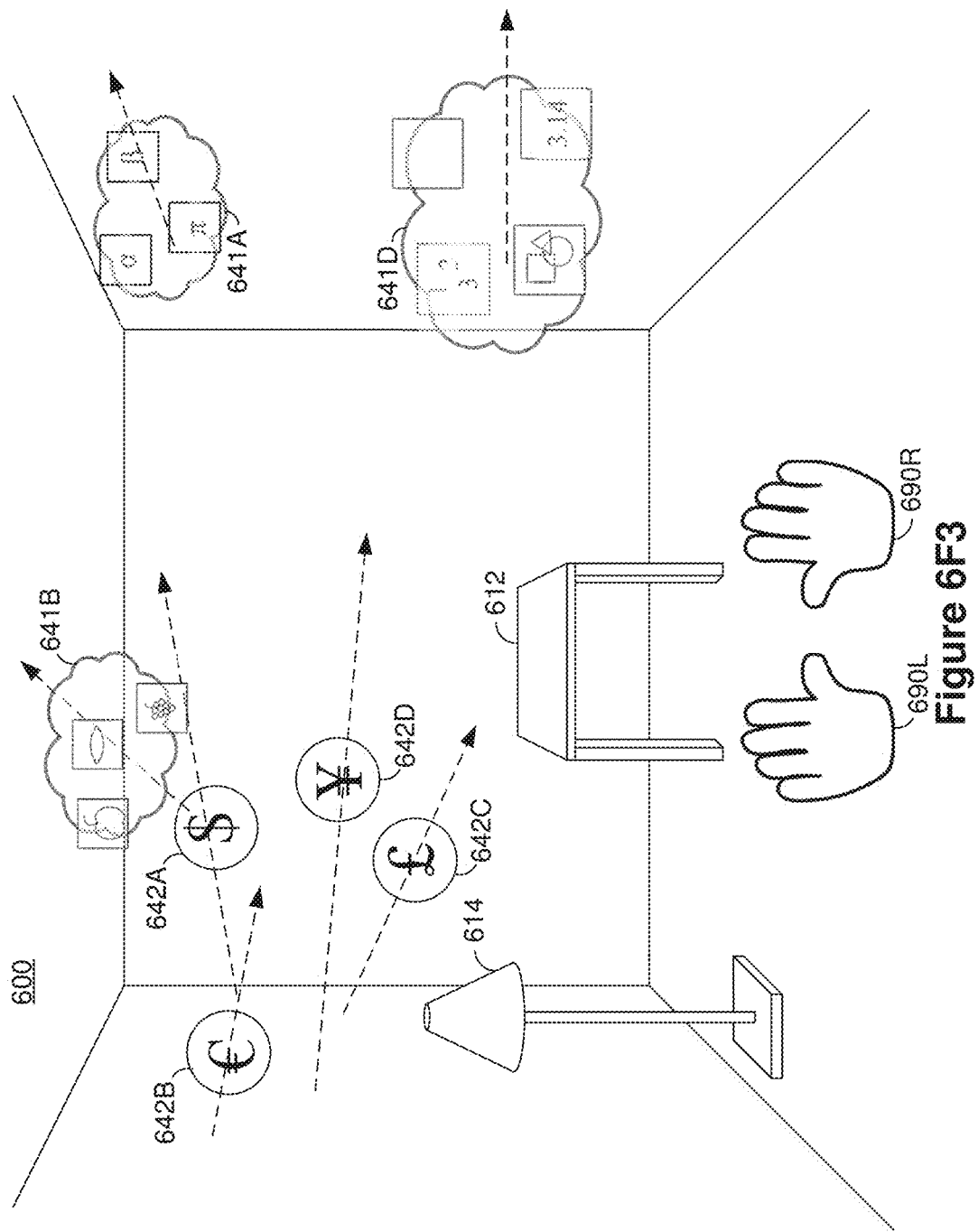

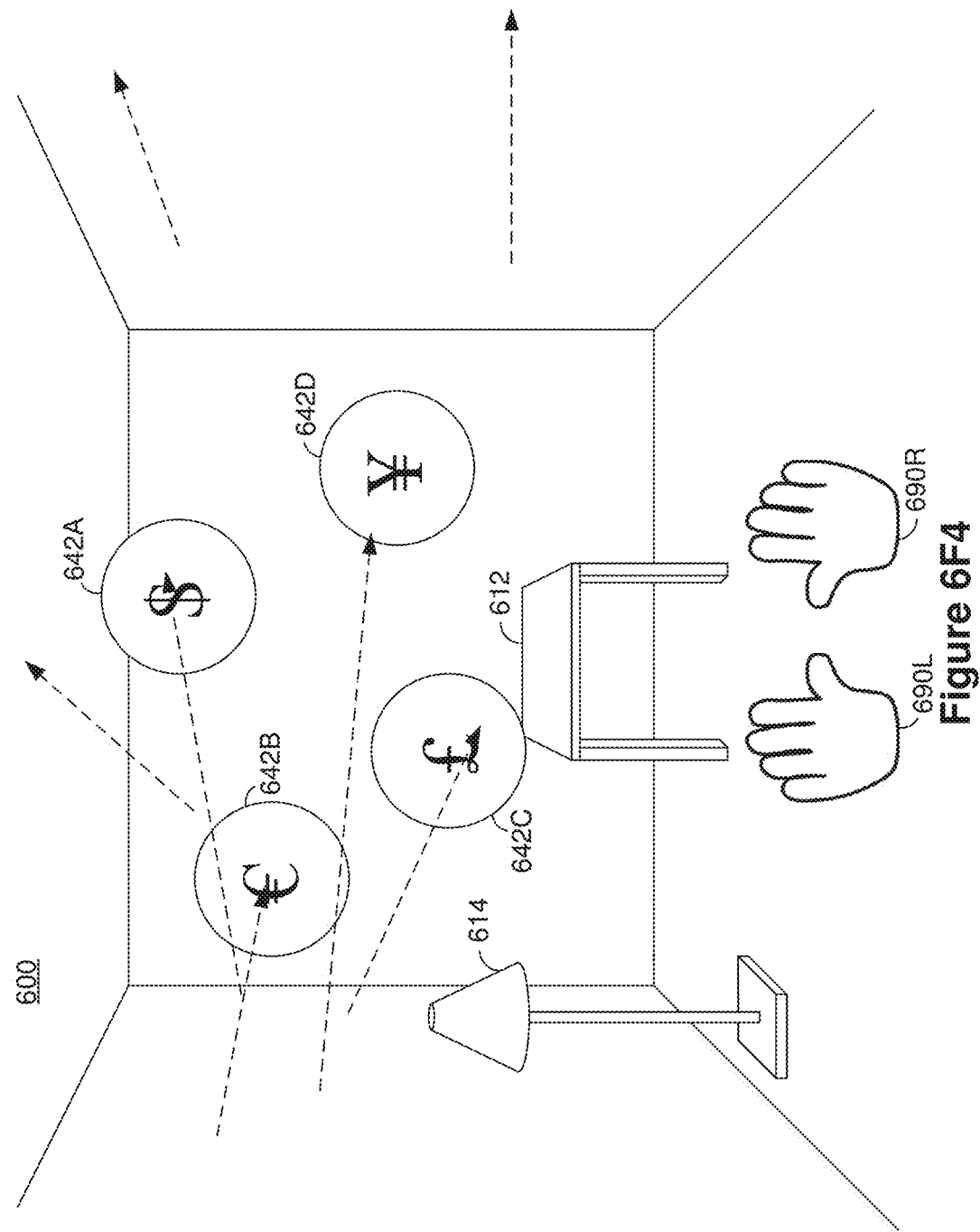

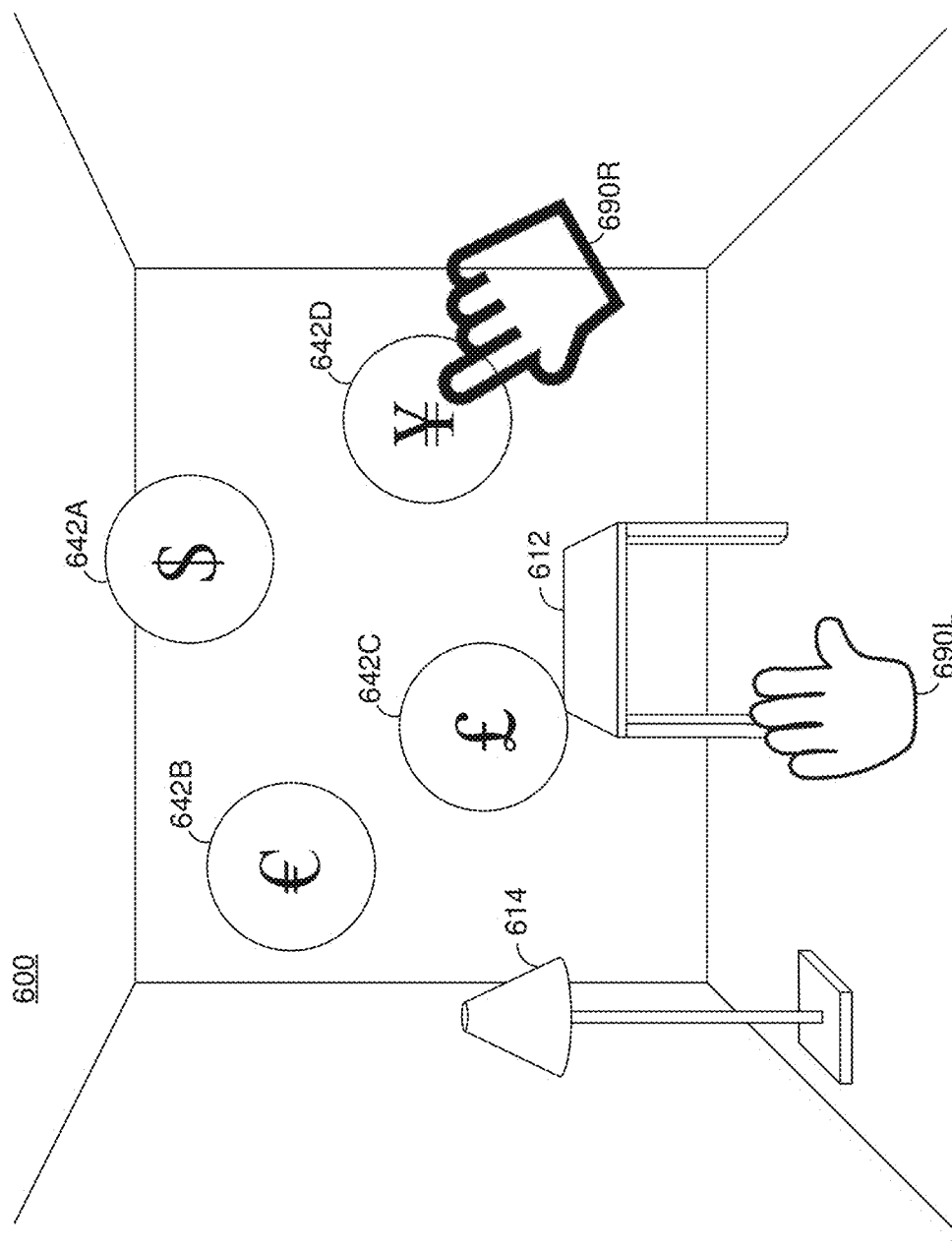

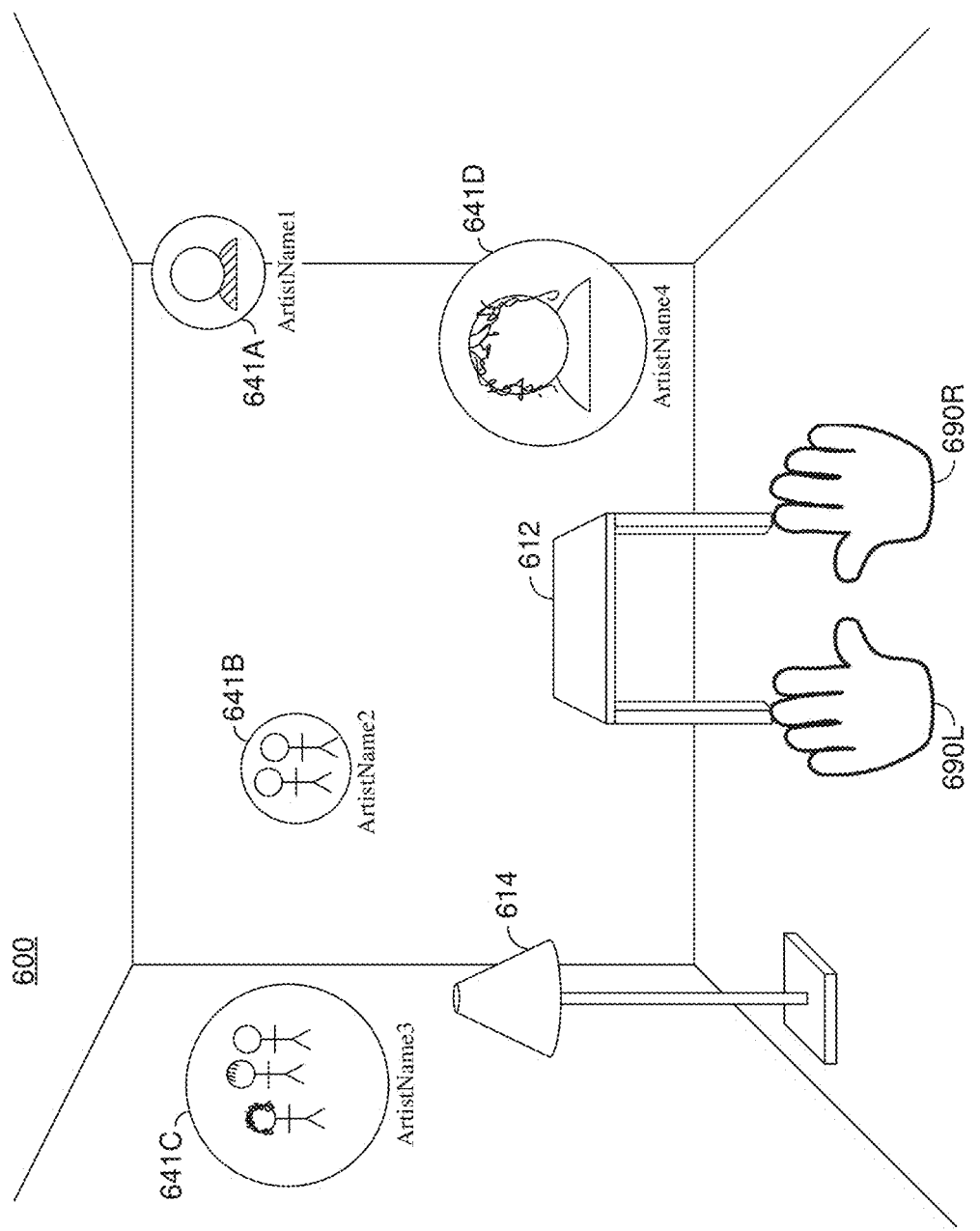

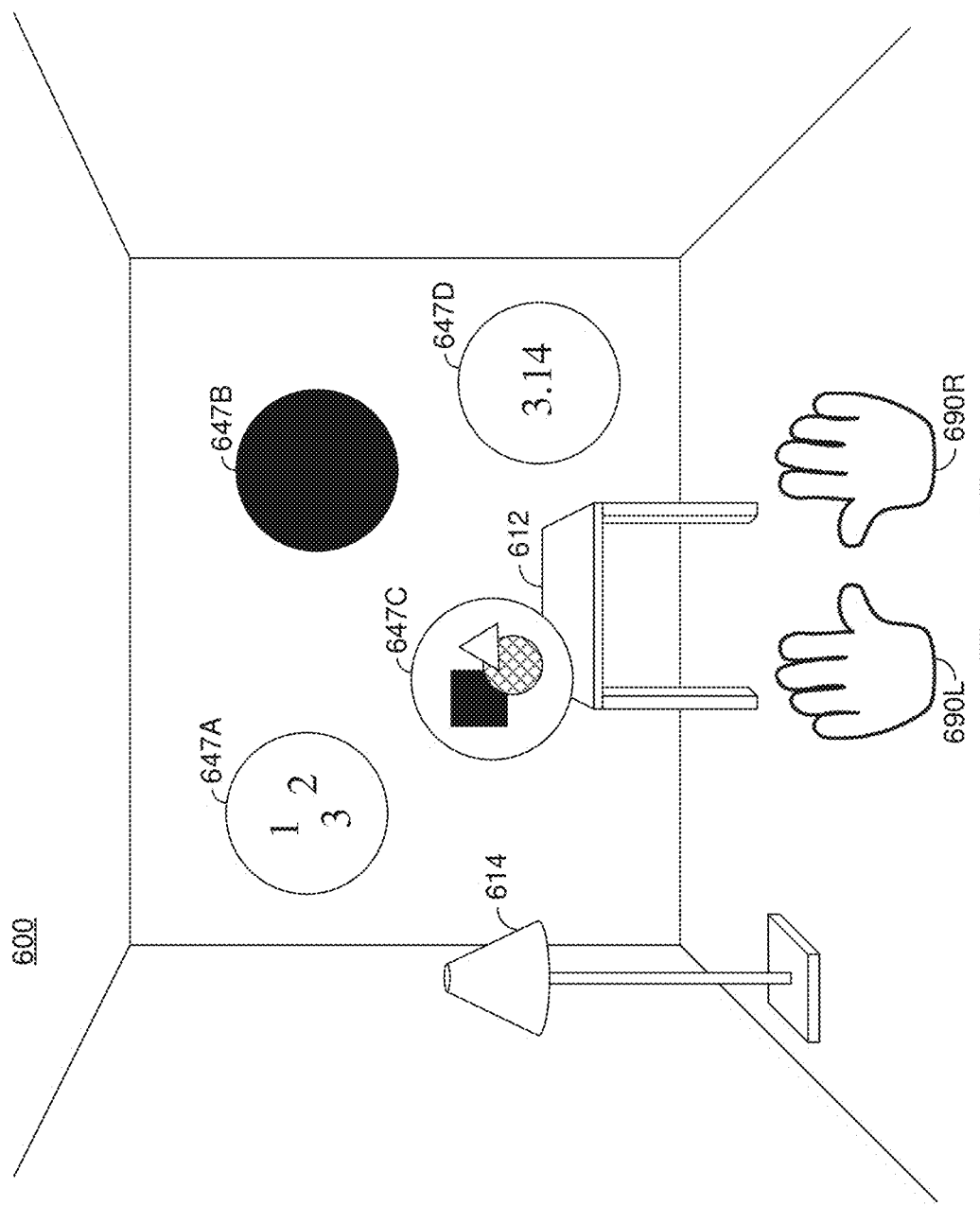

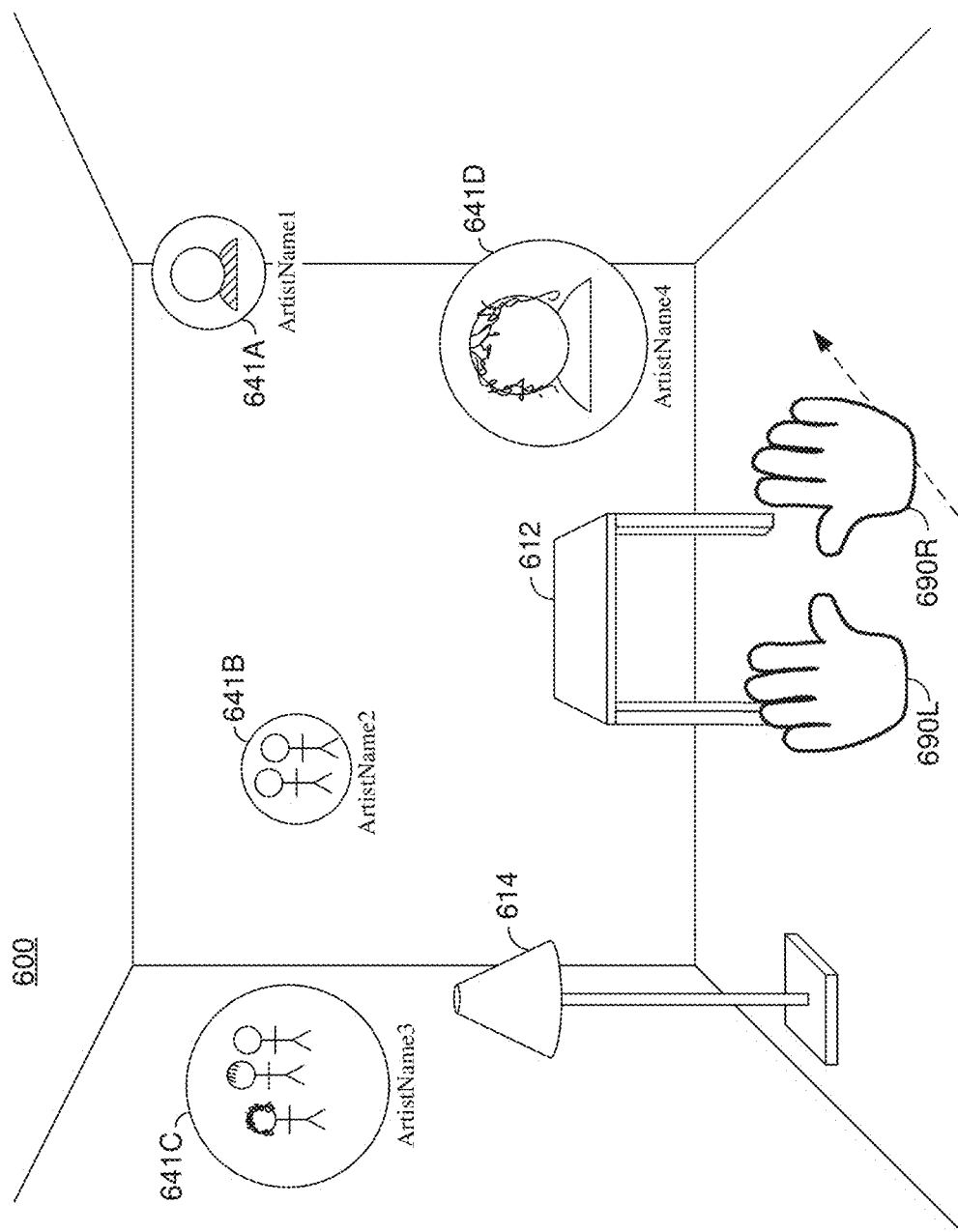

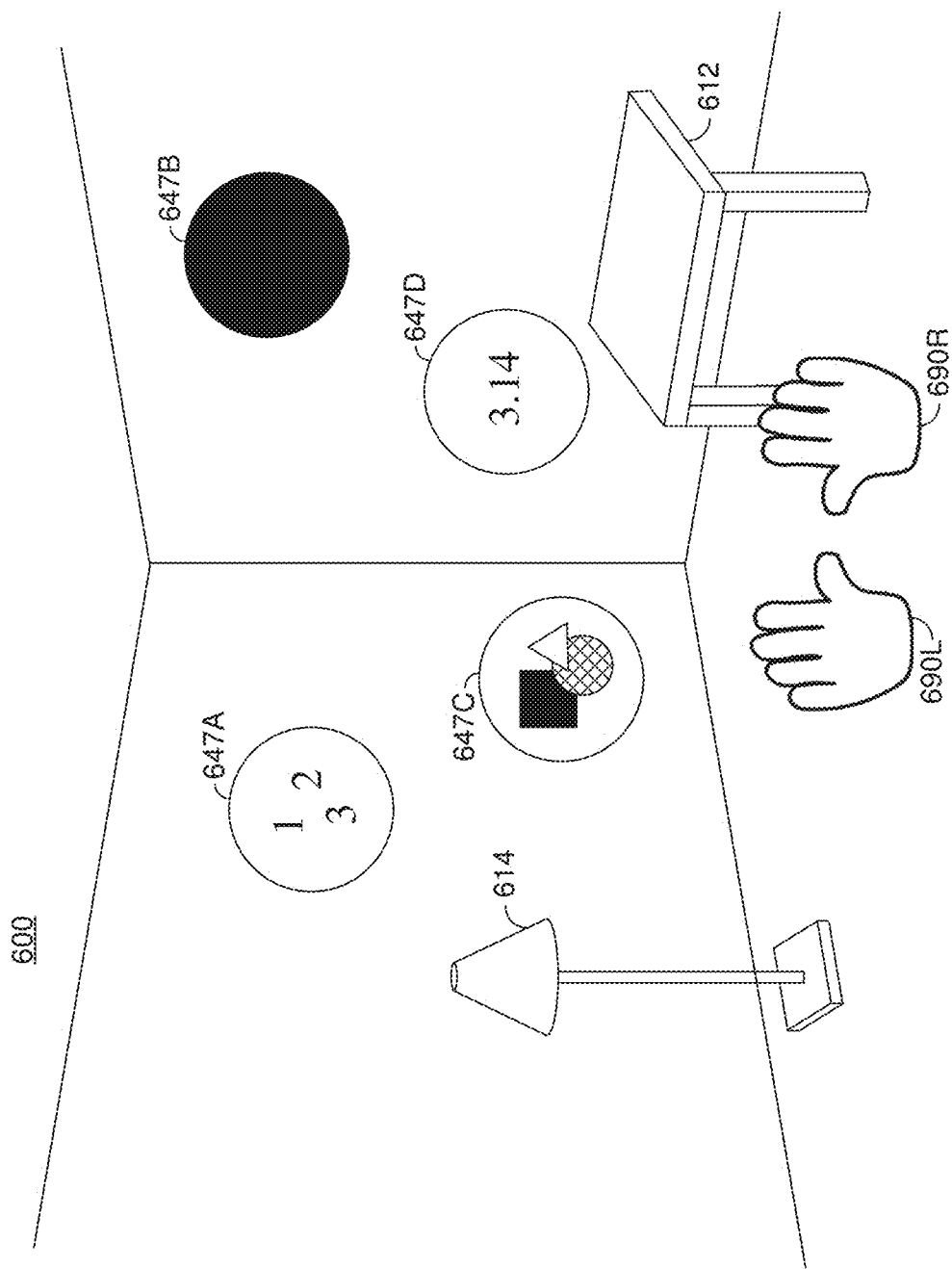

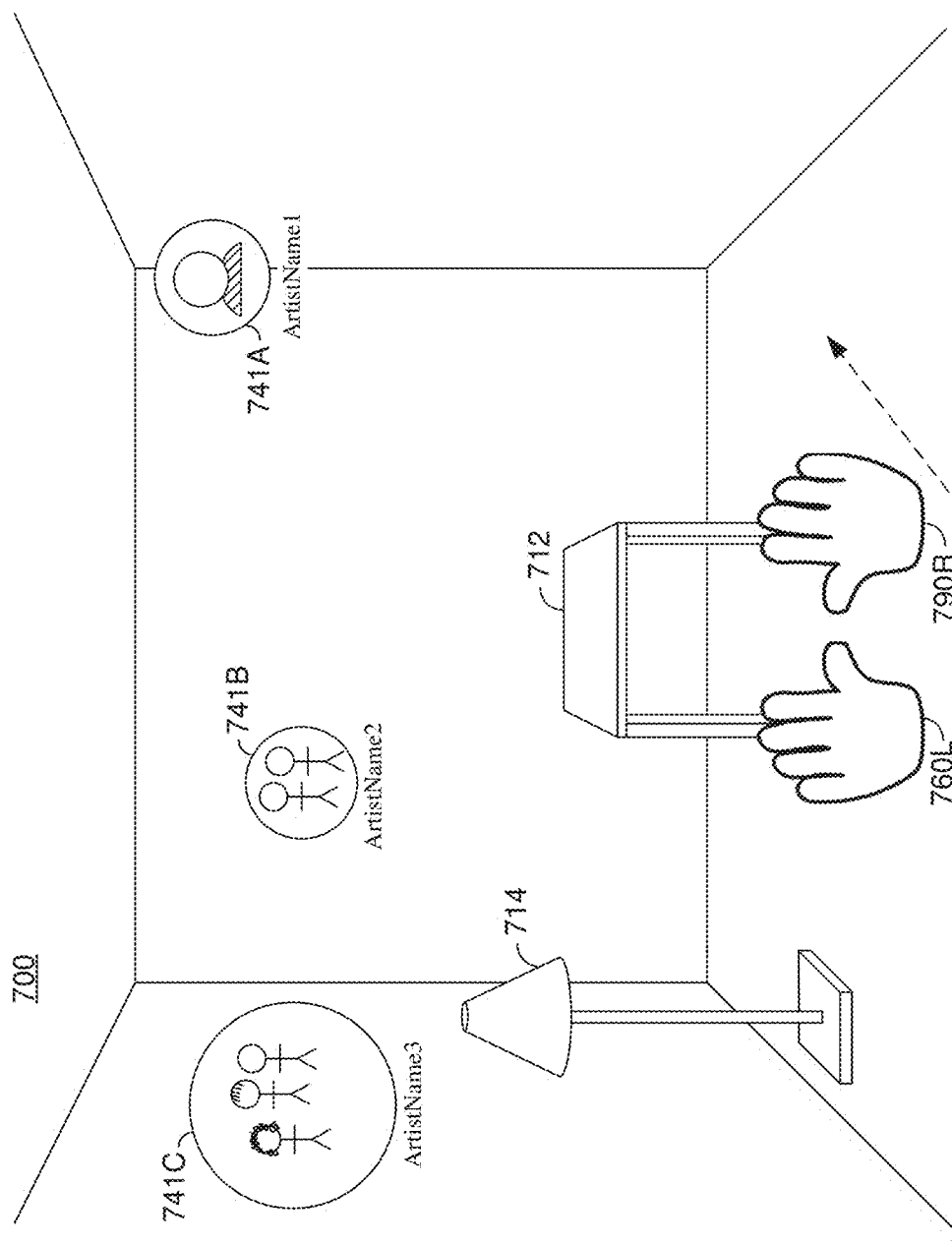

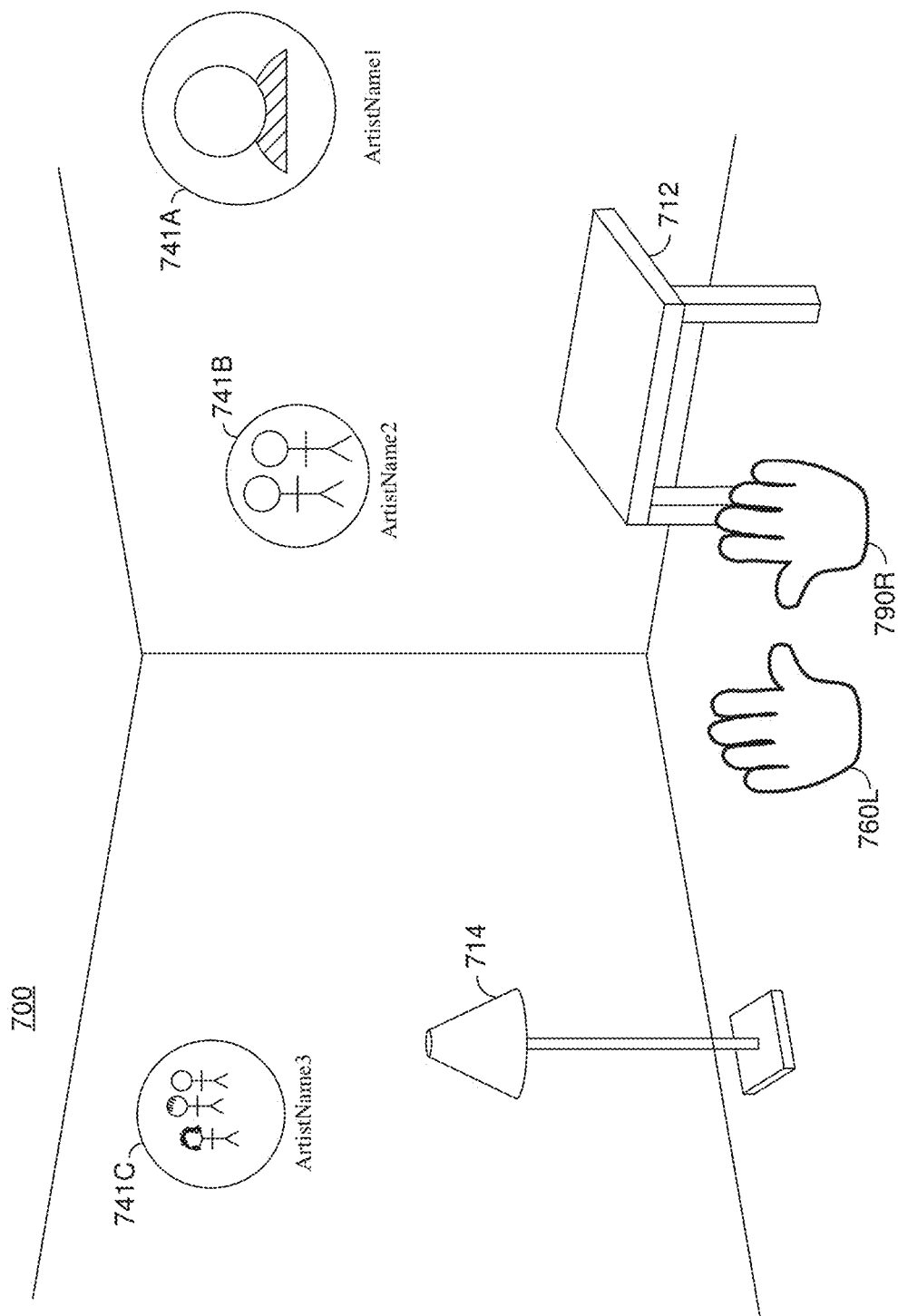

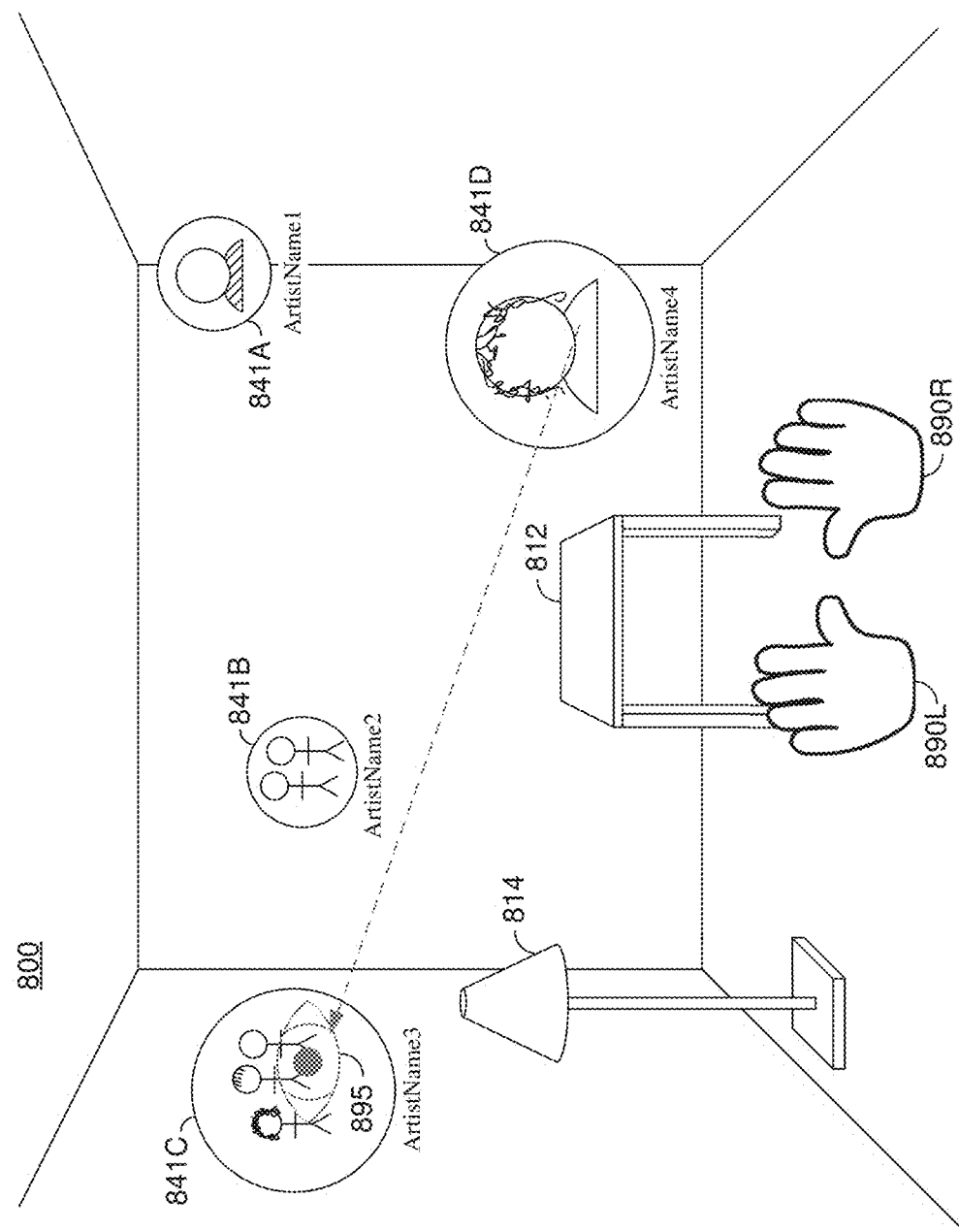

1400

Identifying a plurality of data items, each of the plurality of data items having a first metadata field and a second metadata field ⸺1410

Displaying an SR volumetric environment including a plurality of first SR group representations respectively corresponding to a plurality of first groups of data items, each of the plurality of first groups of data items respectively including data items of the plurality of data items having respective ones of a plurality of first metadata field values of the first metadata field ⸺1420

Detecting a first user input indicative of the second metadata field ⸺1430

In response to detecting the first user input, replacing the plurality of first SR group representations with a plurality of second SR group representations respectively corresponding to a plurality of second groups of data items, each of the plurality of second groups of data items respectively including data items of the plurality of data items having respective ones of a plurality of second metadata field values of the second metadata field ⸺1440

Figure 14

METHOD AND DEVICE FOR PRESENTING A SYNTHESIZED REALITY USER INTERFACE

CROSS-REFERENCE TO RELATED APPLICATION

This application claims priority to U.S. Provisional Patent App. 62/679,842, filed on Jun. 3, 2018, International Patent App. No. PCT/US2019/034327, filed on May 29, 2019, and U.S. Non-Provisional patent application Ser. No. 17/059,814, filed on Nov. 30, 2020, which are hereby incorporated by reference in their entireties.

TECHNICAL FIELD

The present disclosure generally relates to synthetized reality user interfaces, and in particular, to systems, methods, and devices for presenting a synthetized reality user interface including group representations of groups of files.

BACKGROUND

A physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste.

In contrast, a synthesized reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, a SR system may detect an individual walking a few paces forward and, responsive thereto, adjust graphics and audio presented to the individual in a manner similar to how such scenery and sounds would change in a physical setting. Modifications to attribute(s) of virtual object(s) in a SR setting also may be made responsive to representations of movement (e.g., audio instructions).

An individual may interact with and/or sense a SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Another example of SR is mixed reality (MR). A MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationery with respect to a physical building.

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

Navigating among a large number of data items (such as audio files, video files, document files, or webpages) to locate a particular data item can be cumbersome. For example, locating a song to play in a large music library can be a daunting task. Further, transitioning between songs or otherwise playing multiple songs concurrently can produce sonic discordance.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 4 illustrates a third-person view of an SR volumetric environment in accordance with some implementations.

FIGS. 6A-6H illustrates a first-person view of an SR volumetric environment including SR group representations of groups of audio files in accordance with some implementations.

FIGS. 8A-8E illustrate an SR volumetric environment in which a SR group representation is selected by pulling apart the SR group representation in accordance with some implementations.

FIGS. 9A-9B illustrate an SR volumetric environment in which an SR group representation is selected by gazing at the SR group representation in accordance with some implementations.

FIGS. 10A-10B illustrate an SR volumetric environment in which an SR group representation is selected by moving towards the SR group representation in accordance with some implementations.

FIGS. 11A-11B illustrate an SR volumetric environment in which two audio files are played concurrently in accordance with some implementations.

FIGS. 12A-12C illustrate an SR volumetric environment in which a first audio file cross-fades to a second audio file in accordance with some implementations.

FIG. 14 is a flowchart representation of a method of regrouping data items in an SR user interface in accordance with some implementations.

Figure 1A:
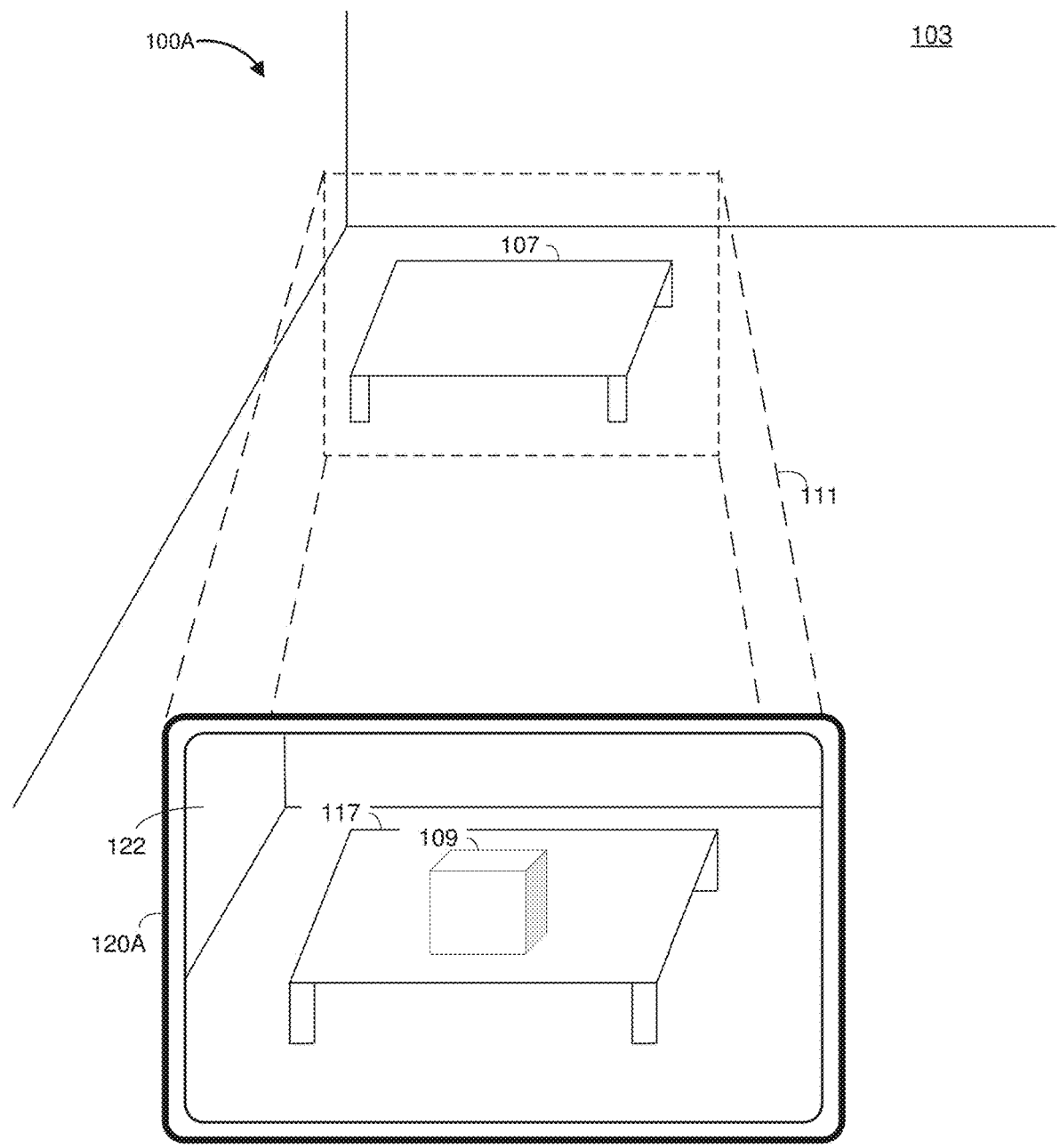
FIG. 1A is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for moving an object in an SR user interface. In various implementations, the method is performed by a device including one or more processors, non-transitory memory, and a display. The method includes identifying a plurality of data items, each of the plurality of data items having a first metadata field. The method includes displaying, on the display, an SR volumetric environment including a plurality of first SR group representations respectively corresponding to a plurality of first groups of data items, each of the plurality of first groups of data items respectively including data items of the plurality of data items having respective ones of a plurality of first metadata field values of the first metadata field. The method includes detecting a first user input directed toward a particular one of the plurality of first SR group representations. The method includes, in response to detecting the first user input, moving the particular one of the plurality of first SR group representations in the SR volumetric environment in relation to at least another one of the plurality of first SR group representations.

Various implementations disclosed herein include devices, systems, and methods for regrouping data items in an SR user interface. In various implementations, the method is performed by a device including one or more processors, non-transitory memory, and a display. The method includes identifying a plurality of data items, each of the plurality of data items having a first metadata field and a second metadata field. The method includes displaying, on the display, an SR volumetric environment including a plurality of first SR group representations respectively corresponding to a plurality of first groups of data items, each of the plurality of first groups of data items respectively including data items of the plurality of data items having respective ones of a plurality of first metadata field values of the first metadata field. The method includes detecting a first user input indicative of the second metadata field. The method includes, in response to detecting the first user input, replacing the plurality of first SR group representations with a plurality of second SR group representations respectively corresponding to a plurality of second groups of data items, each of the plurality of second groups of data items respectively including data items of the plurality of data items having respective ones of a plurality of second metadata field values of the second metadata field.

Various implementations disclosed herein include devices, systems, and methods for selecting groups of data items in an SR user interface. In various implementations, the method is performed by a device including one or more processors, non-transitory memory, and a display. The method includes identifying a plurality of data items, each of the plurality of data items having a first metadata field and a second metadata field. The method includes displaying, on the display, an SR volumetric environment including a plurality of first SR group representations respectively corresponding to a plurality of first groups of data items, each of the plurality of first groups of data items respectively including data items of the plurality of data items having a first metadata field including a respective one of a plurality of first metadata field values. The method includes detecting a first user input directed toward a particular one of the plurality of first SR group representations corresponding to a particular one of the first groups of data items, the particular one of the first groups of data items including data items of the plurality of data items having a first metadata field including a particular one of the plurality of first metadata field values. The method includes, in response to detecting the first user input, replacing the particular one of the plurality of first SR group representations with a plurality of second SR group representations respectively corresponding to a plurality of second groups of data items, each of the plurality of second groups of data items respectively including data items of the plurality of data items having the first metadata field including the particular one of the plurality of first metadata field values and the second metadata field including respective ones of a plurality of second metadata field values.

Various implementations disclosed herein include devices, systems, and methods for playing two audio files. In various implementations, the method is performed by a device including one or more processors, non-transitory memory, a directional speaker system, and a display. The method includes displaying, on the display, a plurality of SR objects at respective locations in an SR volumetric space, each of the plurality of SR objects associated with a respective metadata field value of a metadata field of at least one of a plurality of audio files. The method includes determining a first distance between a user location in the SR volumetric space and a first location in the SR volumetric space of a first SR object of the plurality of SR objects, wherein the first SR object is associated with a first metadata field value. The method includes determining a second distance between the user location in the SR volumetric space and a second location in the SR volumetric space of a second SR object of the plurality of SR objects, wherein the second SR object is associated with a second metadata field value. The method includes selecting a first audio file of the plurality of audio files having a metadata field including the first metadata field value. The method includes selecting, based on the first audio file, a second audio file of the plurality of audio files having a metadata field including the second metadata field value. The method includes concurrently playing, via the directional speaker system in a direction from the first location at a first volume based on the first distance, the first audio file and playing, via the directional speaker system in a direction from the second location at a second volume based on the second distance, the second audio file.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

As noted above, navigating among a large number of data items (such as audio files, video files, document files, or webpages) to locate a particular data item can be cumbersome. Described herein is an SR user interface that may be used to open a data item pf a plurality of data items. In various implementations, presentation of the SR user interface includes display of an SR volumetric environment including SR group representations at various locations in the SR volumetric environment around the user. Each SR group representation corresponds to a respective group of data items, wherein each data item in a group shares a value of an attribute. Accordingly, a large number of files is represented in the SR user interface as a smaller number of SR group representations.

In various implementations, the SR group representations can be rearranged and organized by a user within the SR volumetric environment. In various implementations, the data items can be resorted and/or regrouped such that respective SR group representations associated with respective values of a first attribute are replaced with respective SR group representations associated with respective values of a second attribute. In various implementations, an SR group representation associated with a particular value of a first attribute can be selected and thereby replaced with (1) representations of the data items having the particular value of the first attribute or (2) respective SR group representations of groups of data items having the particular value of the first attribute, but respective different values of a second attribute.

FIG. 1A is a block diagram of an example operating architecture 100A in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100A includes an electronic device 120A.

In some implementations, the electronic device 120A is configured to present CGR content to a user. In some implementations, the electronic device 120A includes a suitable combination of software, firmware, and/or hardware. According to some implementations, the electronic device 120A presents, via a display 122, SR content to the user while the user is physically present within a physical environment 103 that includes a table 107 within the field-of-view 111 of the electronic device 120A. As such, in some implementations, the user holds the electronic device 120A in his/her hand(s). In some implementations, while providing augmented reality (AR) content, the electronic device 120A is configured to display an AR object (e.g., an AR cube 109) and to enable video pass-through of the physical environment 103 (e.g., including a representation 117 of the table 107) on a display 122.

Figure 1B:
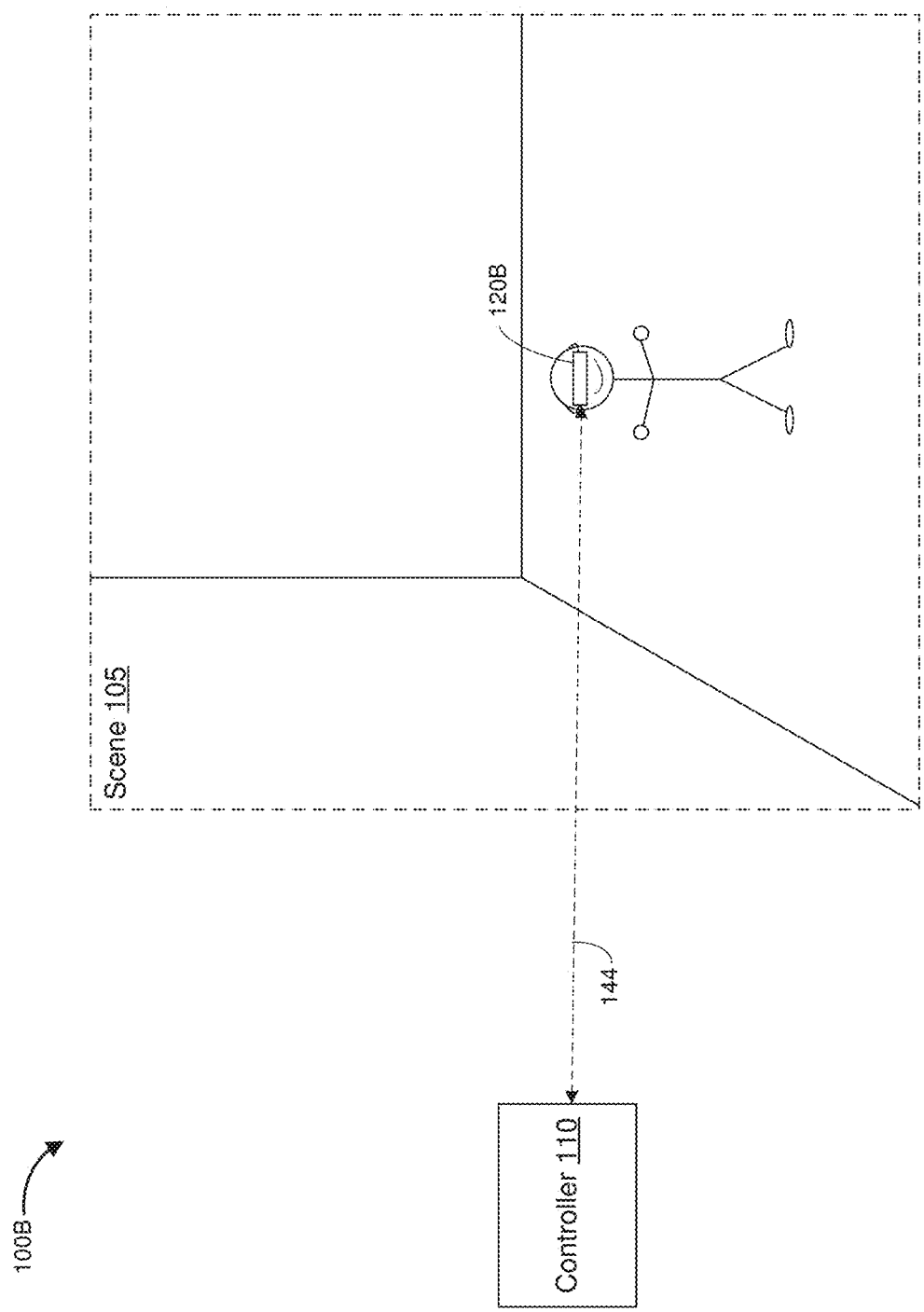
FIG. 1B is a block diagram of an example operating architecture in accordance with some implementations.

FIG. 1B is a block diagram of an example operating architecture 100B in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100B includes a controller 110 and a head-mounted device (HMD) 120B.

In some implementations, the controller 110 is configured to manage and coordinate presentation of SR content for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the scene 105. For example, the controller 110 is a local server located within the scene 105. In another example, the controller 110 is a remote server located outside of the scene 105 (e.g., a cloud server, central server, etc.). In some implementations, the controller 110 is communicatively coupled with the HMD 120B via one or more wired or wireless communication channels 144 (e.g., BLUETOOTH, IEEE 802.11x, IEEE 802.16x, IEEE 802.3x, etc.). In another example, the controller 110 is included within the enclosure of the HMD 120B.

In some implementations, the HMD 120B is configured to present the SR content to the user. In some implementations, the HMD 120B includes a suitable combination of software, firmware, and/or hardware. The HMD 120B is described in greater detail below with respect to FIG. 3. In some implementations, the functionalities of the controller 110 are provided by and/or combined with the HMD 120B.

According to some implementations, the HMD 120B presents SR content to the user while the user is virtually and/or physically present within the scene 105.

In some implementations, the user wears the HMD 120B on his/her head. As such, the HMD 120B includes one or more SR displays provided to display SR content. For example, in various implementations, the HMD 120B encloses the field-of-view of the user. In some implementations, such as in FIG. 1A, the HMD 120B is replaced with a handheld device (such as a smartphone or tablet) configured to present SR content, and rather than wearing the HMD 120B the user holds the device with a display directed towards the field-of-view of the user and a camera directed towards the scene 105. In some implementations, the handheld device can be placed within an enclosure that can be worn on the head of the user. In some implementations, the HMD 120B is replaced with a SR chamber, enclosure, or room configured to present SR content in which the user does not wear or hold the HMD 120B.

Figure 2:
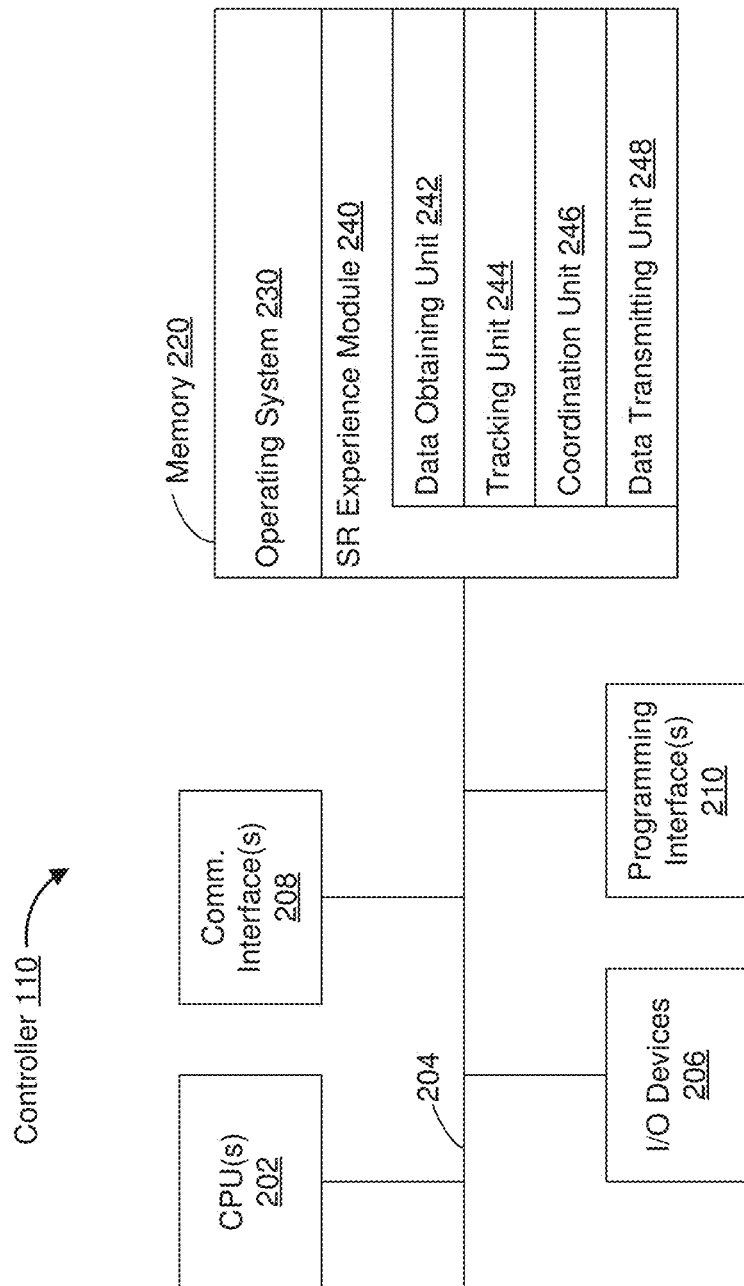
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an SR experience module 240.

The operating system 230 includes procedures for handling various basic system services and for performing hardware dependent tasks. In some implementations, the SR experience module 240 is configured to manage and coordinate one or more SR experiences for one or more users (e.g., a single SR experience for one or more users, or multiple SR experiences for respective groups of one or more users). To that end, in various implementations, the SR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the HMD 120B. To that end, in various implementations, the data obtaining unit 242 includes instructions and/or logic therefor, and heuristics and metadata therefor.

In some implementations, the tracking unit 244 is configured to map the scene 105 and to track the position/location of at least the HMD 120B with respect to the scene 105. To that end, in various implementations, the tracking unit 244 includes instructions and/or logic therefor, and heuristics and metadata therefor.

In some implementations, the coordination unit 246 is configured to manage and coordinate the SR experience presented to the user by the HMD 120B. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the HMD 120B. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
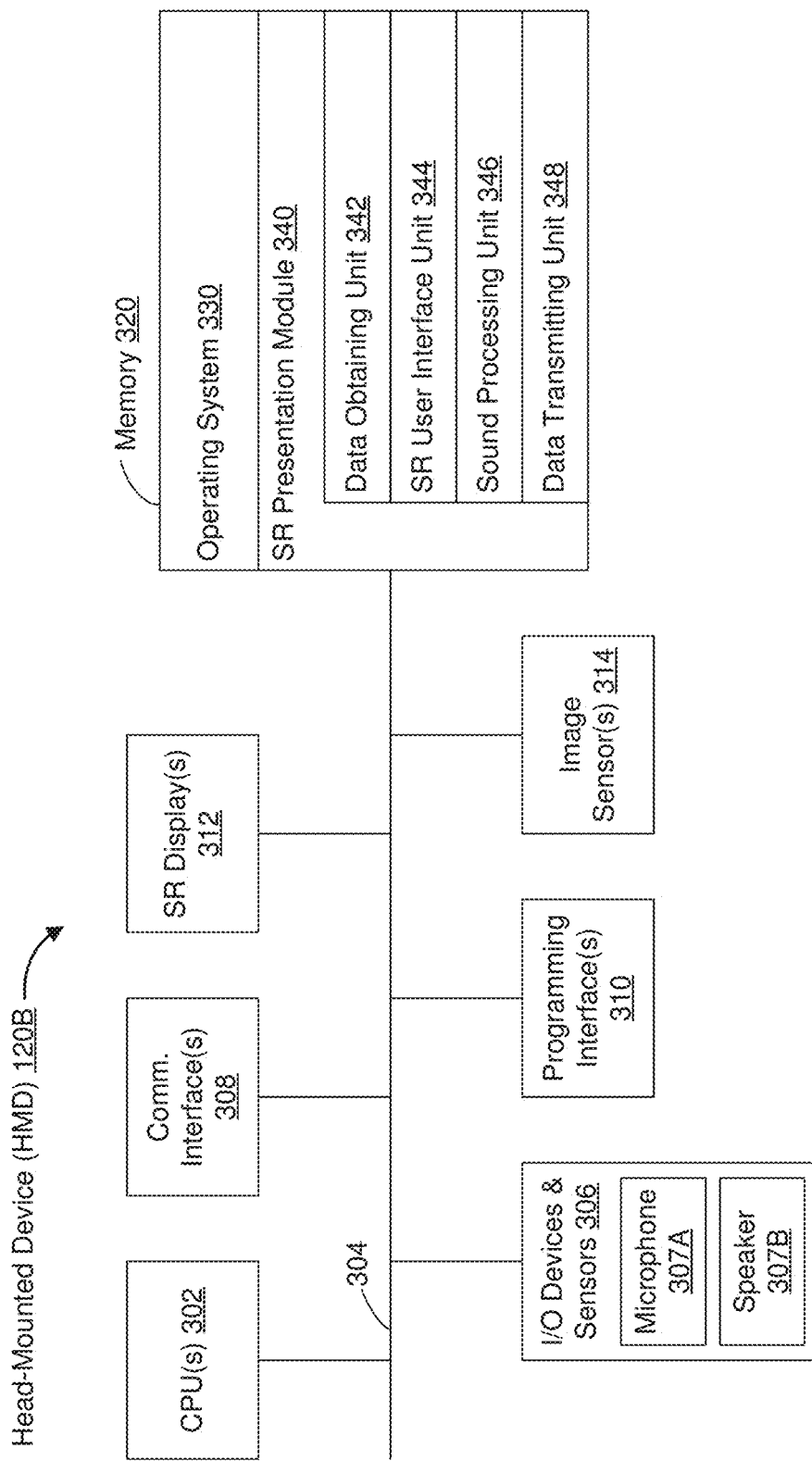
FIG. 3 is a block diagram of an example head-mounted device (HMD) in accordance with some implementations.

FIG. 3 is a block diagram of an example of the HMD 120B in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120B includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more SR displays 312, one or more optional interior and/or exterior facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers (e.g., headphones or loudspeakers), a haptics engine, one or more depth sensors (e.g., a structured light, a time-of-flight, or the like), and/or the like.

In some implementations, the one or more SR displays 312 are configured to provide the SR experience to the user. In some implementations, the one or more SR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more SR displays 312 correspond to diffractive, reflective, polarized, holographic, etc. waveguide displays. For example, the HMD 120B includes a single SR display. In another example, the HMD 120B includes an SR display for each eye of the user. In some implementations, the one or more SR displays 312 are capable of presenting AR and VR content.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the scene as would be viewed by the user if the HMD 120B was not present (and may be referred to as a scene camera). The one or more image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an SR presentation module 340.

The operating system 330 includes procedures for handling various basic system services and for performing hardware dependent tasks. In some implementations, the SR presentation module 340 is configured to present SR content to the user via the one or more SR displays 312. To that end, in various implementations, the SR presentation module 340 includes a data obtaining unit 342, an SR user interface unit 344, a sound processing unit 346, and a data transmitting unit 348.

In some implementations, the data obtaining unit 342 is configured to obtain data (e.g., presentation data, interaction data, sensor data, location data, etc.) from one or more of the controller 110 (e.g., via the communication interface 308), the I/O devices and sensors 306, or the one or more image sensors 314. To that end, in various implementations, the data obtaining unit 342 includes instructions and/or logic therefor, and heuristics and metadata therefor.

In some implementations, the SR user interface unit 344 is configured to present SR content including an SR user interface via the one or more SR displays 312. To that end, in various implementations, the SR presenting unit 344 includes instructions and/or logic therefor, and heuristics and metadata therefor.

In some implementations, the sound processing unit 346 is configured to analysis and/or modify sound data. To that end, in various implementations, the planar detection unit 346 includes instructions and/or logic therefor, and heuristics and metadata therefor.

In some implementations, the data transmitting unit 348 is configured to transmit data (e.g., presentation data, location data, etc.) to at least the controller 110. To that end, in various implementations, the data transmitting unit 348 includes instructions and/or logic therefor, and heuristics and metadata therefor.

Although the data obtaining unit 342, the SR user interface unit 344, the sound processing unit 346, and the data transmitting unit 348 are shown as residing on a single device (e.g., the HMD 120B), it should be understood that in other implementations, any combination of the data obtaining unit 342, the SR user interface unit 344, the sound processing unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIG. 4 illustrates an SR volumetric environment 400 based on a real environment in which a user 420 is present. In FIG. 4, the user 420 is wearing an HMD and surveying the SR volumetric environment 400 (as illustrated in a first-person view in the following figures). The SR volumetric environment 400 includes a plurality of objects, including a plurality of real objects (e.g., a table 412 and a lamp 414 corresponding to a real table and lamp of the real environment) and a plurality of virtual objects (e.g., a plurality of SR group representations 440A-440G). In various implementations, each object is displayed at a location in the SR volumetric environment 400, e.g., at a location defined by three coordinates in a three-dimensional (3D) SR coordinate system. Accordingly, when the user 420 moves in the SR volumetric environment 400 (e.g., changes either position and/or orientation), the objects are moved on the display of the HMD, but retain their location in the SR volumetric environment 400. In various implementations, one or more of the virtual objects (e.g., SR group representations 440A-440D) are at locations in the SR volumetric environment 400 within a field of view of the user 420, whereas others of the virtual objects (e.g., SR group representations 440E-440G) are at locations in the SR volumetric environment 400 that are not within the field of view of the user 420, at least until the user 420 changes position and/or orientation within the SR volumetric environment 400.

In various implementations, the SR group representations respectively correspond to groups of data items. In various implementations, each data item has a first metadata field (including a respective first metadata field value). In various implementations, each data item has a second metadata field (including a respective second metadata field value). For example, in various implementations, the data items are audio files and the first metadata field is an artist metadata field (including such values as "ArtistName1," "ArtistName2", and "ArtistName3") and the second metadata field is an album metadata field (including such values as "AlbumName1," "AlbumName2," and "AlbumName3"). In various implementations, the data items are document files and the first metadata field is a document-type field (including such values as "text," "spreadsheet," and "slide presentation") and the second metadata field is an author metadata field (including such values as "Alice," "Bob," and "Carl".) In various implementations, the data items are movie files and the first metadata field is a genre metadata field and the second metadata field is year-of-release metadata field. In various implementations, the data items are webpages for an online store and the first metadata field is a brand metadata field and the second metadata field is a price metadata field. In various implementations, the data items can have additional and/or other metadata fields.

In various implementations, the SR group representations respectively correspond to groups of data items that include data items with a first metadata field including a respective one of a plurality of first metadata field values. For example, in various implementations, the SR group representations include a first SR group representation corresponding to a group of data items having a document-type metadata field including "text" and a second SR group representation corresponding to a group of data items having the document-type metadata field including "spreadsheet." In various implementations, the SR group representations include a first SR group representation corresponding to a group of data items having an artist metadata field including "ArtistName1" and a second SR group representation corresponding to a group of data items having the artist metadata field including "ArtistName2."

FIG. 5A illustrates a SR volumetric environment 500 from the perspective of the user in accordance with some implementations. The SR volumetric environment 500 includes a plurality of objects. The plurality of objects in the SR volumetric environment 500 include a plurality of real objects, such as a table 512 and a lamp 514 corresponding to a real table and lamp of the real environment. The real objects further include a left hand 590L and a right hand 590R corresponding to the left and right hand of the user. The plurality of object in the SR volumetric environment 500 include a plurality of virtual objects, such as a plurality of first SR group representations 541A-541D.

The first SR group representations 541A-541D correspond to groups of document files having a document-type metadata field and an author metadata field. Respective first SR group representations 541A-541D correspond to respective document-type metadata field values. In various implementations, the first SR group representations 541A-541D are displayed with indicia of the respective document-type metadata field values, such as an icon of an application for opening document files of the document type.

The first SR group representations 541A-541D include a spreadsheet group representation 541A corresponding to a group of document files having a document-type metadata field including a value of "spreadsheet." The first SR group representations 541A-541D include a presentation group representation 541B corresponding to a group of document files having a document-type metadata field including a value of "slide presentation." The first SR group representations 541A-541D include an other group representation 541C corresponding to a group of document files having a document-type metadata field including a value of "other" or at least lacking a value corresponding to others of the first SR group representations. The first SR group representations 541A-541D include a text group representation 541D corresponding to a group of document files having a document-type metadata field including a value of "text."

Figure 5B:
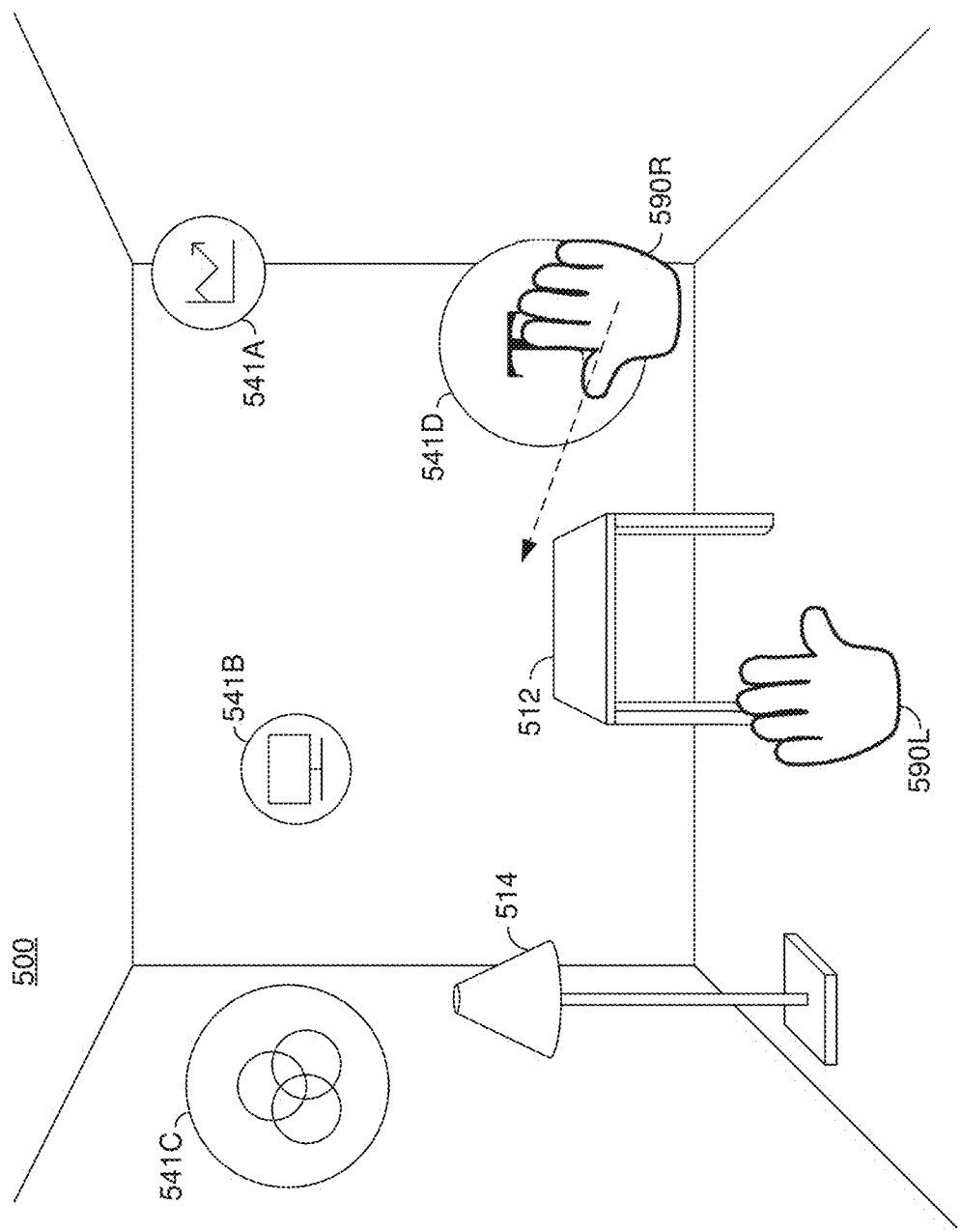
FIGS. 5A-5P illustrate a first-person view of an SR volumetric environment including SR group representations of groups of document files in accordance with some implementations.

FIG. 5B illustrates the SR volumetric environment 500 of FIG. 5A with a user input directed toward the text group representation 541D. In FIG. 5B, the user input includes the user grabbing the text group representation 541D with the user's right hand and moving it toward the top of the table 512.

Figure 5C:
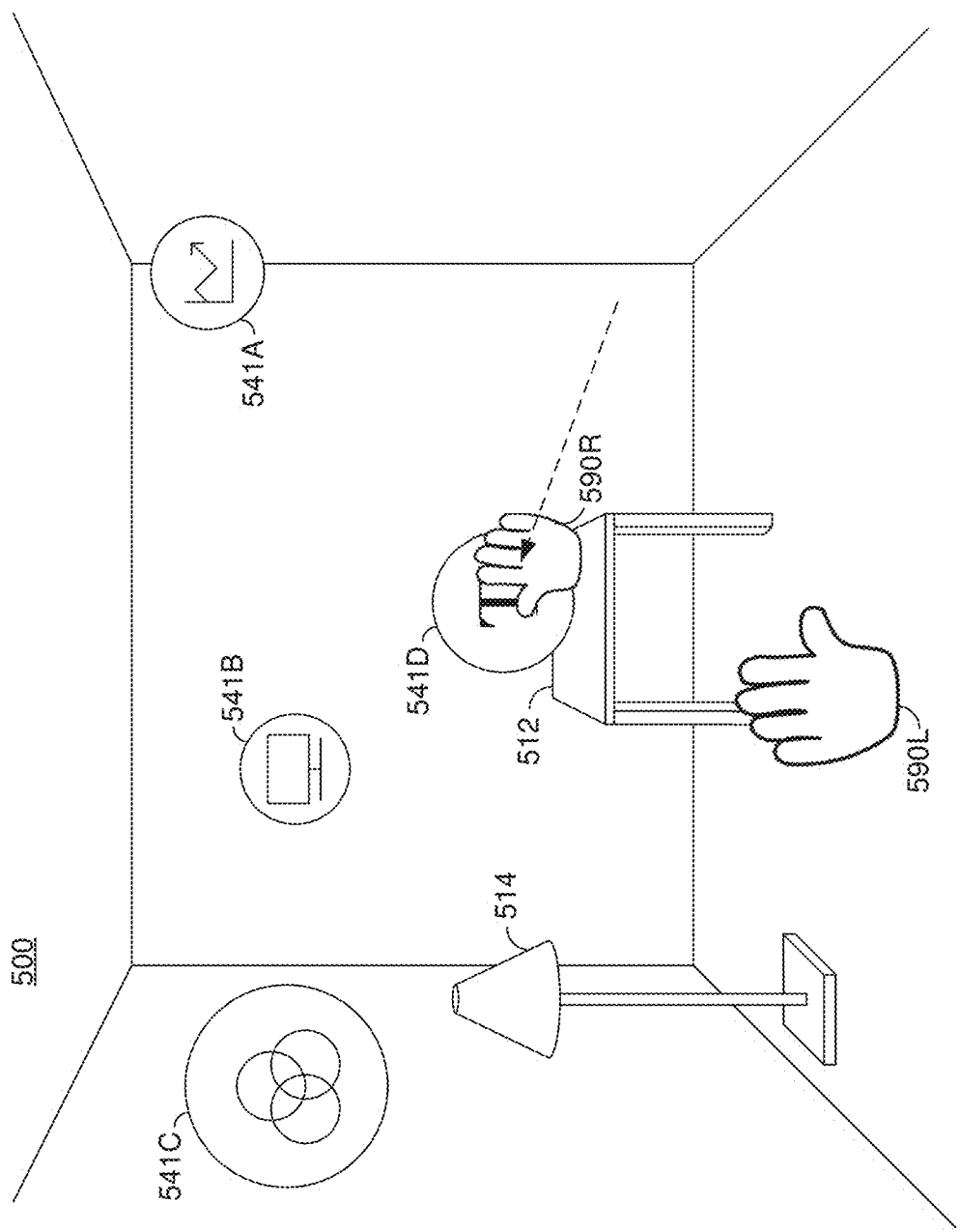

FIG. 5C illustrates the SR volumetric environment 500 of FIG. 5B in response to detecting the user input directed toward the text group representation 541D. In FIG. 5C, the text group representation 541D has moved from its initial location (as shown in FIG. 5B) to a location on top of the table 512 (as shown in FIG. 5C). Accordingly, the text group representation 541D is moved in the SR volumetric environment 500 in relation to at least another one of the first SR group representations 541A-541C.

FIG. 5D illustrates the SR volumetric environment 500 of FIG. 5C with the user moving within the SR volumetric environment 500. In FIG. 5D, the user moves from a first location in the SR volumetric environment 500 facing the table toward the right-back corner of the SR volumetric environment 500 facing the left-back corner of the SR volumetric environment 500.

FIG. 5E illustrates the SR volumetric environment 500 of FIG. 5D in response to detecting the user moving within the SR volumetric environment 500. Although the plurality of objects are displayed at different locations in the user's field of view, e.g., on a display of an HMD worn by the user, the plurality of objects are displayed in the same location within the SR volumetric environment 500. Accordingly, in various implementations, in FIG. 5D, the first SR group representations 541A-541D are displayed at a plurality of locations in the SR volumetric environment 500 at a first plurality of locations on a display and, in response to detecting a change in a user position and/or orientation in the SR volumetric environment, the first SR group representations 541A-541D are displayed at the same plurality of locations in the SR volumetric environment at a second plurality of locations on the display.

In various implementations, the locations in the SR volumetric environment 500 of the first SR group representations 541A-541D are persistent over time. For example, in various implementations, the locations are stored in a non-transitory memory. Accordingly, even when a user ceases using an application and/or device presenting the SR user interface and returns later to user the application and/or device presenting the SR user interface, the first SR group representations 541A-541D are displayed at the same locations in the SR volumetric environment 500. In this way, the SR volumetric environment 500 functions like a computer desktop, allowing a user to rearrange and organize the first SR group representations 541A-541D (e.g., using user inputs as described with respect to FIG. 5B) as the user sees fit for use at any later time.

Figure 5F:
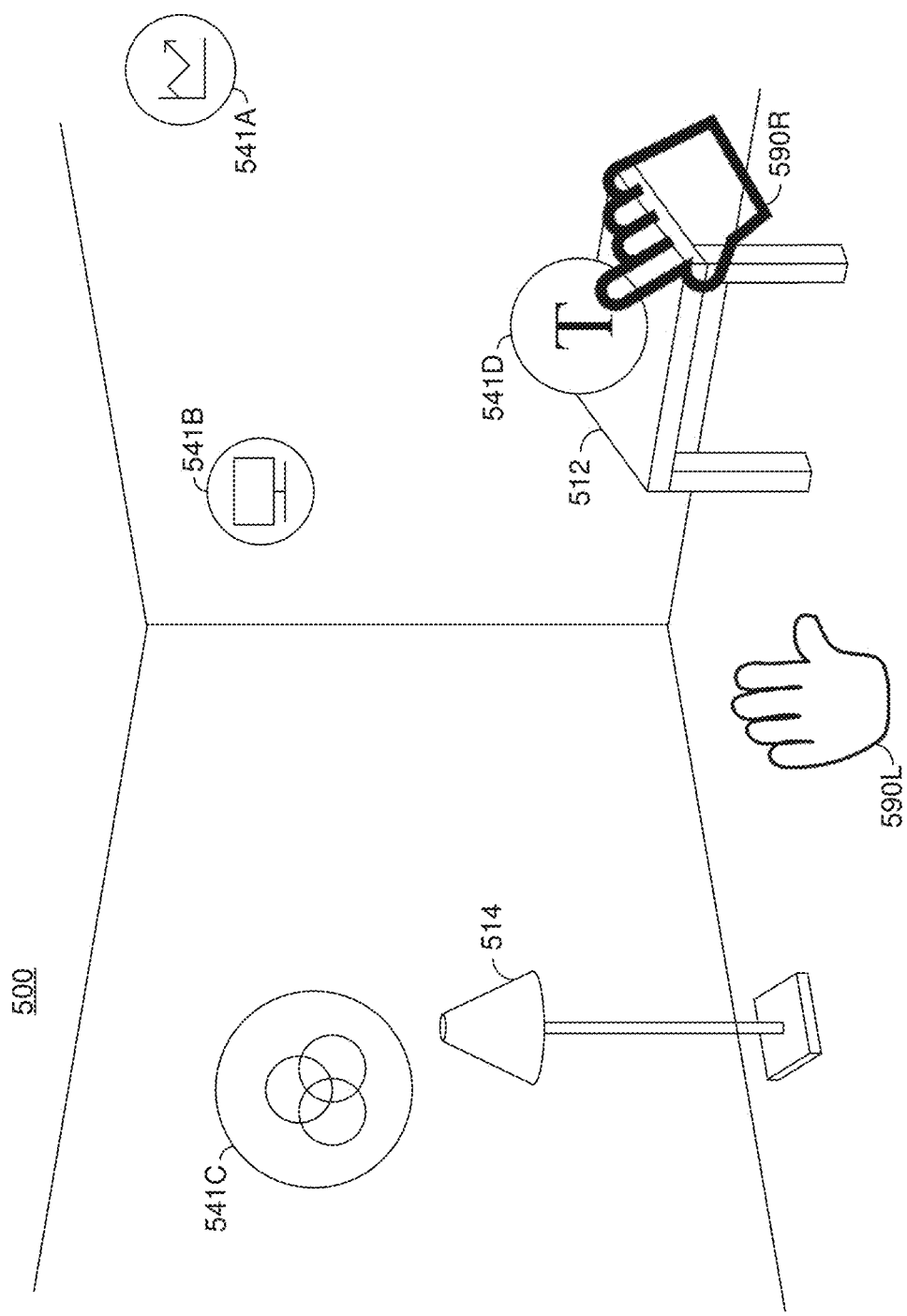

FIG. 5F illustrates the volumetric environment 500 of FIG. 5E with a user input directed toward the text group representation 541D. In FIG. 5F, the user input includes the user touching the text group representation 541D with a single finger of the user's right hand. Accordingly, the user input in FIG. 5F (touching the text group representation 541D) differs from the user input in FIG. 5B (grabbing the text group representation 541D). Whereas the user input directed toward the text group representation 541D in FIG. 5F includes touching the text group representation 541D (as though popping a bubble), other types of user inputs selecting an SR group representation are described further below.

Figure 5G:
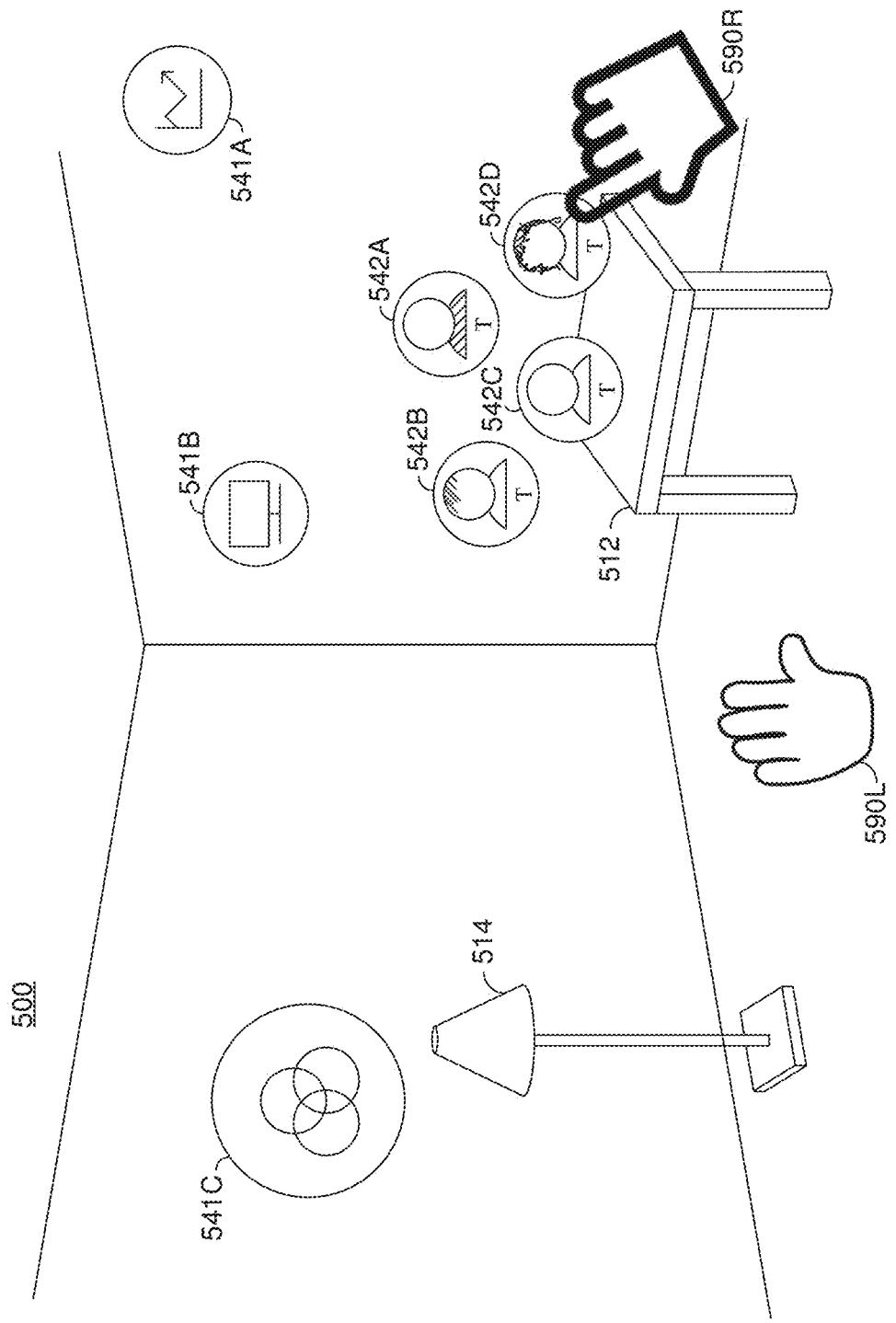

FIG. 5G illustrates the volumetric environment 500 of FIG. 5F in response to detecting the user input directed toward the text group representation 541D. In FIG. 5G, the text group representation 541D is replaced with a plurality of second SR group representations 542A-542D. Like the first SR group representations 541A-541D, the second SR group representations 542A-542D correspond to groups of document files having a document-type metadata field and an author metadata field. The second SR group representations 542A-542D correspond to groups of document files including a document-type metadata field value of "text" and different values included in the author metadata field.

Respective second SR group representations 542A-542D correspond to respective author metadata field values (and a selected one of the document-type metadata field values). In various implementations, the second SR group representations 542A-542D are displayed with indicia of the respective author metadata field values, such as a portrait of an author of the document file. In various implementations, the second SR group representations 542A-542D are also displayed with indicia of the selected one of the document-type metadata field values.

Thus, the second SR group representations 542A-542D include an Alice-text group representation 542A corresponding to a group of document files having a document-type metadata field including a value of "text" and an author metadata field having an author metadata field value of "Alice." The second SR group representations 542A-542D include a Bob-text group representation 542B corresponding to a group of document files having a document-type metadata field including a value of "text" and an author metadata field having an author metadata field value of "Bob." The second SR group representations 542A-542D include a Carl-text group representation 542C corresponding to a group of document files having a document-type metadata field including a value of "text" and an author metadata field having an author metadata field value of "Carl." The second SR group representations 542A-542D include a Dave-text group representation 542D corresponding to a group of document files having a document-type metadata field including a value of "text" and an author metadata field having an author metadata field value of "Dave."

Although other first SR group representations 541A-541C are displayed in FIG. 5G, in various implementations, in response to a user input directed toward a particular first SR group representation, the other SR group representations cease to be displayed or are displayed in a different manner (e.g., smaller, further away, grayed out, more transparent, etc.) to focus the user's attention on the second SR group representations that replaced the particular first SR group representation.

FIG. 5G illustrates a user input directed toward the Dave-text group representation 542D. In FIG. 5G, the user input includes the user touching the Dave-text group representation 542D with a single finger of the user's right hand.

FIG. 5H illustrates the SR volumetric environment 500 of FIG. 5G in response to detecting the user input directed toward the Dave-text group representation 542D. In FIG. 5H, the Dave-text group representation 542D is replaced with a plurality of SR item representations 543A-543D. The SR item representations 543A-543D correspond to document files having a document-type metadata field and an author metadata field. In particular, each SR item representation 543A-543D corresponds to a document file having a document-type metadata field including a document-type metadata field value of "text" and an author metadata field including an author metadata field value of "Dave." The SR item representations 543A-543D include a first SR item representation 543A corresponding to a document file entitled "one.txt," a second SR item representation 543B corresponding to a document file entitled "two.txt," a third SR item representation 543C corresponding to a document file entitled "three.txt," and a fourth SR item representation 543D corresponding to a document file entitled "four.txt."

Although other second SR group representations 542A-542C are not displayed in FIG. 5H, in various implementations, in response to a user input directed toward a particular second SR group representation, the other second SR group representations are displayed (in the same locations or at different locations to make room for the SR item representations).

FIG. 5H illustrates a user input directed toward the third SR item representation 543C. In FIG. 5H, the user input includes the user touching the third SR item representation 543C with a single finger of the user's right hand.

Figure 5I:
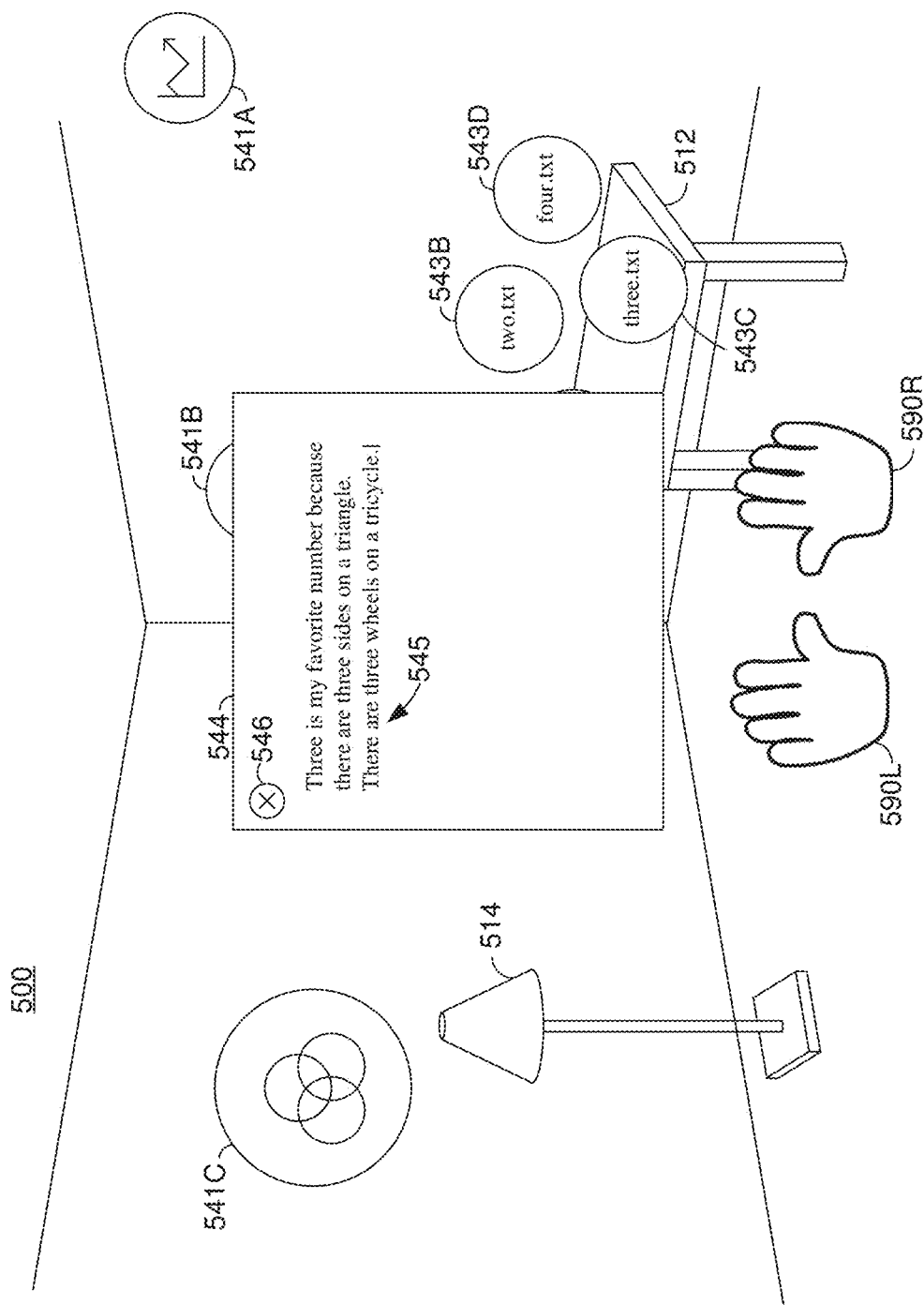

FIG. 5I illustrates the SR volumetric environment 500 of FIG. 5H in response to detecting the user input directed toward the third SR item representation 543C. The SR volumetric environment 500 of FIG. 5I includes another virtual object, a text display window 544 including the content 545 of the document file entitled "three.txt" and a close affordance 546 which, when selected via a user input, dismisses the text display window 544.

Figure 5J:
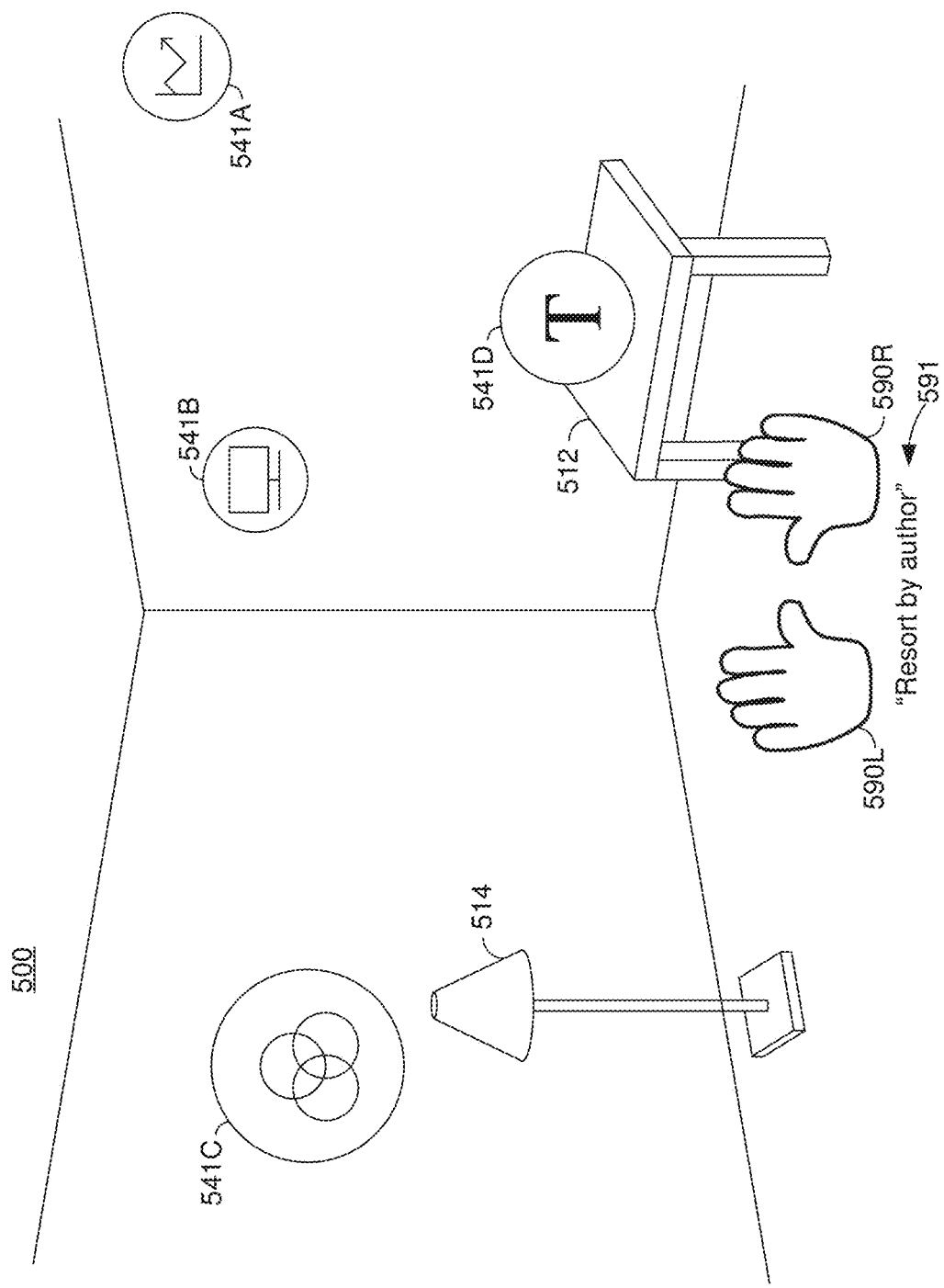
Figure 50:
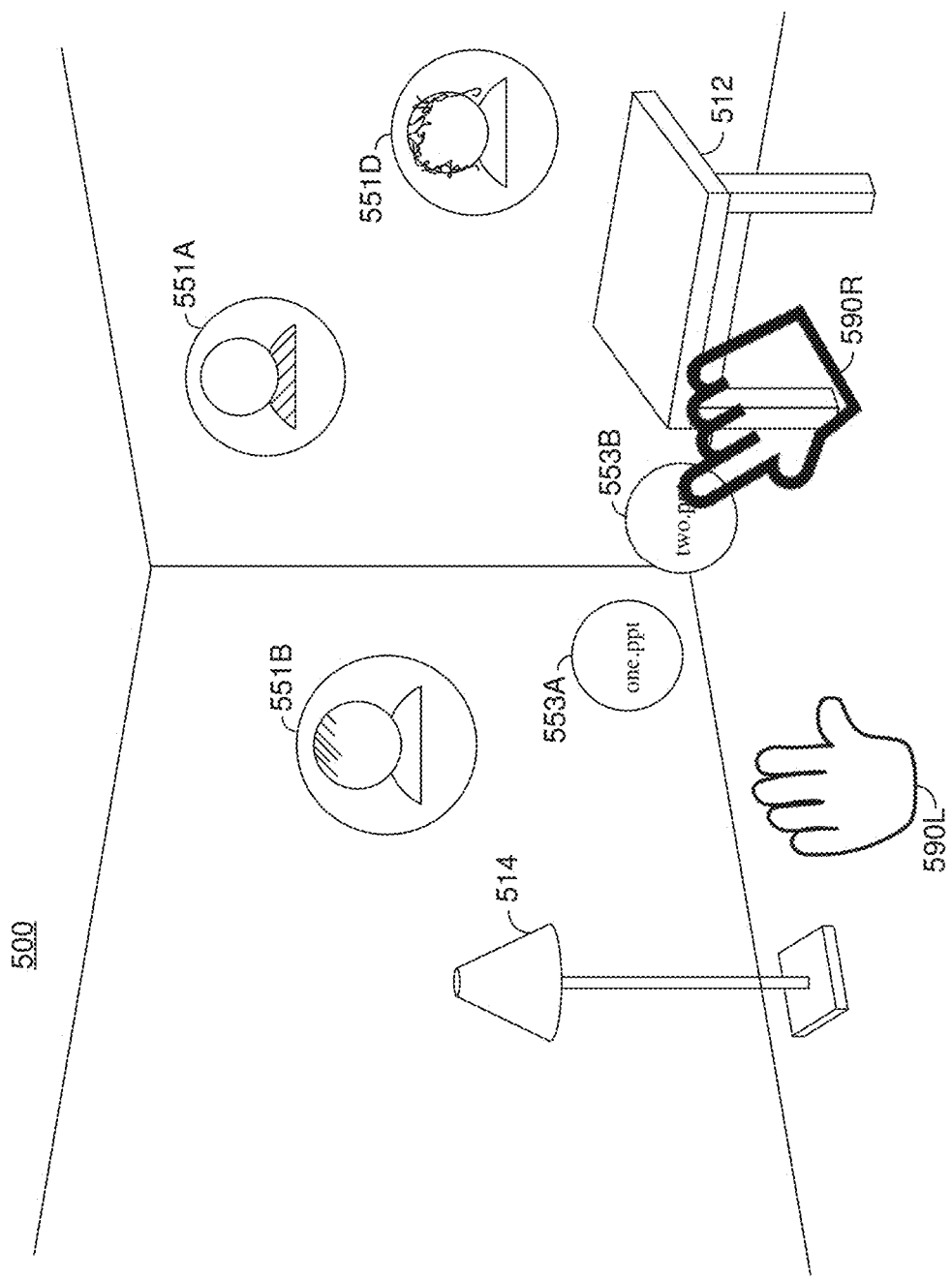

FIG. 5J illustrates the SR volumetric environment 500 of FIG. 5E with a user input indicating the author metadata field. In FIG. 5J, the user input includes a verbal command 591 issued by the user. In various implementations, the verbal command 591 is displayed in the SR volumetric environment. In various implementations, the verbal command 591 is not displayed.

FIG. 5K illustrates the SR volumetric environment 500 of FIG. 5J in response to detecting the user input indicating the author metadata field. In FIG. 5J, the first SR group representations 541A-541D are replaced with a plurality of third SR group representations 551A-551D. Like the first SR group representations 541A-541D, the third SR group representations 551A-551D correspond to groups of document files having a document-type metadata field and an author metadata field. However, wherein different ones of the first SR group representations 541A-541D correspond to different document-type metadata field values, different ones of the third SR group representations 551A-551D correspond to different author metadata field values. Thus, respective third SR group representations 551A-551D correspond to respective author metadata field values. In various implementations, the third SR group representations 551A-551D are displayed with indicia of the respective author metadata field values, such as a portrait of an author of the document file.

Thus, the third SR group representations 551A-551D include an Alice group representation 551A corresponding to a group of document files having an author metadata field including a value of "Alice." The third SR group representations 551A-551D include a Bob group representation 551B corresponding to a group of document files having an author metadata field including a value of "Bob." The third SR group representations 551A-551D include a Carl group representation 551C corresponding to a group of document files having an author metadata field including a value of "Carl." The third SR group representations 551A-551D include a Dave group representation 551D corresponding to a group of document files having an author metadata field including a value of "Dave."

In various implementations, replacing the first SR group representations 541A-541D with the third SR group representations 551A-551D includes displaying an animation in which the first SR group representations 541A-541D appear to explode into SR item representations which move to new locations and coalesce into the third SR group representations 551A-551D. FIGS. 5L1-5L6 illustrate the SR volumetric environment 500 during an animation between FIG. 5J and FIG. 5K.

FIG. 5M illustrates the SR volumetric environment 500 of FIG. 5K including a user input directed toward the Carl group representation 551C. In FIG. 5M, the user input includes the user touching the Carl representation 551C with a single finger of the user's right hand.

FIG. 5N illustrates the volumetric environment 500 of FIG. 5M in response to detecting the user input directed toward the Carl group representation 551C. In FIG. 5N, the Carl group representation 551C is replaced with a plurality of fourth SR group representations 552A-552C. Like the third SR group representations 551A-551C, the fourth SR group representations 552A-552C correspond to groups of document files having a document-type metadata field and an author metadata field. However, the fourth SR group representations 552A-552C correspond to groups of document files including an author metadata field value of "Carl" (and different values in the document-type metadata field).

Respective fourth SR group representations 552A-552C correspond to respective document-type metadata field values (and a selected one of the author metadata field values). In various implementations, the fourth SR group representations 552A-552C are displayed with indicia of the respective document-type metadata field values, such as an icon of an application for opening document files of the document type. In various implementations, the fourth SR group representations 552A-552C are also displayed with indicia of the selected one of the author metadata field values.

Thus, the fourth SR group representations 552A-552C include an text-Carl group representation 552A corresponding to a group of document files having a document-type metadata field including a value of "text" and an author metadata field having an author metadata field value of "Carl." The fourth SR group representations 552A-552C include a presentation-Carl group representation 552B corresponding to a group of document files having a document-type metadata field including a value of "slide presentation" and an author metadata field having an author metadata field value of "Carl." The fourth SR group representations 552A-552C include a spreadsheet-Carl group representation 552C corresponding to a group of document files having a document-type metadata field including a value of "spreadsheet" and an author metadata field having an author metadata field value of "Carl." In the example of FIG. 5N, there are no document files having a document-type metadata field including a value of "other" and an author metadata field having a value of "Carl." Accordingly, in the example of FIG. 5N, the fourth SR group representations 552A-552C do not include an other-Carl group representation corresponding to a group of document files having a document-type metadata field including a value of "other" and an author metadata field having an author metadata field value of "Carl."

Although other third SR group representations 551A-551C are displayed in FIG. 5N, in various implementations, in response to a user input directed toward a particular third SR group representation, the other third SR group representations cease to be displayed or are displayed in a different manner (e.g., smaller, further away, grayed out, more transparent, etc.) to focus the user's attention on the fourth SR group representations that replaced the particular third SR group representation.

FIG. 5N illustrates a user input directed toward the presentation-Carl group representation 552B. In FIG. 5N, the user input includes the user touching the presentation-Carl group representation 552B with a single finger of the user's right hand.

FIG. 5O illustrates the SR volumetric environment 500 of FIG. 5N in response to detecting the user input directed toward the presentation-Carl group representation 552B. In FIG. 5O, the presentation-Carl group representation 552B is replaced with a plurality of SR item representations 553A-553B. The SR item representations 553A-553B correspond to document files having a document-type metadata field and an author metadata field. In particular, each SR item representation 553A-553B corresponds to a document file having a document-type metadata field including a document-type metadata field value of "slide presentation" and an author metadata field including an author metadata field value of "Carl." The SR item representations 553A-553B include a first SR item representation 553A corresponding to a document file entitled "one.ppt" and a second SR item representation 553B corresponding to a document file entitled "two-.ppt."

Although other fourth SR group representations 552A-552C are not displayed in FIG. 5O, in various implementations, in response to a user input directed toward a particular fourth SR group representation, the other fourth SR group representations are displayed (in the same locations or at different locations to make room for the SR item representations).

FIG. 5O illustrates a user input directed toward the second SR item representation 553B. In FIG. 5O, the user input includes the user touching the second SR item representation 553B with a single finger of the user's right hand.

Figure 5P:
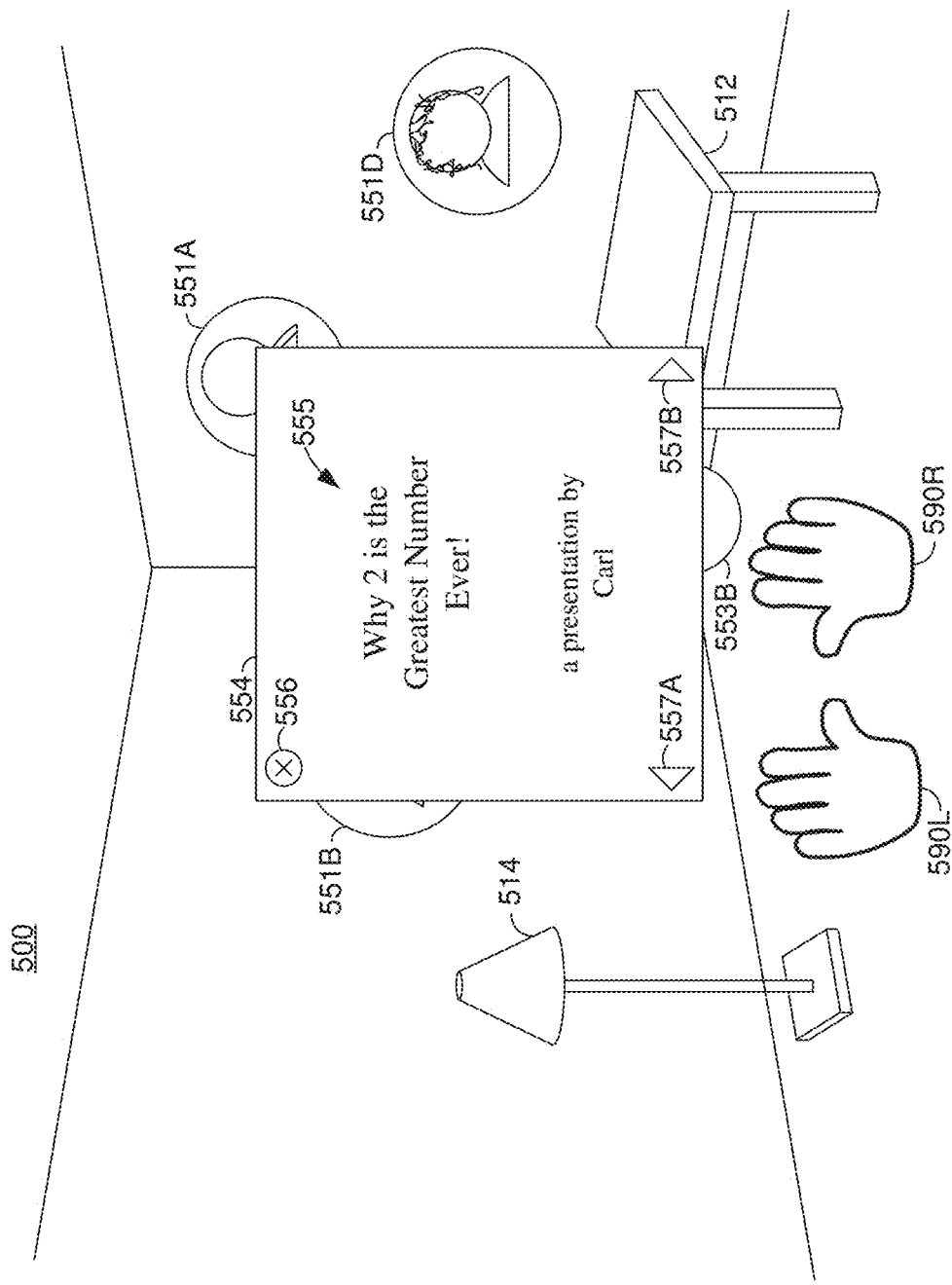

FIG. 5P illustrates the SR volumetric environment 500 of FIG. 5O in response to detecting the user input directed toward the second SR item representation 553B. The SR volumetric environment 500 of FIG. 5P includes another virtual object, a slide presentation display window 554 including a portion of the content 555 of the document file entitled "two.ppt," navigation affordances 557A-557B for navigating through the content of the document file entitled "two.ppt," and a close affordance 556 which, when selected via a user input, dismisses the slide presentation display window 554.

Figure 6A:
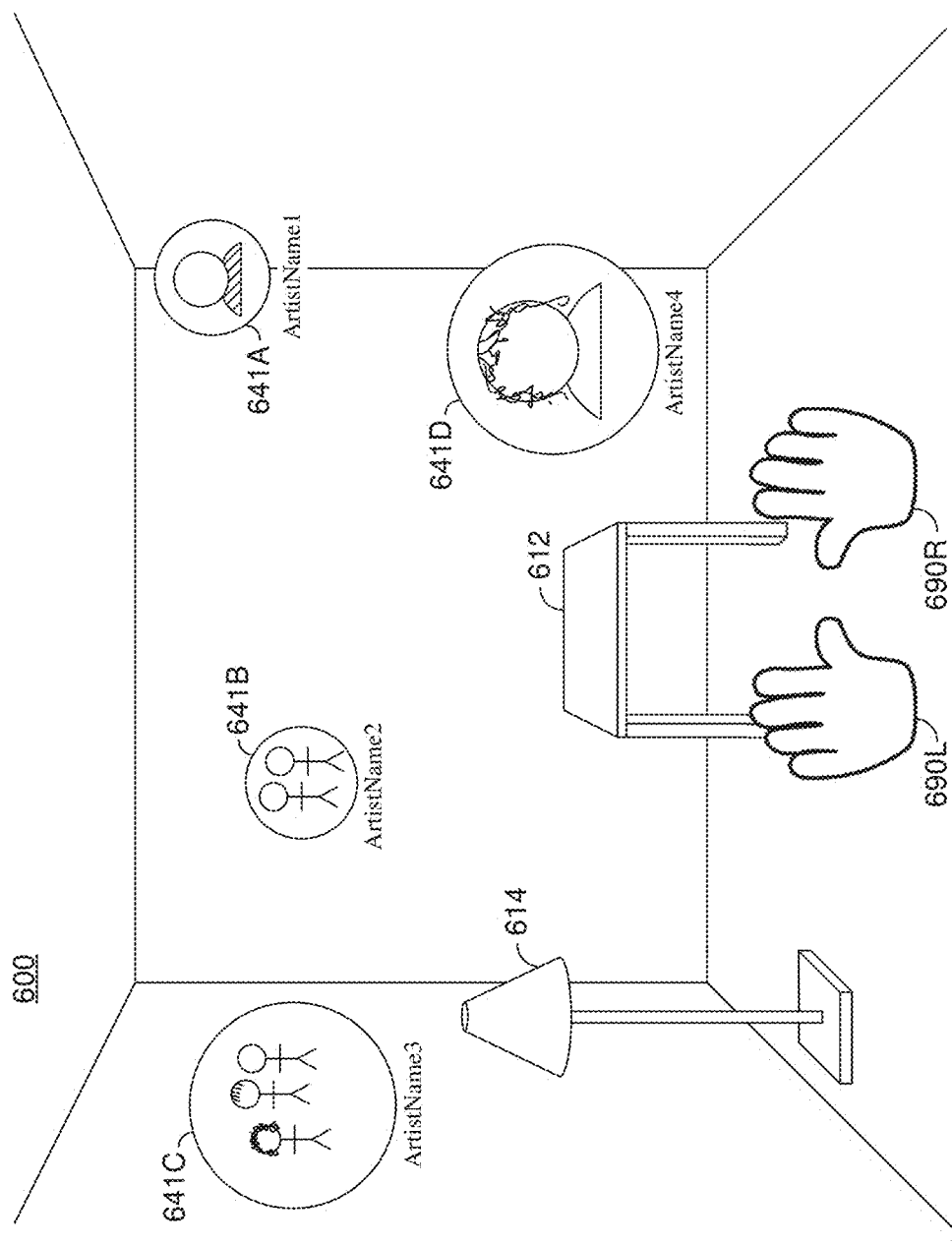

FIG. 6A illustrates a SR volumetric environment 600 from the perspective of the user in accordance with some implementations. The SR volumetric environment 600 includes a plurality of objects. The plurality of object in the SR volumetric environment 600 includes a plurality of real objects, such as a table 612 and a lamp 614 corresponding to a real table and lamp of the real environment. The real objects further include a left hand 690L and a right hand 690R corresponding to the left and right hand of the user. The plurality of objects in the SR volumetric environment 600 include a plurality of virtual objects, such as a plurality of first SR group representations 641A-641D.

The first SR group representations 641A-641D correspond to groups of audio files having an artist metadata field and an album metadata field. Respective first SR group representations 641A-641D correspond to respective artist metadata field values. In various implementations, the first SR group representations 641A-641D are displayed with indicia of the respective artist metadata field values, such as a picture of the artist of the audio files and/or text indicating the artist metadata field value.

The first SR group representations 641A-641D include an ArtistName1 group representation 641A corresponding to a group of audio files having an artist metadata field including a value of "ArtistName1." The first SR group representations 641A-641D include an ArtistName2 group representation 641B corresponding to a group of audio files having an artist metadata field including a value of "ArtistName2." The first SR group representations 641A-641D include an ArtistName3 group representation 641C corresponding to a group of audio files having an artist metadata field including a value of "ArtistName3." The first SR group representations 641A-641D include an ArtistName4 group representation 641D corresponding to a group of audio files having an artist metadata field including a value of "ArtistName4."

Figure 6B:
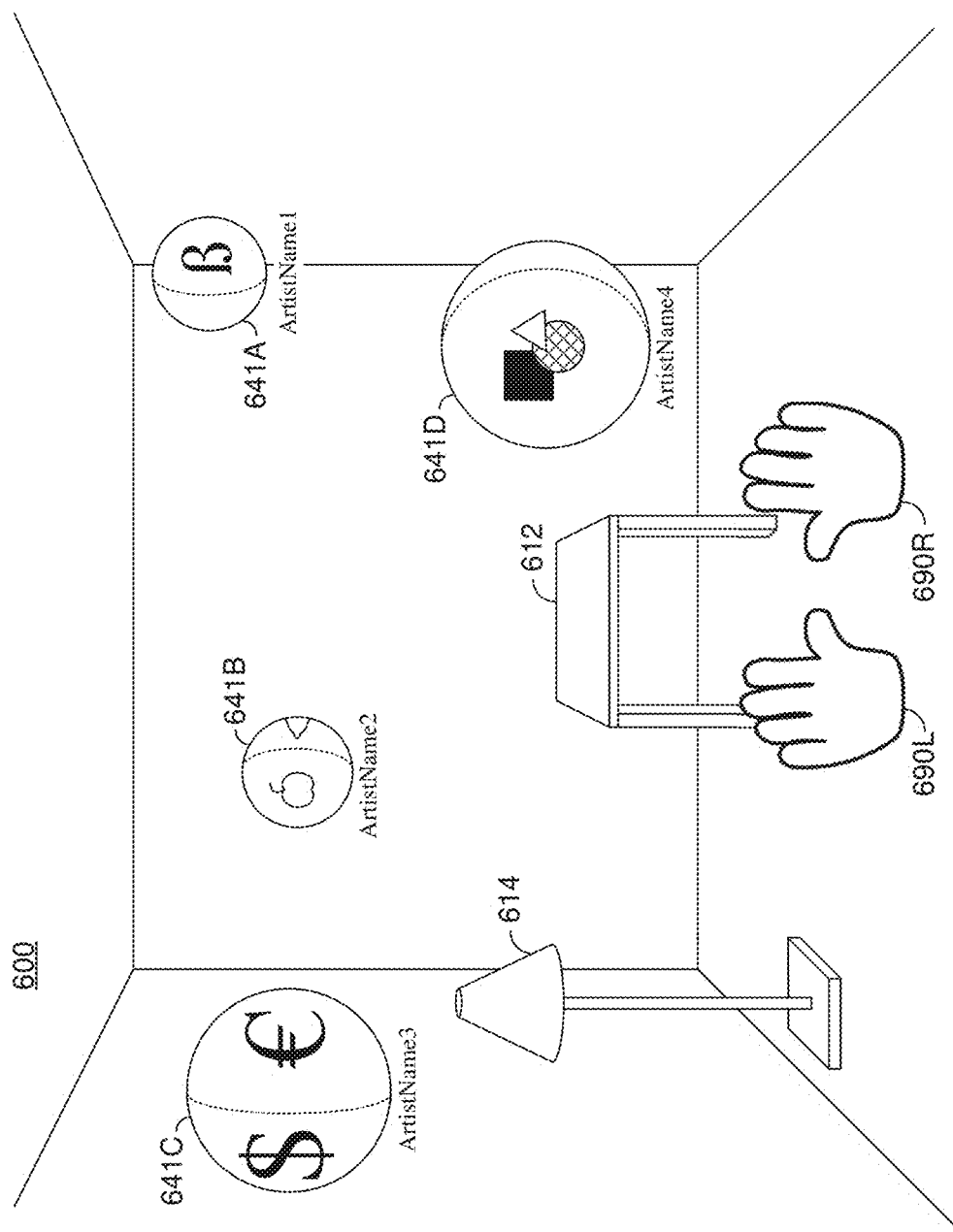

FIG. 6B illustrates the SR volumetric environment 600 of FIG. 6A in which the first SR group representations 641A-641D are displayed as rotating orbs with indicia of the respective artist metadata field values in the form of a plurality of indicia of respective album metadata field values (e.g., album covers) associated with the artist metadata field value. Accordingly, at various different times, the field of view of the user includes first SR group representations 641A-641D displaying various different album covers.

Figure 6C:
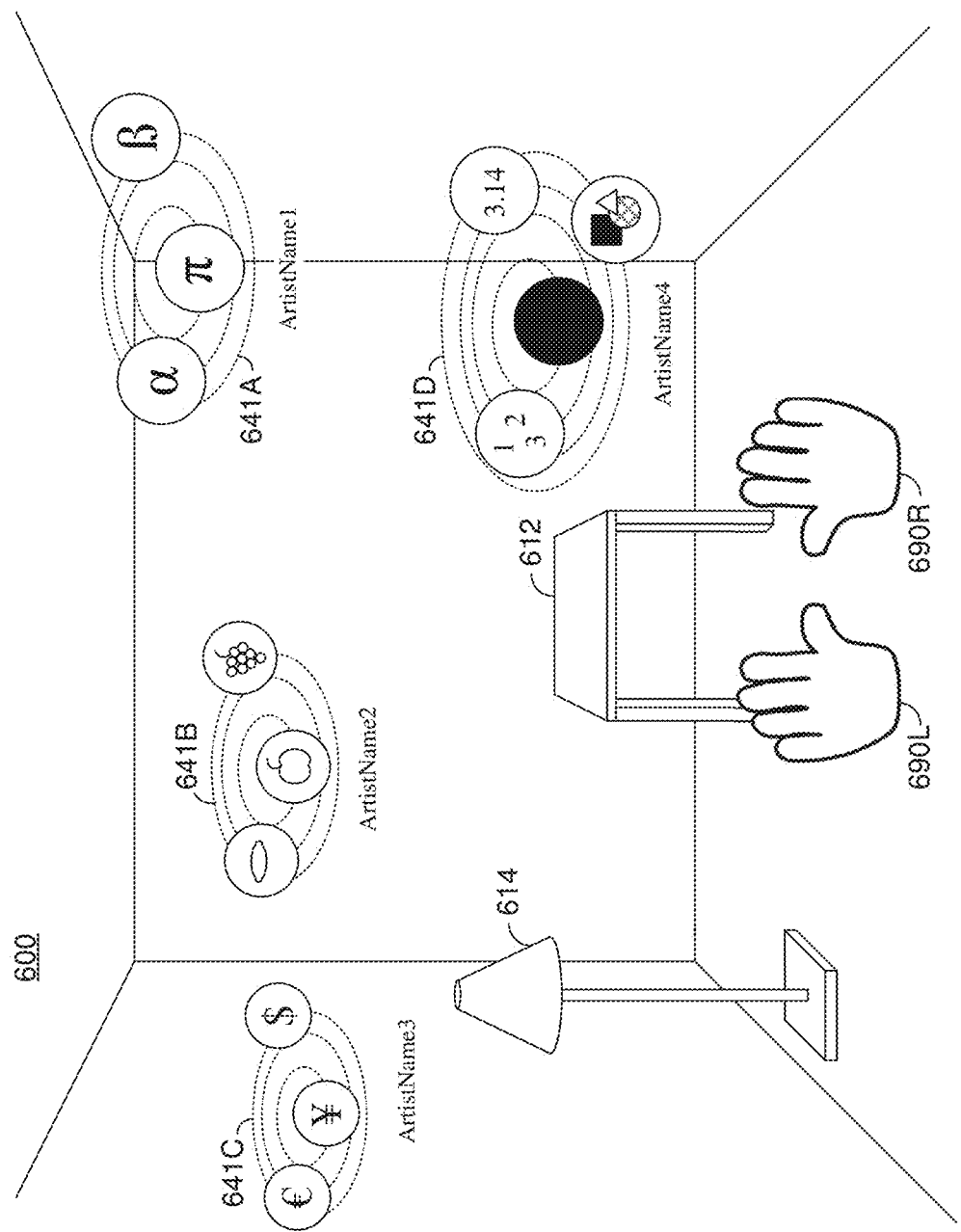

FIG. 6C illustrates the SR volumetric environment 600 of FIG. 6A in which the first SR group representations 641A-641D are displayed with indicia of the respective artist metadata field values in the form of a plurality of indicia of respective album metadata field values (e.g., album covers) associated with the artist metadata field value rotating around a center (which, in various implementations, includes an additional indicia of the respective artist metadata field value such as an artist photo and/or text indicating the artist metadata field value). Thus, the first SR group representations 641A-641D appear as "solar systems" in which the planets are album covers and the sun (if one is present) is an artist photo.

Figure 6D:
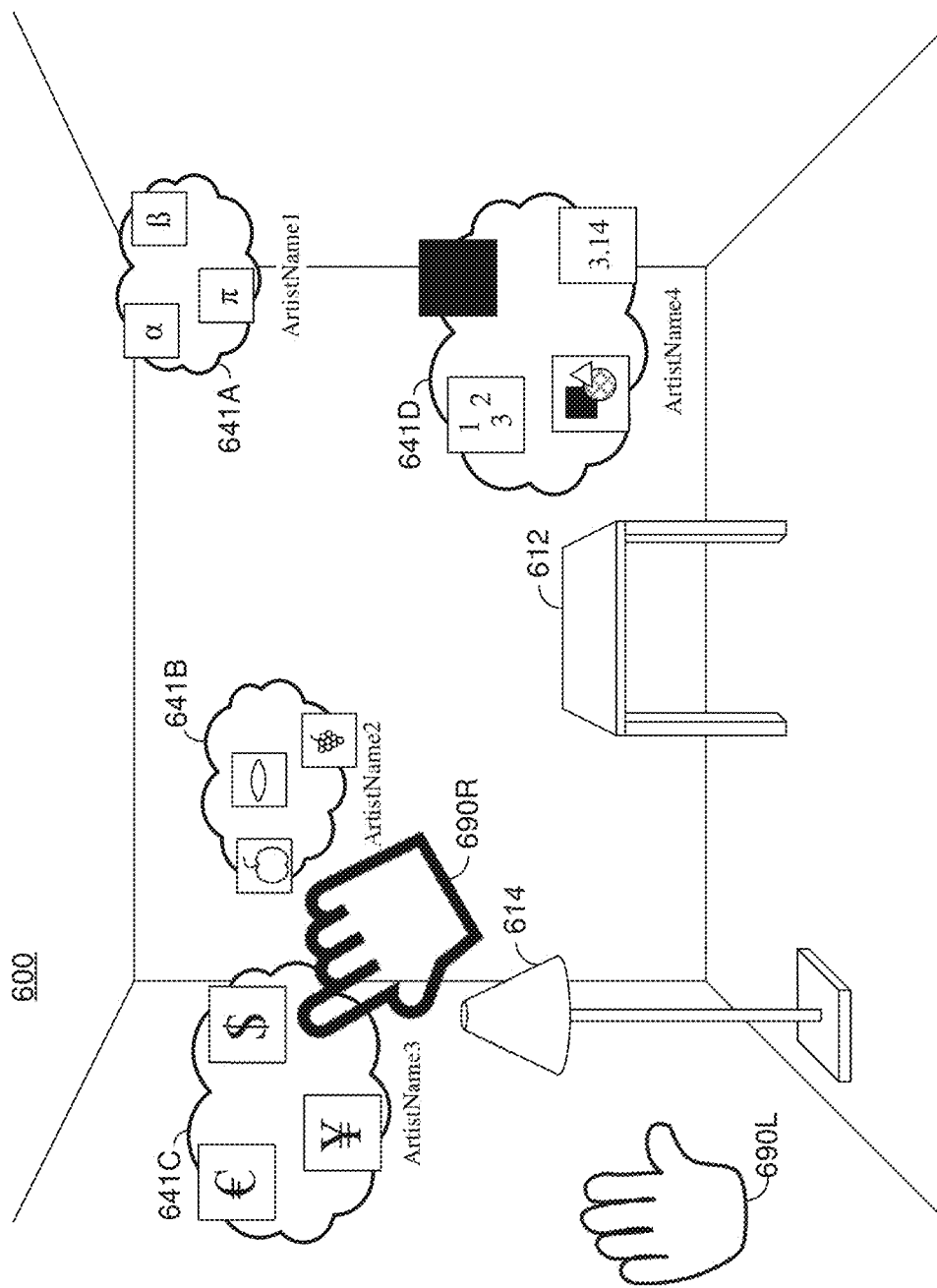

FIG. 6D illustrates the SR volumetric environment 600 of FIG. 6A in which the first SR group representations 641A-641D are displayed with indicia of the respective artist metadata field values in the form of a plurality of indicia of respective album metadata field values (e.g., album covers) associated with the artist metadata field value in a cloud (which, in various implementations, also includes an additional indicia of the respective artist metadata field value such as an artist photo and/or text indicating the artist metadata field value).

FIG. 6D illustrates a user input directed toward the ArtistName3 group representation 641C. In FIG. 6D, the user input includes the user touching the ArtistName3 group representation 641C with a single finger of the user's right hand. Whereas the user input directed toward the ArtistName3 group representation 641C includes touching the ArtistName3 group representation 641C in FIG. 6D, other types of user inputs selecting an SR group representation are described further below.

Figure 6E:
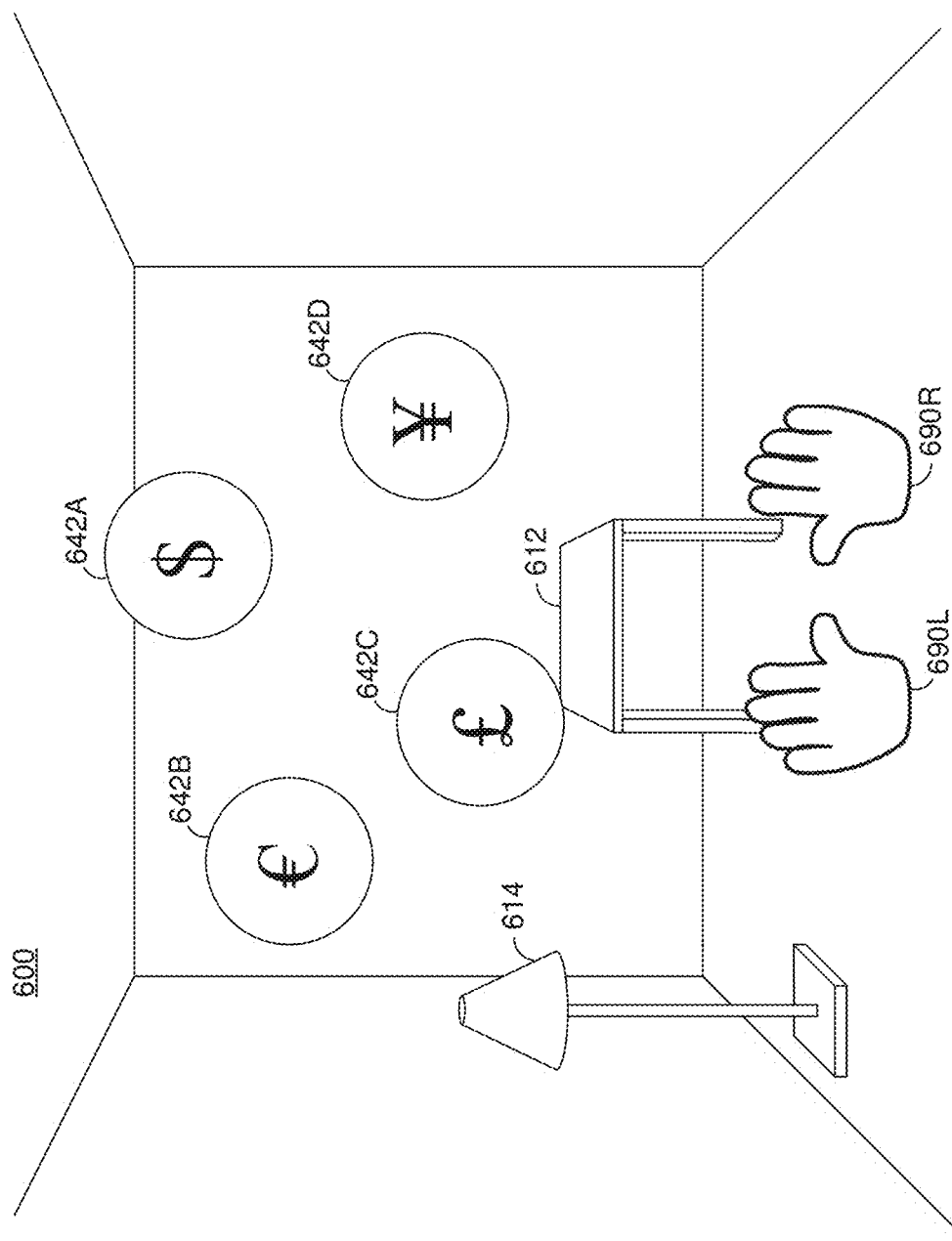

FIG. 6E illustrates the volumetric environment 600 of FIG. 6D in response to detecting the user input directed toward the ArtistName3 group representation 641C. In FIG. 6E, the ArtistName3 group representation 641C is replaced with a plurality of second SR group representations 642A-642D. Like the first SR group representations 641A-641D, the second SR group representations 642A-642D correspond to groups of audio files having an artist metadata field and an album metadata field. The second SR group representations 642A-642D correspond to groups of audio files including an artist metadata field value of "ArtistName3" (and different values in the album metadata field).

Respective second SR group representations 642A-642D correspond to respective album metadata field values (and a selected one of the artist metadata field values). In various implementations, the second SR group representations 642A-642D are displayed with indicia of the respective album metadata field values, such as an album cover.

Thus, the second SR group representations 642A-642D include an AlbumName1 group representation 642A corresponding to a group of audio files having an artist metadata field including a value of "ArtistName3" and an album metadata field having an album metadata field value of "AlbumName1." The second SR group representations 642A-642D include an AlbumName2 group representation 642B corresponding to a group of audio files having an artist metadata field including a value of "ArtistName3" and an album metadata field having an album metadata field value of "AlbumName2." The second SR group representations 642A-642D include an AlbumName3 group representation 642C corresponding to a group of audio files having an artist metadata field including a value of "ArtistName3" and an album metadata field having an album metadata field value of "AlbumName3." The second SR group representations 642A-642D include an AlbumName4 group representation 642D corresponding to a group of audio files having an artist metadata field including a value of "ArtistName3" and an album metadata field having an album metadata field value of "AlbumName4."

Although other first SR group representations 641A-641C are not displayed in FIG. 6E, in various implementations, in response to a user input directed toward a particular first SR group representation, the other SR group representations are displayed in the same manner or a different manner (e.g., smaller, further away, grayed out, more transparent, etc.) to focus the user's attention on the second SR group representations that replaced the particular first SR group representation.

In various implementations, replacing the first SR group representations 641A-641D with the second SR group representations 642A-642D includes displaying an animation in which the first SR group representations 641A-641D (which include indicia of associated album metadata field values, such as album covers) appear to explode into the second SR group representations 642A-642D. FIGS. 6F1-6F4 illustrate the SR volumetric environment 600 during an animation between FIG. 6E and FIG. 6F.

FIG. 6G illustrates the SR volumetric environment 600 of FIG. 6F with a user input directed toward the AlbumName4 group representation 642D. In FIG. 6G, the user input includes the user touching the AlbumName4 group representation 642D with a single finger of the user's right hand.

Figure 6H:
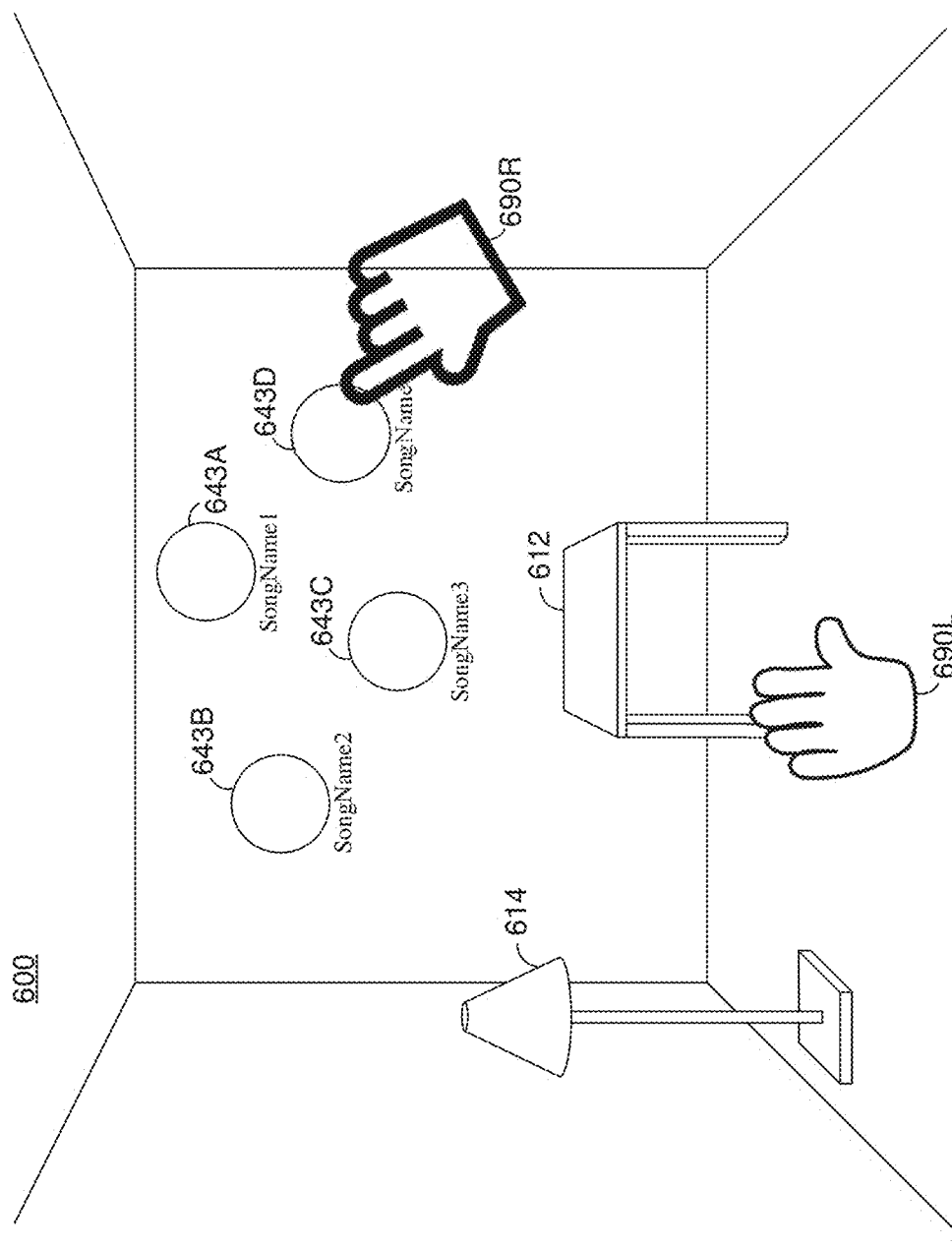

FIG. 6H illustrates the SR volumetric environment 600 of FIG. 6G in response to detecting the user input directed toward the AlbumName4 group representation 642D. In FIG. 6H, the AlbumName4 group representation 642D is replaced with a plurality of SR item representations 643A-643D. The SR item representations 643A-643D correspond to audio files (e.g., songs) having an artist metadata field and an album metadata field. In particular, each SR item representation 643A-643D corresponds to an audio file having an artist metadata field including an artist metadata field value of "ArtistName3" and an album metadata field including an album metadata field value of "AlbumName4." The SR item representations 643A-643D include a first SR item representation 643A corresponding to an audio file entitled "SongName1," a second SR item representation 643B corresponding to an audio file entitled "SongName2," a third SR item representation 643C corresponding to an audio file entitled "SongName3," and a fourth SR item representation 643D corresponding to an audio file entitled "SongName4."

Although other second SR group representations are not displayed in FIG. 6H, in various implementations, in response to a user input directed toward a particular second SR group representation, the other SR group representations are displayed (in the same locations or at different locations to make room for the SR item representations).

FIG. 6H illustrates a user input directed toward the fourth SR item representation 643D. In FIG. 6H, the user input includes the user touching the fourth SR item representation 643D with a single finger of the user's right hand. In response to detecting the user input directed toward the fourth SR item representation, the audio file is played (e.g., on a speaker of the HMD worn by the user).

Whereas certain user inputs to select a SR group representation are described above (e.g., touching an orb in FIG.

5F or touching a cloud in FIG. 6D), other user inputs to select an SR group representation are described below.

Figure 7A:
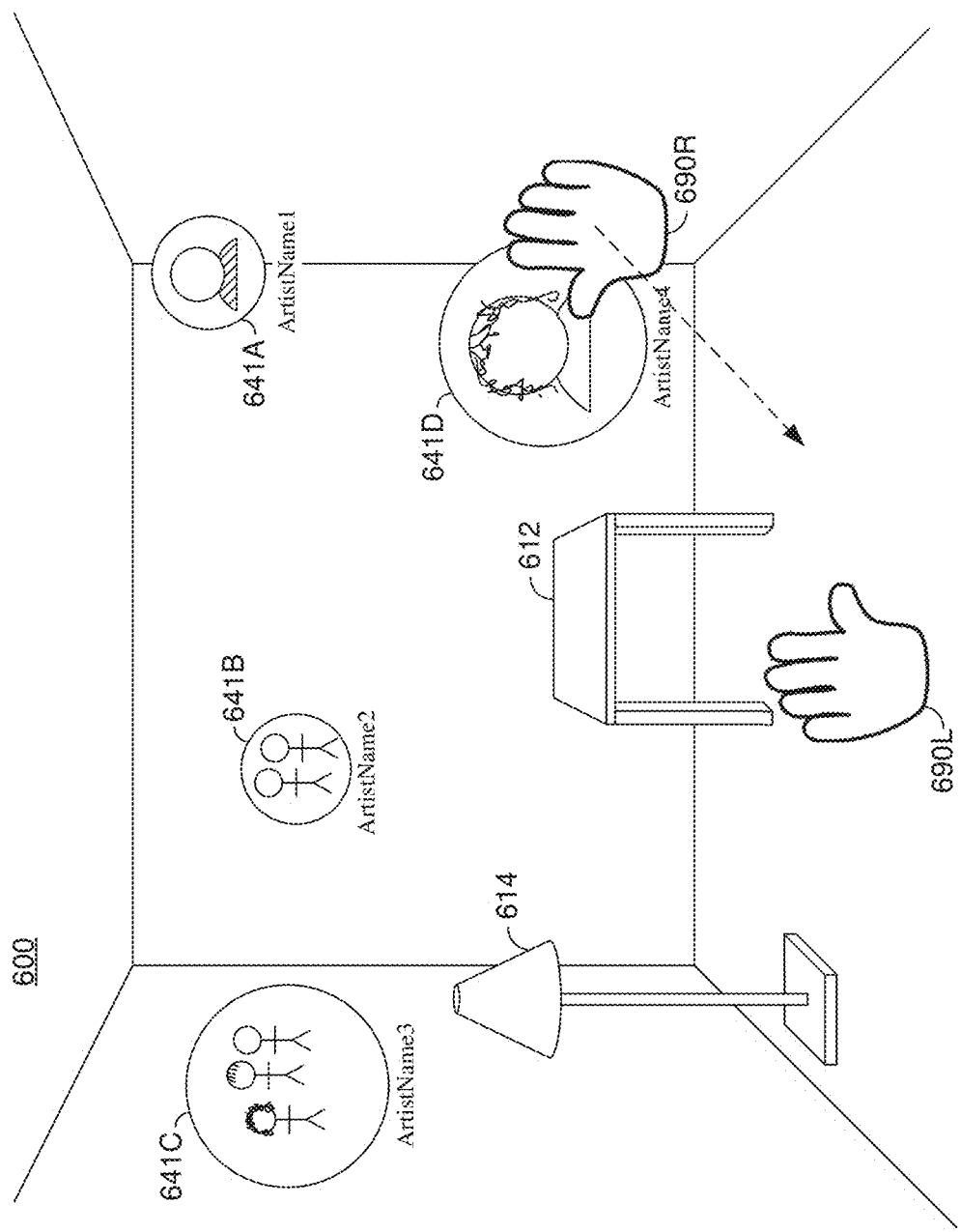
FIGS. 7A-7C illustrate an SR volumetric environment in which an SR group representation is selected by drawing the SR group representation towards the user in accordance with some implementations.

FIG. 7A illustrates the SR volumetric environment 600 of FIG. 6A with a user input directed toward the ArtistName4 group representation 641D. In FIG. 7A, the user input includes the user grabbing the ArtistName4 group representation 641D with the user's right hand and moving it towards the user.

Figure 7B:
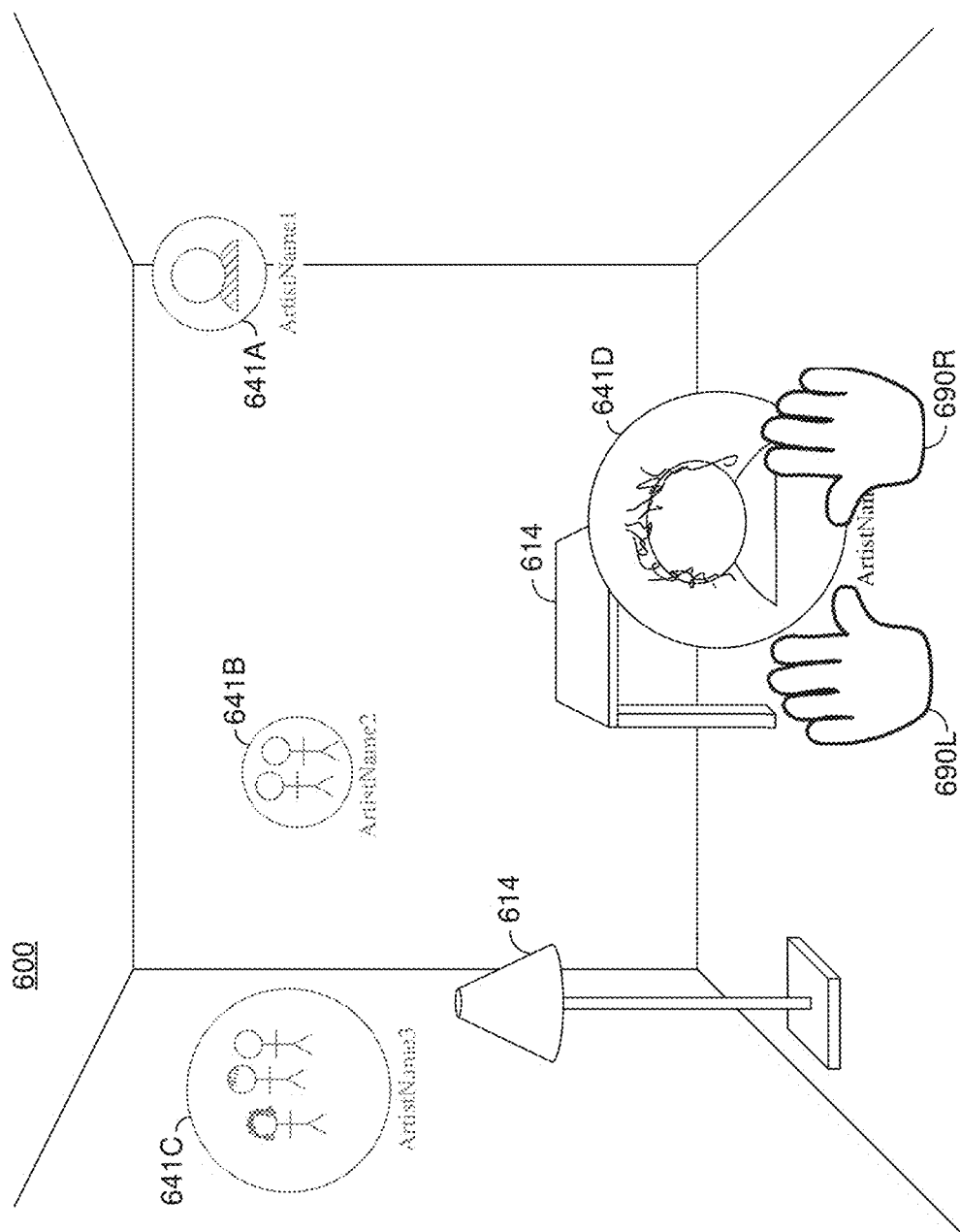

FIG. 7B illustrates the SR volumetric environment 600 of FIG. 7A after a first portion of the user input directed toward with the ArtistName4 group representation 641D. In FIG. 7B, the ArtistName4 group representation 641D is moved from its initial location in the SR volumetric environment 600 to a location proximate to the location of the user. Accordingly, the ArtistName4 group representation 641D appears enlarged in the field-of-view of the user as compared to FIG. 7A. Further, others of the first SR group representations 641A-641C are faded.

Figure 7C:
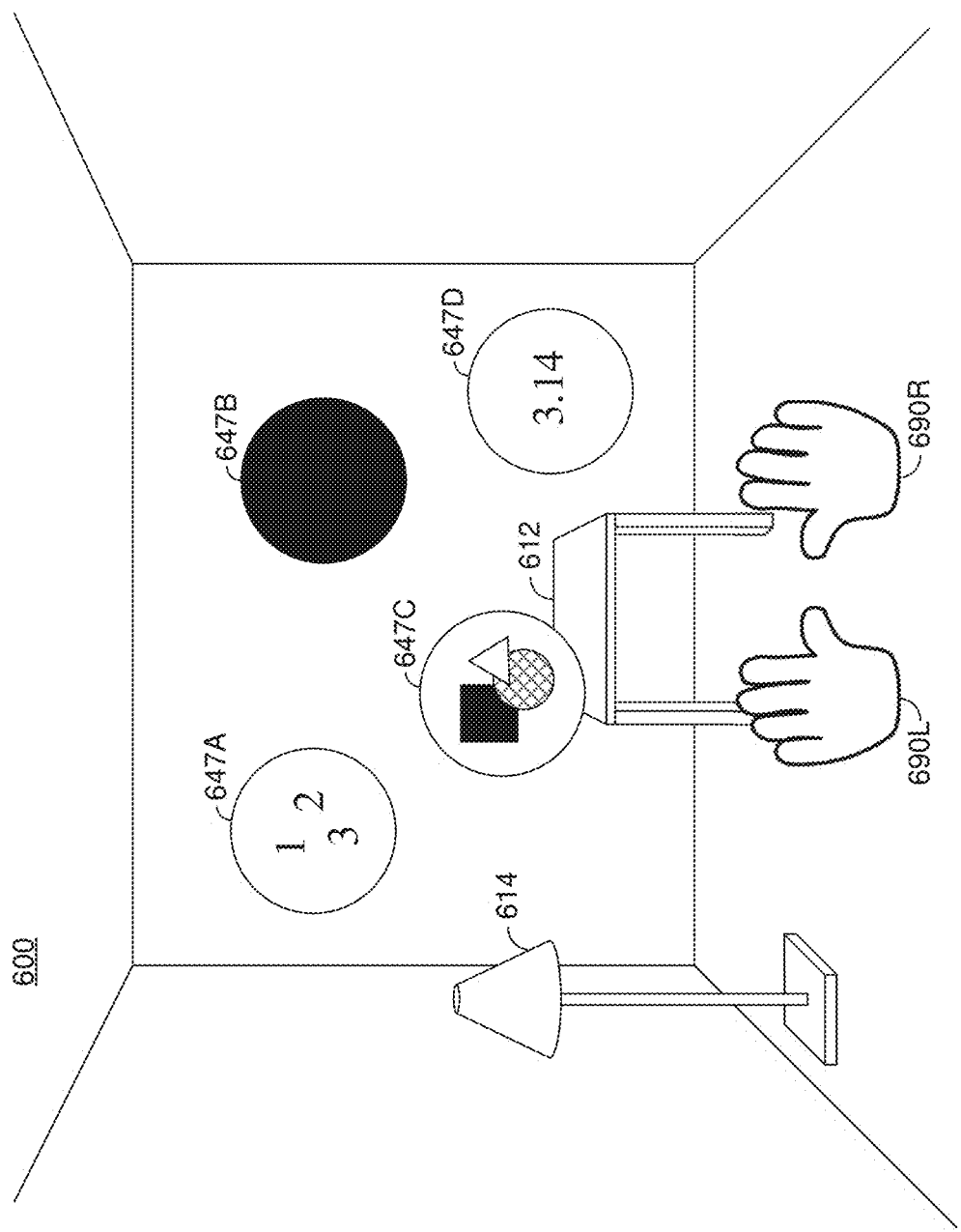

FIG. 7C illustrates the SR volumetric environment 600 of FIG. 7B after a second portion of the user input directed toward the ArtistName4 group representation 641D. In FIG. 7C, in response to the location of the ArtistName4 group representation 641D being within a threshold distance to the location of the user, the ArtistName4 group representation 641D is replaced with a plurality of second SR group representations 647A-647D. Like the first SR group representations 641A-641D, the second SR group representations 647A-647D correspond to groups of audio files having an artist metadata field and an album metadata field. The second SR group representations 647A-647D correspond to groups of audio files including an artist metadata field value of "ArtistName4" (and different values in the album metadata field).

Figure 8A:
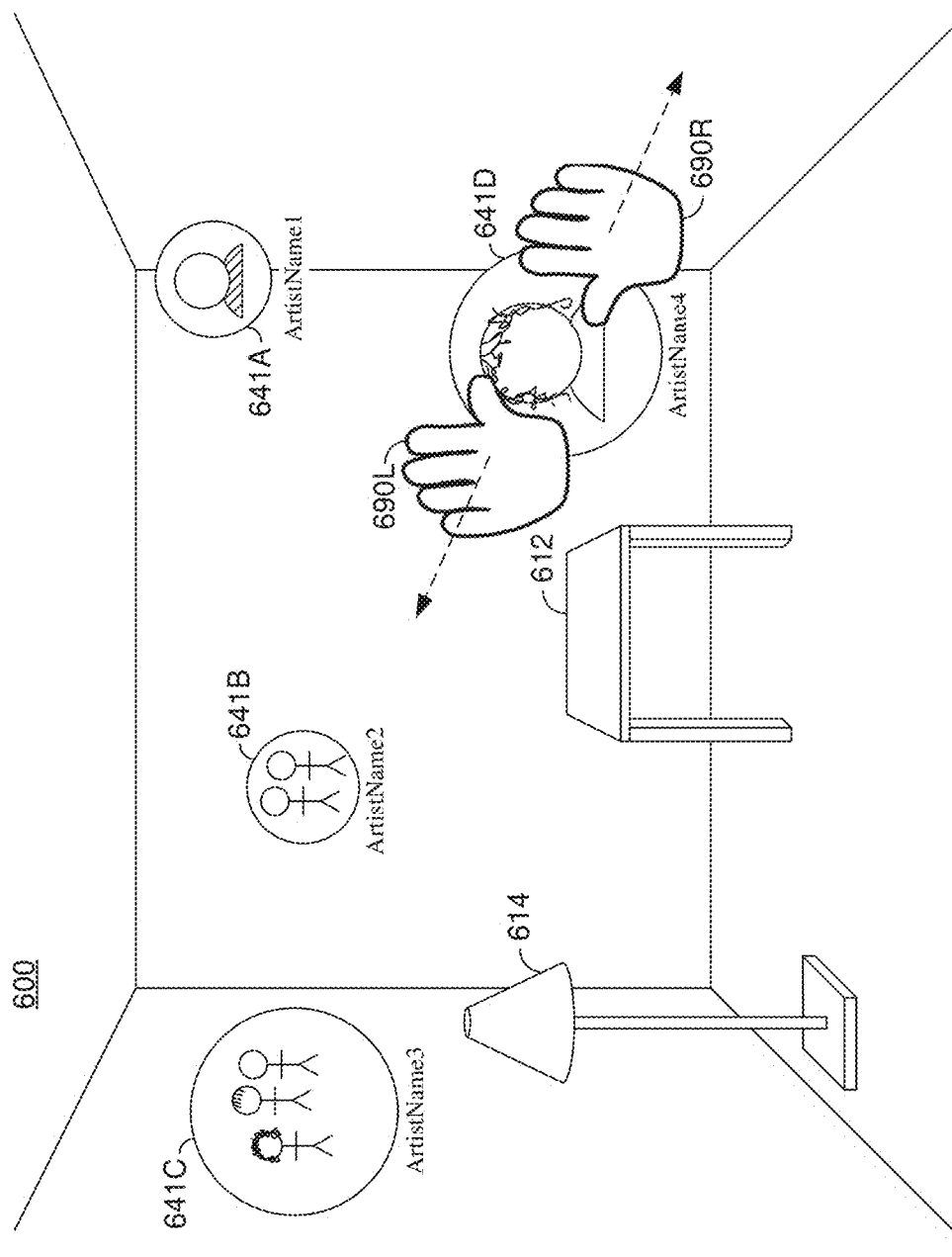

FIG. 8A illustrates the SR volumetric environment 600 of FIG. 6A with a user input directed toward the ArtistName4 group representation 641D. In FIG. 8A, the user input includes the user pulling apart (or spreading) the ArtistName4 group representation 641D with the user's left hand and the user's right hand. In various implementations, the pull-apart gesture can be performed as a de-pinch gesture with a single hand of the user (in which the finger and thumb of the user are spread apart while at a location of the ArtistName4 group representation 641D).

Figure 8B:
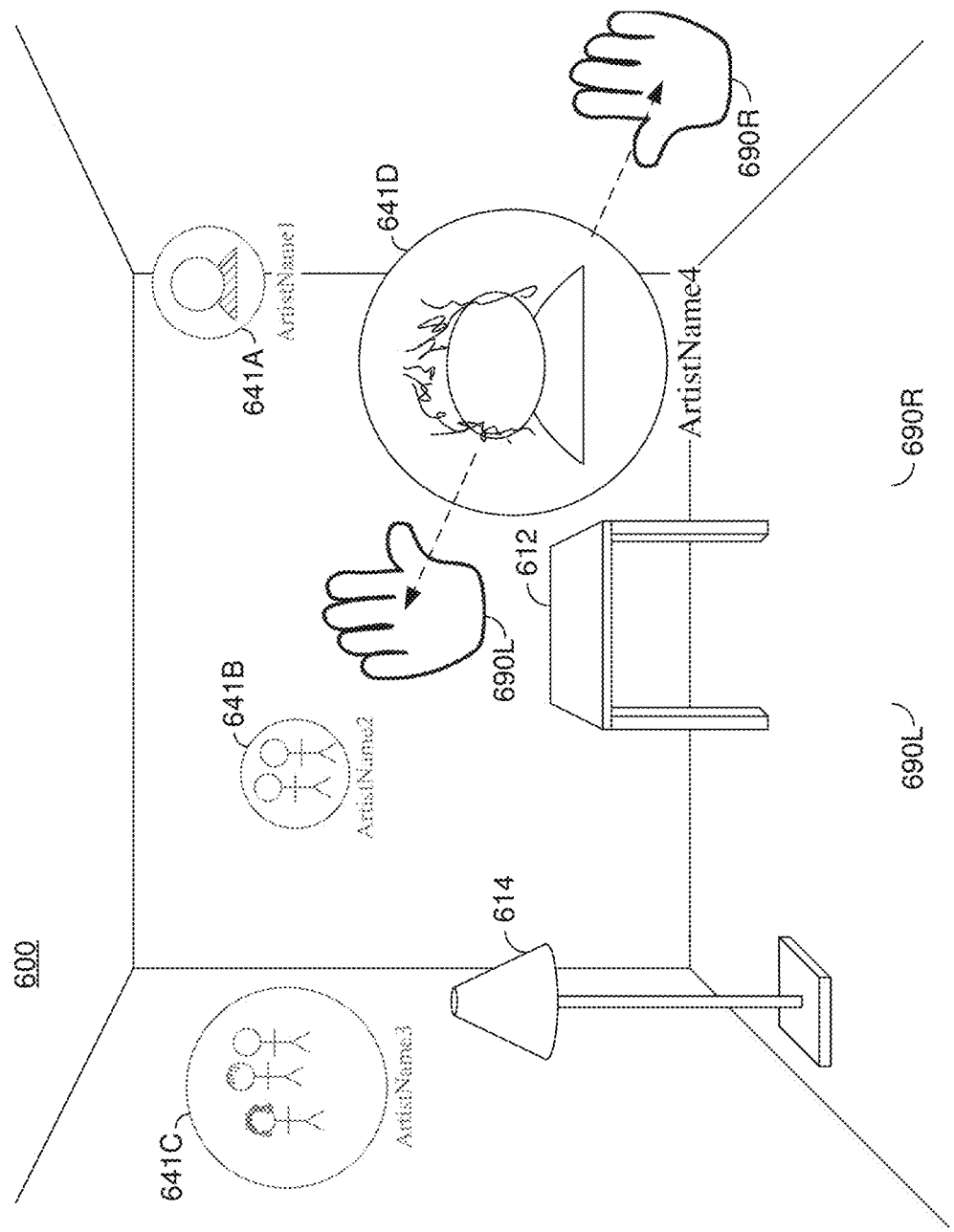

FIG. 8B illustrates the SR volumetric environment 600 of FIG. 8A after a first portion of the user input directed toward with the ArtistName4 group representation 641D. In FIG. 8B, the ArtistName4 group representation 641D is enlarged at its initial location in the SR volumetric environment 600. Further, others of the first SR group representations 641A-64C are faded.

Figure 8C:
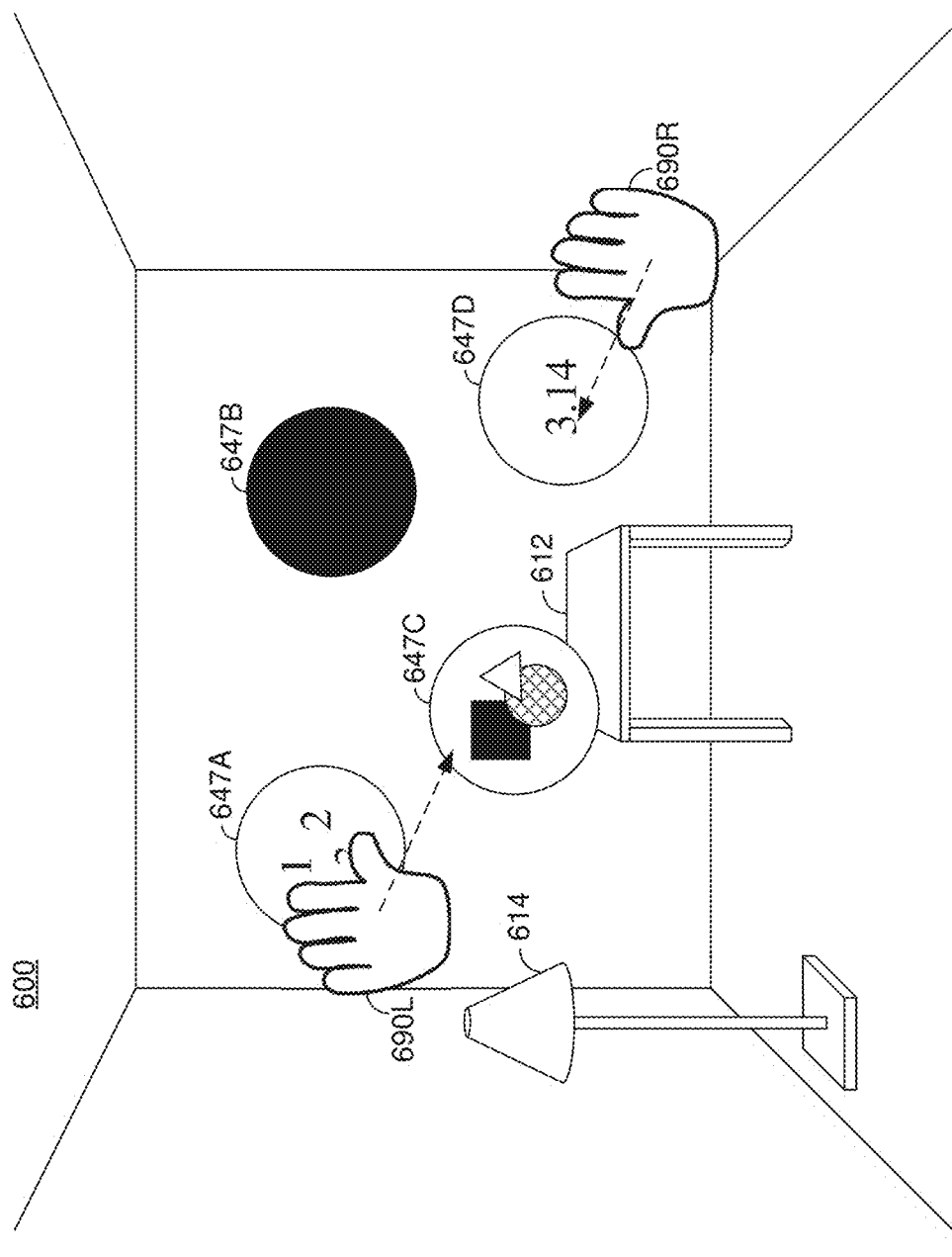

FIG. 8C illustrates the SR volumetric environment 600 of FIG. 8B after a second portion of the user input directed toward the ArtistName4 group representation 641D. In FIG. 8C, in response to the user's left hand and the user's right hand being more than a threshold distance apart, the ArtistName4 group representation 641D is replaced with a plurality of second SR group representations 647A-647D. Like the first SR group representations 641A-641D, the second SR group representations 647A-647D correspond to groups of audio files having an artist metadata field and an album metadata field. The second SR group representations 647A-647D correspond to groups of audio files including an artist metadata field value of "ArtistName4" (and different values in the album metadata field).

FIG. 8C illustrates a user input directed towards the plurality of second SR group representations 647A-647D. In FIG. 8C, the user input includes the user squishing (or de-spreading) the plurality of second SR group representations 647A-647D with the user's left hand and the user's right hand.

Figure 8D:
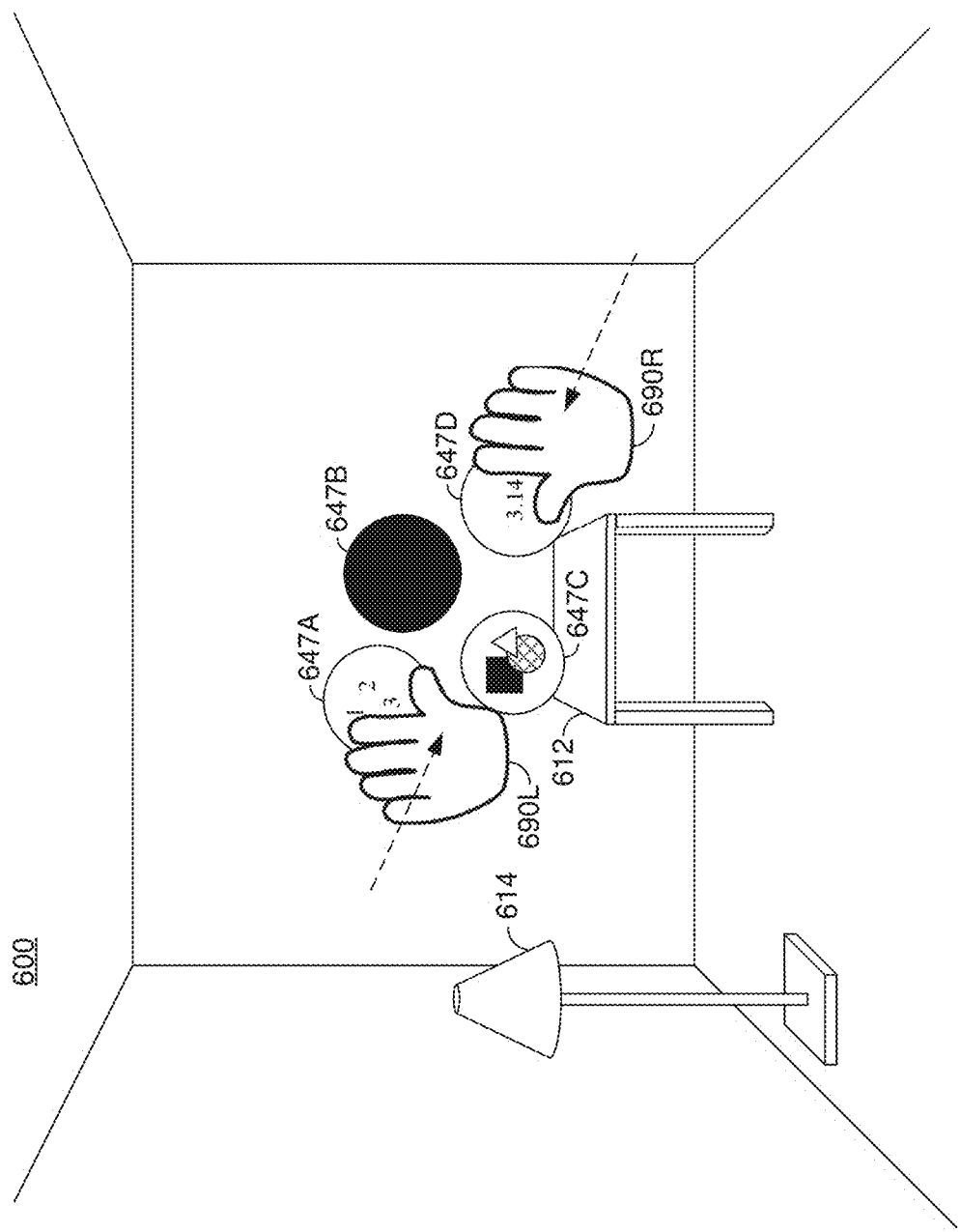

FIG. 8D illustrates the SR volumetric environment 600 of FIG. 8C after a first portion of the user input directed toward the plurality of second SR group representations 647A-647D. In FIG. 8D, the plurality of second SR group representations 647A-647D are moved towards each other.

FIG. 8E illustrates the SR volumetric environment 600 of FIG. 8D after a second portion of the user input directed toward the plurality of SR group representations 647A-647D. In FIG. 8E, in response to the user's left hand and the user's right hand being less than a threshold distance apart, the plurality of second SR group representations 647A-647D are replaced with the ArtistName4 group representations 641D (and the other first SR group representations 641A-641C are redisplayed).

Figure 9A:
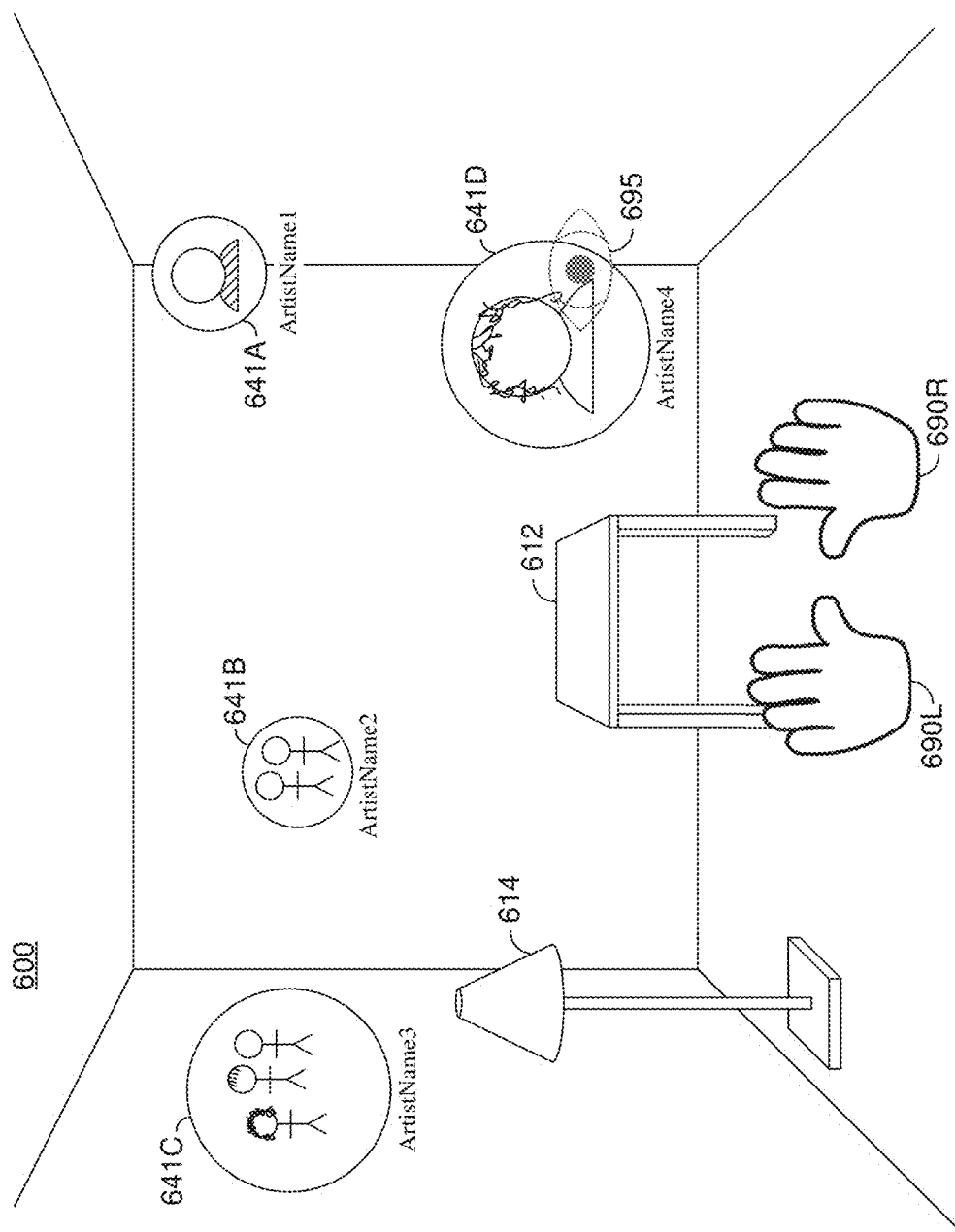

FIG. 9A illustrates the SR volumetric environment 600 of FIG. 6A with a user input directed toward the ArtistName4 group representation 641D. In FIG. 9A, the user input includes the user looking at the ArtistName4 group representation 641D and performing a trigger gesture (e.g., winking, blinking, pressing a button, snapping fingers, etc.). The gaze point of the user is illustrated in FIG. 9A by a gaze point indicator 695 which, depending on the implementation, may or may not be displayed.

FIG. 9B illustrates the SR volumetric environment 600 of FIG. 9A in response to detecting the user input directed toward the ArtistName4 group representation 641D. In FIG. 9B, the ArtistName4 group representation 641D is replaced with a plurality of second SR group representations 647A-647D. Like the first SR group representations 641A-641D, the second SR group representations 647A-647D correspond to groups of audio files having an artist metadata field and an album metadata field. The second SR group representations 647A-647D correspond to groups of audio files including an artist metadata field value of "ArtistName4" (and different values in the album metadata field).

FIG. 10A illustrates the SR volumetric environment 600 of FIG. 6A with a user input directed toward the ArtistName4 group representation 641D. In FIG. 10A, the user input includes the user moving within the SR volumetric environment 600 towards the ArtistName4 group representation 641D.

FIG. 10B illustrates the SR volumetric environment 600 of FIG. 10A after the user input directed toward the ArtistName4 group representation 641D. In FIG. 10B, in response to the user's being less than a threshold distance from the ArtistName4 group representation 641D, the ArtistName4 group representation 641D is replaced with a plurality of second SR group representations 647A-647D. Like the first SR group representations 641A-641D, the second SR group representations 647A-647D correspond to groups of audio files having an artist metadata field and an album metadata field. The second SR group representations 647A-647D correspond to groups of audio files including an artist metadata field value of "ArtistName4" (and different values in the album metadata field).

FIG. 11A illustrates a SR volumetric environment 700 from the perspective of the user in accordance with some implementations. The SR volumetric environment 700 of FIG. 11A is substantially similar to the SR volumetric environment 600 of FIG. 6A, but lacks a ArtistName4 group representation 641D. Accordingly, the SR volumetric environment 700 includes a plurality of objects. The plurality of object in the SR volumetric environment 700 includes a plurality of real objects, such as a table 712 and a lamp 714 corresponding to a real table and lamp of the real environment. The real objects further include a left hand 790L and a right hand 790R corresponding to the left and right hand of the user. The plurality of objects in the SR volumetric environment 700 include a plurality of virtual objects, such as a plurality of first SR group representations 741A-741C.

The first SR group representations 741A-741C correspond to groups of audio files having an artist metadata field and an album metadata field. Respective first SR group representations 741A-741C correspond to respective artist metadata field values. In various implementations, the first SR group representations 741A-741C are displayed with indicia of the respective artist metadata field values, such as a picture of the artist of the audio files and/or text indicating the artist metadata field value.

In various implementations, the first SR group representations 741A-741C emit sound from their respective locations in the SR volumetric environment 700. Recognizing that the first SR group representations 741A-741C are virtual objects, the phrase "emit sound" and similar phrasing is used herein as shorthand for "seem to emit sound." For example, a virtual object emits sound when a speaker within an HMD generates a real sound to emulate a sound that would be emitted from the virtual object if it were a real object at its location in the real environment. In various implementation, when an object emits sound from a location in the SR volumetric environment 700, the volume of the sound is based on the distance between the user and the location of the object in the SR volumetric environment. In various implementations, when an object emits sounds from a location in the SR volumetric environment 700, the sound reaches two ears of the user at different times to indicate the angle (relative to the user) from which the sound is emitted.

Thus, when SR group representations are not within the current field of view of the user (such as the SR group representations 440E-440G of FIG. 4), the user is made aware of the presence of the SR group representations in the SR volumetric environment.

In various implementations, when the SR group representations represent groups of audio files, the sound emitted by the SR group representation is at least portion of the audio data of one of the audio files. For example, when an SR group representation represents a group of audio files of songs by an artist, the sound emitted by the SR group representation is one of the songs by the artist.

When multiple SR group representations are present in the SR volumetric environment, the different sounds emitted by different SR group representations have the potential to produce a discordant cacophony. Accordingly, in various implementations, the sounds emitted by different SR group representations are selected (and, optionally, processed) to reduce the discordance.

In FIG. 11A, the first SR group representations 741A-741C include an ArtistName1 group representation 741A corresponding to a group of audio files having an artist metadata field including a value of "ArtistName1" that emits sound corresponding to a first audio file having an artist metadata field including a value of "ArtistName1." The first SR group representations 741A-741C include an ArtistName2 group representation 741B corresponding to a group of audio files having an artist metadata field including a value of "ArtistName2" that emits sound corresponding to a second audio file having an artist metadata field including a value of "ArtistName2." The first SR group representations 741A-741C include an ArtistName3 group representation 741C corresponding to a group of audio files having an artist metadata field including a value of "ArtistName3" that emits sound corresponding to a third audio file having an artist metadata field including a value of "ArtistName3."

In various implementations, the first audio file is selected at random. In various implementations, the second audio file is selected based on the first audio file. In various implementations, the second audio file is selected to reduce discordance between the first audio file and the second audio file. In various implementations, the second audio file is based on audio data of first audio file and the second audio file, such as the key, rhythm, or tempo of the audio data. In various implementations, the second audio file is based on metadata of the first audio file and the second audio file, such as song title or genre.

In various implementations, the second audio file is selected based on the key of the first audio file and the second audio file. For example, in various implementations, the second audio file is more likely to be selected (from the group of audio files having an artist metadata field including a value of "ArtistName2") if the second audio file has the same key as the first audio file, has a key close to the key of the first audio file (and can, thus, be easily processed to have the same key as the first audio file), or has a concordant key as the first audio file (e.g., off by a fifth).

In various implementations, the second audio file is selected based on the rhythm of the first audio file and the second audio file. For example, in various implementations, the second audio file is more likely to be selected (from the group of audio files having an artist metadata field including a value of "ArtistName2") if the second audio file has the same rhythm as the first audio file, has a rhythm close to the rhythm of the first audio file (and can, thus, be easily processed to have the same rhythm as the first audio file), or has a factor rhythm of the first audio file (e.g., half or double).

In various implementations, the second audio file is selected based on the tempo of the first audio file and the second audio file. For example, in various implementations, the second audio file is more likely to be selected (from the group of audio files having an artist metadata field including a value of "ArtistName2") if the second audio file has the same tempo as the first audio file or has a tempo close to the rhythm of the first audio file (and can, thus, be easily processed to have the same tempo as the first audio file), or has a factor tempo of the first audio file (e.g., half or double).

In various implementations, the second audio file is selected based on an instrumentation of the first audio file and the second audio file. For example, in various implementations, the second audio is more likely to be selected (from the group of audio files having an artist metadata field including a value of "ArtistName2") if the second audio file uses one or more of same instruments as the first audio file (e.g., guitar, violin, flute, electric bass, harp, etc.).

In various implementations, the second audio file is selected based on a sample common to the first audio file and the second audio file. For example, in various implementations, the second audio file is selected as one that includes a sample of the first audio file or a sample of the artist of the first audio file.

In various implementations, the second audio file is selected based on a title of the first audio file and the second audio file. For example, in various implementations, the second audio file is selected as one that has the same title of the first audio file. Thus, the second audio file may be a cover version of the first audio file. In various implementations, the second audio file is selected based on an artist of the first song and an accompanying artist of the second file. Thus, the second audio file may be a duet or collaboration between ArtistName2 and ArtistName1.

In various implementations, the second audio file is at least partially selected at random. Thus, the first audio file and the second audio file are not always the same two songs.

As noted above, in various implementations, the first audio file is selected (from the group of audio files having an artist metadata field including a value of "ArtistName1") at random. In various implementations, the first audio file and second audio file are selected together to find two audio files with matching characteristics. Thus, in various implementations, the first audio file is selected based on the second audio file.

In various implementations, the second audio file is processed or modified to reduce discordance between the first audio file and the second audio file. For example, in various implementations, the key and/or tempo of the second audio file is changed to better match that of the first audio file. Accordingly, in various implementations, sound corresponding to the second audio file is emitted by the ArtistName2 SR representation 741B based on the first audio file.

In various implementations, the third audio file is selected based on the first audio file and the second audio file. In various implementations, an SR group representation only emits sound when the distance between the user and the SR group representation in the SR volumetric environment 700 is less than a threshold amount.

FIG. 11A illustrates the user moving within the SR volumetric environment 700. FIG. 11B illustrates the SR volumetric environment 700 after the user has moved within the SR volumetric environment 700. The first SR group representations 741A-741C are displayed at the same locations in the SR volumetric environment 700 (but, potentially, at different locations on the display). Further, the distance between the user and the various first SR group representations 741A-741C has changed. Accordingly, the volume (and direction) of the sounds emitted by the first SR group representations 741A-741C is also changed.

Figure 12A:
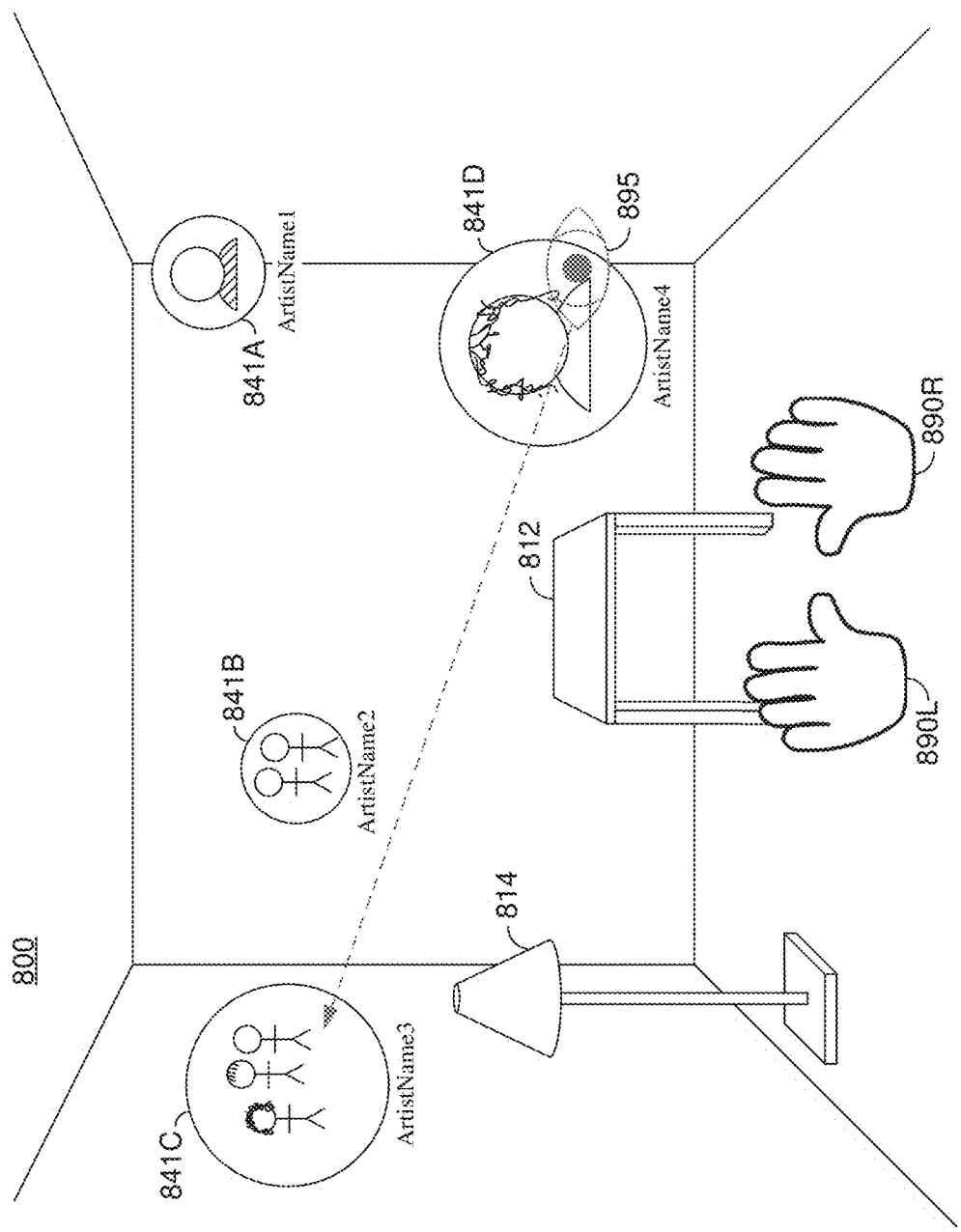

FIG. 12A illustrates a SR volumetric environment 800 from the perspective of the user in accordance with some implementations. The SR volumetric environment 800 of FIG. 12A is substantially similar to the SR volumetric environment 600 of FIG. 6A. The SR volumetric environment 800 includes a plurality of objects. The plurality of object in the SR volumetric environment 800 includes a plurality of real objects, such as a table 812 and a lamp 814 corresponding to a real table and lamp of the real environment. The real objects further include a left hand 890L and a right hand 890R corresponding to the left and right hand of the user. The plurality of objects in the SR volumetric environment 800 include a plurality of virtual objects, such as a plurality of first SR group representations 841A-841D.

The first SR group representations 841A-841D correspond to groups of audio files having an artist metadata field and an album metadata field. Respective first SR group representations 841A-841D correspond to respective artist metadata field values. In various implementations, the first SR group representations 841A-841D are displayed with indicia of the respective artist metadata field values, such as a picture of the artist of the audio files and/or text indicating the artist metadata field value.

The first SR group representations 841A-841D include an ArtistName1 group representation 841A corresponding to a group of audio files having an artist metadata field including a value of "ArtistName1." The first SR group representations 841A-841D include an ArtistName2 group representation 841B corresponding to a group of audio files having an artist metadata field including a value of "ArtistName2." The first SR group representations 841A-841D include an ArtistName3 group representation 841C corresponding to a group of audio files having an artist metadata field including a value of "ArtistName3." The first SR group representations 841A-841D include an ArtistName4 group representation 841D corresponding to a group of audio files having an artist metadata field including a value of "ArtistName4."

The gaze point of the user is illustrated in FIG. 12A by a gaze point indicator 895 which, depending on the implementation, may or may not be displayed. Accordingly, in FIG. 12A, the user is looking at the ArtistName4 group representation 841D. In various implementations, when the user is looking at a first SR group representation, sound corresponding to one of the group of audio files is presented to the user. In various implementations, when the SR group representations represent groups of audio files, the sound emitted by the SR group representation is at least portion of the audio data of one of the audio files. For example, when an SR group representation represents a group of audio files of songs by an artist, the sound emitted by the SR group representation is one of the songs by the artist. Thus, in FIG. 12A, the ArtistName4 group representation 841D emits sound corresponding to a song by ArtistName4.

Figure 12B:
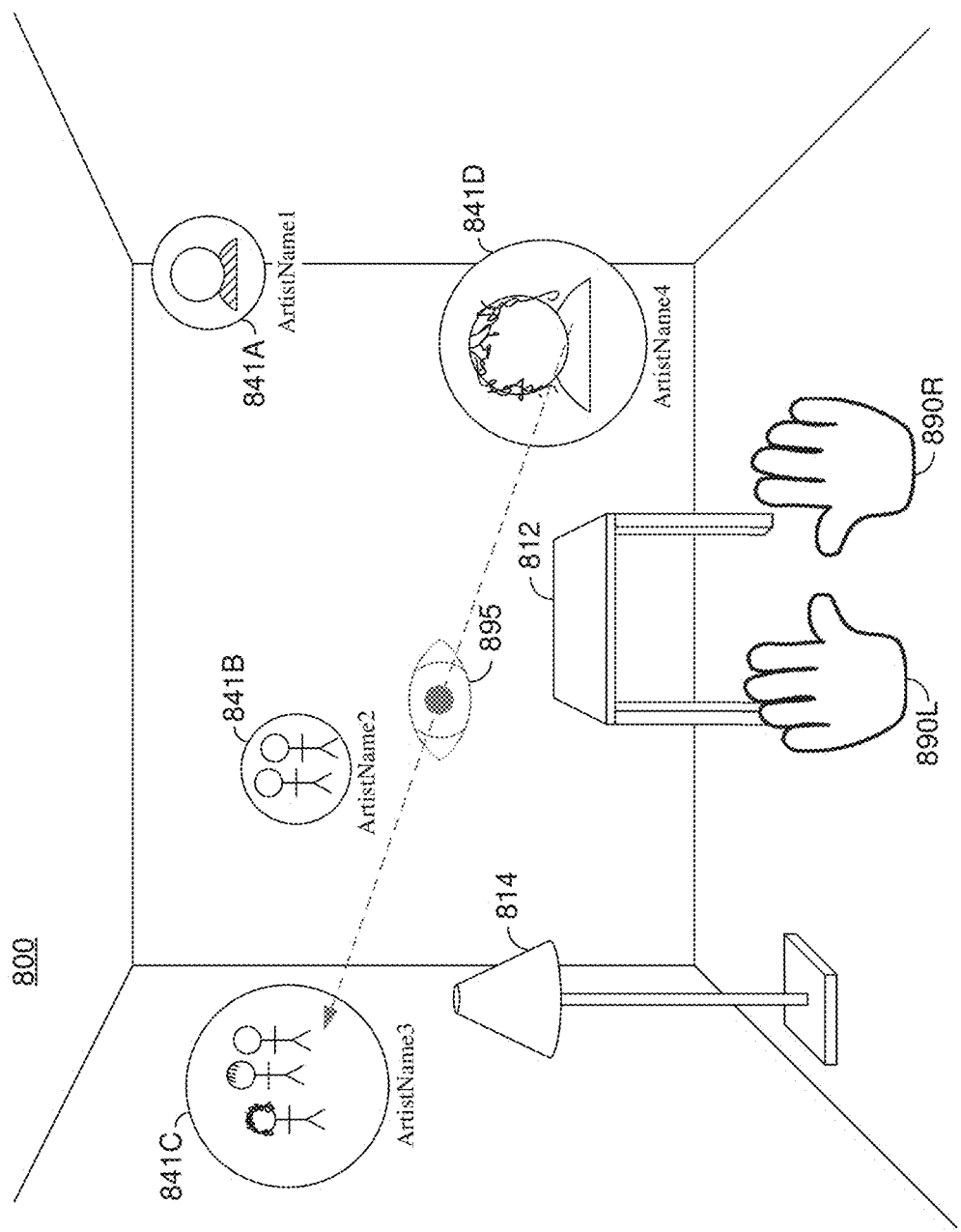

FIG. 12B illustrates the SR volumetric environment of FIG. 12A as the gaze point of the user (indicated by the gaze point indicator 895) moves from the ArtistName4 group representation 841D to the ArtistName3 group representation 841C. In various implementations, the presented sound cross-fades from a first audio file (e.g., the song by ArtistName4) to a second audio file (e.g., a song by ArtistName3). In various implementations, the second audio file is based on the first audio file (e.g., as described above with respect to FIG. 11A).

FIG. 12C illustrates the SR volumetric environment of FIG. 12B as the gaze point of the user reaches the ArtistName3 group representation 841C. At this point, the presented sound has entirely cross-faded from the first audio file to the second audio file.

Figure 13:
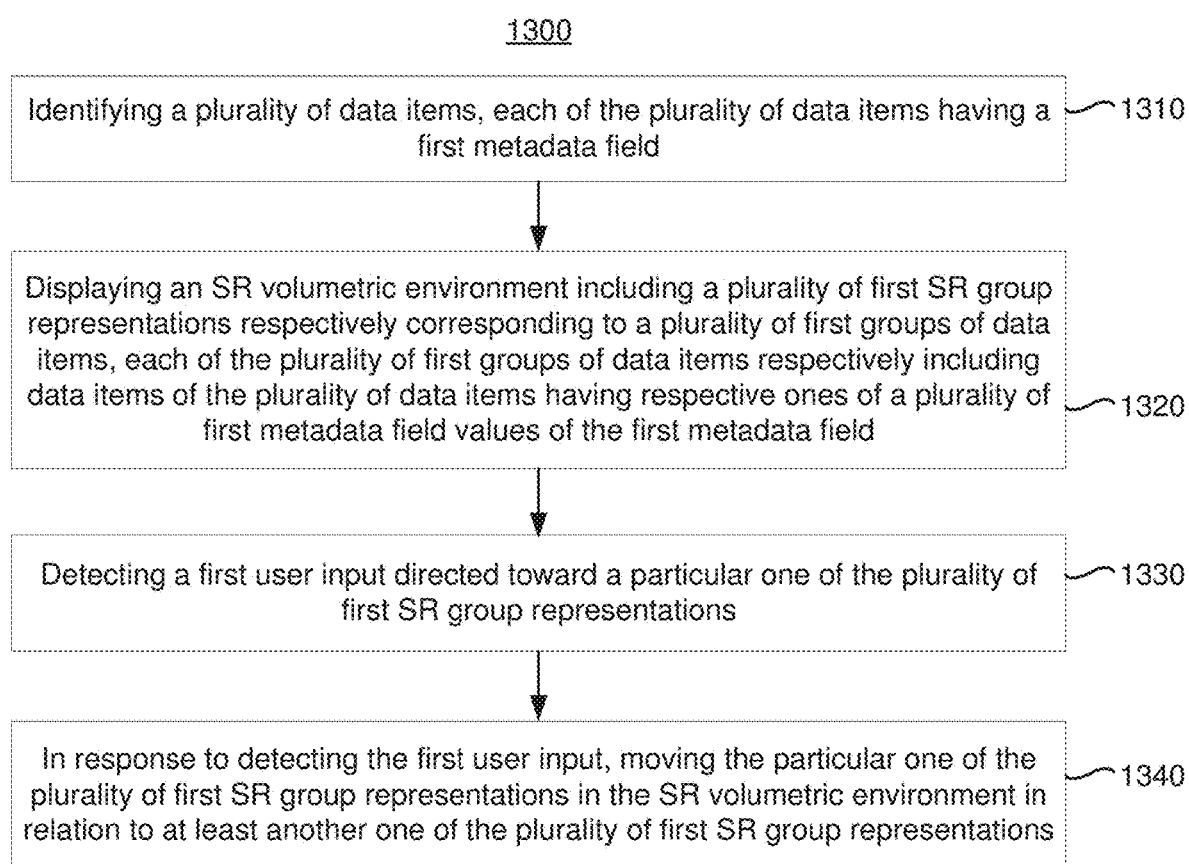
FIG. 13 is a flowchart representation of a method of moving an object in an SR user interface in accordance with some implementations.

FIG. 13 is a flowchart representation of a method 1300 of moving an object in an SR user interface in accordance with some implementations. In various implementations, the method 1300 is performed by a device with one or more processors, non-transitory memory, and one or more SR displays (e.g., the HMD 120B of FIG. 3). In some implementations, the method 1300 is performed by processing logic, including hardware, firmware, software, or a combination thereof. In some implementations, the method 1300 is performed by a processor executing instructions (e.g., code) stored in a non-transitory computer-readable medium (e.g., a memory).

The method 1300 begins, in block 1310, with the device identifying a plurality of data items, each of the plurality of data items having a first metadata field (including a respective first metadata field value). In various implementations, each of the plurality of data items further has a second metadata field (including a respective second metadata field value). For example, in various implementations, the data items are audio files and the first metadata field is an artist metadata field (including such values as "ArtistName1," "ArtistName2", and "ArtistName3") and the second metadata field is an album metadata field (including such values as "AlbumName1," "AlbumName2," and "AlbumName3"). In various implementations, the data items are document files and the first metadata field is a document-type field (including such values as "text," "spreadsheet," and "slide presentation") and the second metadata field is an author metadata field (including such values as "Alice," "Bob," and "Carl".) In various implementations, the data items are movie files and the first metadata field is a genre metadata field and the second metadata field is year-of-release metadata field. In various implementations, the data items are webpages for an online store and the first metadata field is a brand metadata field and the second metadata field is a price metadata field. In various implementations, the data items can have additional and/or other metadata fields.

In various implementations, identifying the plurality of data items includes populating, for each of the plurality of data items, the first metadata field with a first metadata field value. In various implementations, population is performed based on inspection of the data items, e.g., by a clustering algorithm.

In various implementations, the plurality of data items are stored with metadata including a first metadata field value in the first metadata field and a second metadata field value in the second metadata field.

The method 1300 continues, in block 1320, with the device displaying an SR volumetric environment including a plurality of first SR group representations respectively corresponding to a plurality of first groups of data items, each of the plurality of first groups of data items respectively including data items of the plurality of data items having respective ones of a plurality of first metadata field values of the first metadata field.

For example, in FIG. 5A, the device displays an SR volumetric environment 500 including a plurality of first SR group representations 541A-541D respectively corresponding to a plurality of first groups of data items (e.g., document files). Each of the plurality of first groups of data items respectively includes data items of the plurality of data items having respective ones of a plurality of first metadata field values (e.g., "text," "spreadsheet," and "slide presentation") of the first metadata field (e.g., the document-type metadata field).

As another example, in FIG. 6A, the device displays an SR volumetric environment 600 including a plurality of first SR group representations 641A-641D respectively corresponding to plurality of first groups of data items (e.g., audio files). Each of the plurality of first groups of data items respectively includes data items of the plurality of data items having respective ones of the plurality of first metadata field values (e.g., "ArtistName1," "ArtistName2," and "ArtistName3") of the first metadata field (e.g., the artist metadata field).

In various implementations, displaying the SR volumetric environment includes displaying the plurality of first SR group representations at a plurality of locations in the SR volumetric environment on the display at a first plurality of locations on the display. In various implementations, displaying the SR volumetric environment includes detecting a change in a user position and/or orientation in the SR volumetric environment. For example, in FIG. 5D, the first SR group representations 541A-541D are displayed at a plurality of locations in the SR volumetric environment 500 at a first plurality of locations on a display and the user changes position and/or orientation in the SR volumetric environment 500. In various implementations, displaying the SR volumetric environment includes, in response to detecting the change in the user position and/or orientation in the SR volumetric environment, displaying the plurality of first SR group representations at the plurality of locations in the SR volumetric environment on the display at a second plurality of locations on the display. For example, n FIG. 5E, in response to detecting the change in user position and/or orientation, the first SR group representations 541A-541D are displayed at the plurality of locations in the SR volumetric environment 500 at a second plurality of locations on the display.

In various implementations, the plurality of locations in the SR volumetric environment are saved in association with a user profile. Thus, the locations are persistent over time.

In various implementations, each of the plurality of first SR group representations is displayed with indicia of the respective one of the plurality of first metadata field values. For example, in FIG. 5A, the first SR group representations 541A-541D are displayed with icons of applications for opening document files of the document type. As another example, in FIG. 6A, the first SR group representations 641A-641D are displayed with artist photos and text indicating the artist metadata field value. In FIG. 6B, the indicia of the respective one of the plurality of first metadata field values are in the form of a plurality of indicia of respective second metadata field values (e.g., album covers) associated with the first metadata field value. Accordingly, in various implementations, a first one of the first SR group representations appears differently than a second one of the first SR group representations.

The method 1300 continues, in block 1330, with the device detecting a first user input directed toward a particular one of the plurality of first SR group representations. In various implementations, detecting the first user input includes detecting a location of a least a portion of a user in the SR volumetric environment. For example, in FIG. 5B, the user grabs the text group representation 541D and moves it to sit atop the table 512. In various implementations, the first user input includes use of a cursor or issuance of a verbal command.

The method 1300 continues, in block 1340, with the device, in response to detecting the first user input, moving the particular one of the plurality of first SR group representations in the SR volumetric environment in relation to at least another one of the plurality of first SR group representations. For example, in FIG. 5C, in response to detecting the first user input, the text group representation 541D is moved in the SR volumetric environment 500 with respect to the other first SR group representations 541A-541C.

In various implementations, the method 1300 further comprises detecting a second user input directed toward a particular one of the plurality of first SR group representations corresponding to a particular one of the first groups of data items, the particular one of the first groups of data items including data items of the plurality of data items having a first metadata field including a particular one of the plurality of first metadata field values. For example, FIG. 5F illustrates a user input directed toward the text group representation 541D.

In various implementations, the method 1300 further comprises, in response to detecting the second user input, replacing the particular one of the plurality of first SR group representations with a plurality of second SR group representations respectively corresponding to a plurality of second groups of data items, each of the plurality of second groups of respectively including data items of the plurality of data items having the first metadata field including the particular one of the plurality of first metadata field values and the second metadata field including respective ones of a plurality of second metadata field values. For example, in FIG. 5G, in response to detecting the user input of FIG. 5F, the text group representation 541D is replaced with a plurality of second SR group representations 542A-542D respectively includes data items of the plurality of data items having the first metadata field (e.g., the documents-type metadata field) including the particular one of the plurality of first metadata field values (e.g., "text") and the second metadata field (e.g., the author metadata field) including respective ones of a plurality of second metadata field values (e.g., "Alice," "Bob," "Carl," and "Dave").

In various implementations, the method 1300 further comprises, detecting a second user input indicative of the second metadata field. For example, in FIG. 5J, the user issues a verbal command indicative of the author metadata field.

In various implementations, the method 1300 further comprises, in response to detecting the second user input, replacing the plurality of first SR group representations with a plurality of second SR group representations respectively corresponding to a plurality of second groups of data items, each of the plurality of second groups of data items respectively including data items of the plurality of data items having respective ones of a plurality of second metadata field values of the second metadata field. For example, in FIG. 5K, in response to the verbal command, the plurality of first SR group representations 541A-541B are replaced with a plurality of second SR group representations (e.g., the third SR group representations 551A-551D) respectively corresponding to a plurality of second groups of data items, wherein each of the plurality of second groups of data items respectively includes data items of the plurality of data items having respective ones of a plurality of second metadata field values (e.g., "Alice," "Bob," "Carl," and "Dave") of the second metadata field (e.g., the author metadata field).

FIG. 14 is a flowchart representation of a method 1400 of regrouping data items in an SR user interface in accordance with some implementations. In various implementations, the method 1400 is performed by a device with one or more processors, non-transitory memory, and one or more SR displays (e.g., the HMD 120B of FIG. 3). In some implementations, the method 1400 is performed by processing logic, including hardware, firmware, software, or a combination thereof. In some implementations, the method 1400 is performed by a processor executing instructions (e.g., code) stored in a non-transitory computer-readable medium (e.g., a memory).

The method 1400 begins, in block 1410, with the device identifying a plurality of data items, each of the plurality of data items having a first metadata field (including a respective first metadata field value). In various implementations, each of the plurality of data items further has a second metadata field (including a respective second metadata field value). For example, in various implementations, the data items are audio files and the first metadata field is an artist metadata field (including such values as "ArtistName1," "ArtistName2", and "ArtistName3") and the second metadata field is an album metadata field (including such values as "AlbumName1," "AlbumName2," and "AlbumName3"). In various implementations, the data items are document files and the first metadata field is a document-type field (including such values as "text," "spreadsheet," and "slide presentation") and the second metadata field is an author metadata field (including such values as "Alice," "Bob," and "Carl".) In various implementations, the data items are movie files and the first metadata field is a genre metadata field and the second metadata field is year-of-release metadata field. In various implementations, the data items are webpages for an online store and the first metadata field is a brand metadata field and the second metadata field is a price metadata field. In various implementations, the data items can have additional and/or other metadata fields.

In various implementations, identifying the plurality of data items includes populating, for each of the plurality of data items, the first metadata field with a first metadata field value. In various implementations, population is performed based on inspection of the data items, e.g., by a clustering algorithm.

In various implementations, the plurality of data items are stored with metadata including a first metadata field value in the first metadata field and a second metadata field value in the second metadata field.

In various implementations, the method 1400 comprises selecting a first one of a plurality of metadata fields as the first metadata field based on a default metadata field for a type of the plurality of data items. For example, in various implementations, when the plurality of data items are identified as document files, the default metadata field is a document-type metadata field. As another example, in various implementations, when the plurality of data items are identified as audio files, the default metadata field is an artist metadata field (or genre metadata field). As another example, in various implementations, when the plurality of data items are identified as webpages for an online store, the default metadata field is a brand metadata field.

In various implementations, the method 1400 comprises selecting a first one of a plurality of metadata fields as the first metadata field based on a number of data items in the plurality of first groups of data items. For example, the metadata field is selected as the first metadata field to evenly split the data items among a number of groups of data items. In various implementations, the first metadata is selected based on contextual information, such as a calendar invite or recently opened documents.

The method 1400 continues, in block 1420, with the device displaying an SR volumetric environment including a plurality of first SR group representations respectively corresponding to a plurality of first groups of data items, each of the plurality of first groups of data items respectively including data items of the plurality of data items having respective ones of a plurality of first metadata field values of the first metadata field.

For example, in FIG. 5A, the device displays an SR volumetric environment 500 including a plurality of first SR group representations 541A-541D respectively corresponding to a plurality of first groups of data items (e.g., document files). Each of the plurality of first groups of data items respectively includes data items of the plurality of data items having respective ones of a plurality of first metadata field values (e.g., "text," "spreadsheet," and "slide presentation") of the first metadata field (e.g., the document-type metadata field).

As another example, in FIG. 6A, the device displays an SR volumetric environment 600 including a plurality of first SR group representations 641A-641D respectively corresponding to plurality of first groups of data items (e.g., audio files). Each of the plurality of first groups of data items respectively includes data items of the plurality of data items having respective ones of the plurality of first metadata field values (e.g., "ArtistName1," "ArtistName2," and "ArtistName3") of the first metadata field (e.g., the artist metadata field).

In various implementations, displaying the SR volumetric environment includes displaying the plurality of first SR group representations at a plurality of locations in the SR volumetric environment on the display at a first plurality of locations on the display. In various implementations, displaying the SR volumetric environment includes detecting a change in a user position and/or orientation in the SR volumetric environment. For example, in FIG. 5D, the first SR group representations 541A-541D are displayed at a plurality of locations in the SR volumetric environment 500 at a first plurality of locations on a display and the user changes position and/or orientation in the SR volumetric environment 500. In various implementations, displaying the SR volumetric environment includes, in response to detecting the change in the user position and/or orientation in the SR volumetric environment, displaying the plurality of first SR group representations at the plurality of locations in the SR volumetric environment on the display at a second plurality of locations on the display. For example, n FIG. 5E, in response to detecting the change in user position and/or orientation, the first SR group representations 541A-541D are displayed at the plurality of locations in the SR volumetric environment 500 at a second plurality of locations on the display.

In various implementations, each of the plurality of first SR group representations is displayed with indicia of the respective one of the plurality of first metadata field values. For example, in FIG. 5A, the first SR group representations 541A-541D are displayed with icons of applications for opening document files of the document type. As another example, in FIG. 6A, the first SR group representations 641A-641D are displayed with artist photos and text indicating the artist metadata field value. In FIG. 6B, the indicia of the respective one of the plurality of first metadata field values are in the form of a plurality of indicia of respective second metadata field values (e.g., album covers) associated with the first metadata field value. Accordingly, in various implementations, a first one of the first SR group representations appears differently than a second one of the first SR group representations.

The method 1400 continues, in block 1430, with the device detecting a first user input indicative of the second metadata field. In various implementations, detecting the first user input includes detecting a verbal input of a user. For example, in FIG. 5J, the user issues a verbal command indicative of the author metadata field. In various implementations, detecting the first user input include detecting selection of displayed resort affordance.

The method 1400 continues, in block 1440, with the device, in response to detecting the second user input, replacing the plurality of first SR group representations with a plurality of second SR group representations respectively corresponding to a plurality of second groups of data items, each of the plurality of second groups of data items respectively including data items of the plurality of data items having respective ones of a plurality of second metadata field values of the second metadata field. For example, in FIG. 5K, in response to the verbal command, the plurality of first SR group representations 541A-541B are replaced with a plurality of second SR group representations (e.g., the third SR group representations 551A-551D) respectively corresponding to a plurality of second groups of data items, wherein each of the plurality of second groups of data items respectively includes data items of the plurality of data items having respective ones of a plurality of second metadata field values (e.g., "Alice," "Bob," "Carl," and "Dave") of the second metadata field (e.g., the author metadata field).

In various implementations, replacing the plurality of first SR group representations with the plurality of second SR group representations includes displaying an animation in which the plurality of first SR representations are replaced by a plurality of SR item representations which are rearranged in the SR volumetric environment and replaced with the plurality of second SR group representations. For example, FIG. 5L1-5L6 illustrates an animation in which the plurality of first SR group representations 541A-541D are replaced by a plurality of SR item representations which are rearranged in the SR volumetric environment 500 and replaced with a plurality of second SR group representations (e.g., the third SR group representations 551A-551C).

In various implementations, the method 1400 includes detecting a second user input directed toward a particular one of the plurality of second SR group representations corresponding to a particular one of the second groups of data items, the particular one of the second groups of data items including data items of the plurality of data items having a second metadata field including a particular one of the plurality of second metadata field values. For example, FIG. 5M illustrates a user input directed toward the Carl group representation 551D.

In various implementations, the method 1400 further comprises, in response to detecting the second user input, replacing the particular one of the plurality of second SR group representations with a plurality of third SR group representations respectively corresponding to a plurality of third groups of data items, each of the plurality of third groups of respectively including data items of the plurality of data items having the second metadata field including the particular one of the plurality of second metadata field values and the first metadata field including respective ones of the plurality of first metadata field values.

For example, in FIG. 5N, in response to detecting the user input of FIG. 5M, the Carl group representation 551C is replaced with a plurality of third SR group representations (e.g., the fourth SR group representations 552A-552D) respectively corresponding to a plurality of third groups of data items, each of the plurality of third groups of data items respectively including data items of the plurality of data items having the second metadata field (e.g., the author metadata field) including the particular one of the plurality of second metadata field values (e.g., "Carl") and the first metadata field (e.g., the document-type metadata field) including respective ones of the plurality of first metadata field values (e.g., "text," "spreadsheet," and "slide presentation").

In various implementations, the method 1400 further comprises detecting a third user input directed toward a particular one of the plurality of third SR group representations corresponding to a particular one of the third groups of data items. For example, in FIG. 5N, the user selects the presentation-Carl group representation 552B.

In various implementations, the method 1400 further comprises, in response to detecting the third user input, replacing the particular one of the plurality of third SR group representations with a plurality of SR item representations respectively corresponding to data items of the plurality of data items having the particular one of the plurality of first metadata field values of the first metadata field and the particular one of the plurality of second metadata field values of the second metadata field. For example, in FIG. 5O, in response to the user input of FIG. 5N, the presentation-Carl group representation 552B is replaced with a plurality of SR item representations 553A-553B respectively corresponding to data items of the plurality of data items having the particular one of the plurality of first metadata field values (e.g., "slide presentation") of the first metadata field (e.g., the document-type metadata field) and the particular one of the plurality of second metadata field values (e.g., "Carl") of the second metadata field (e.g., the author metadata field).

In various implementations, the method 1400 further comprises, detecting a fourth user input directed toward a particular one of the plurality of SR item representations corresponding to a particular one of the data items. For example, in FIG. 5O, the user selects the second SR item representation 553B corresponding to the document file entitled "two.ppt."

In various implementations, the method 1400 further comprises, in response to detecting the fourth user input, opening the particular one of the data items. For example, in FIG. 5P, the SR volumetric environment 500 includes a slide presentation display window 554 including a portion of the content 555 of the document file entitled "two.ppt," navigation affordances 557A-557B for navigating through the content of the document file entitled "two.ppt," and a close affordance 556 which, when selected via a user input, dismisses the slide presentation display window 554.

Figure 15:
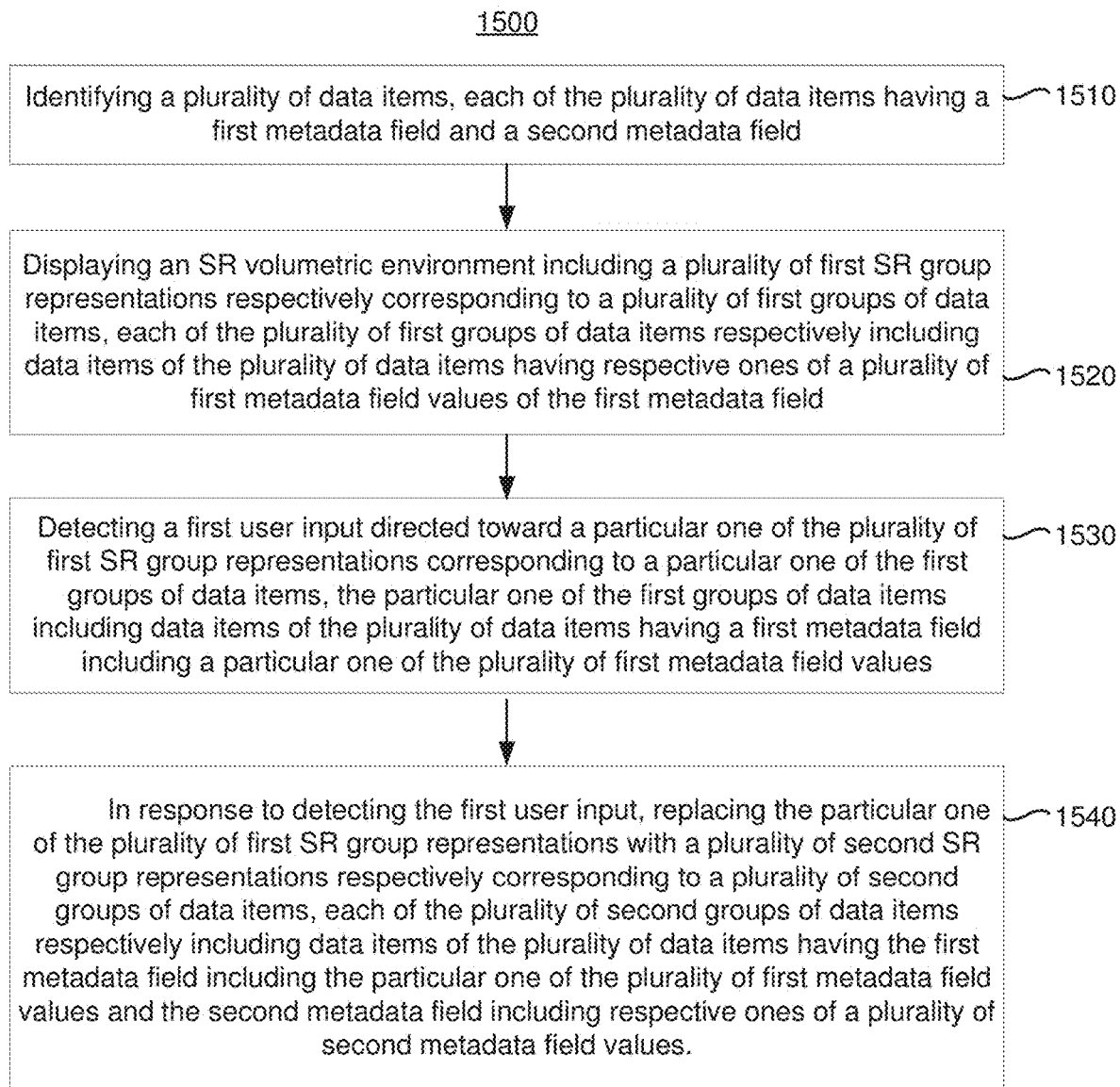
FIG. 15 is a flowchart representation of a method of selecting groups of data items in an SR user interface in accordance with some implementations.

FIG. 15 is a flowchart representation of a method 1500 of selecting groups of data items in an SR user interface in accordance with some implementations. In various implementations, the method 1500 is performed by a device with one or more processors, non-transitory memory, and one or more SR displays (e.g., the HMD 120B of FIG. 3). In some implementations, the method 1500 is performed by processing logic, including hardware, firmware, software, or a combination thereof. In some implementations, the method 1500 is performed by a processor executing instructions (e.g., code) stored in a non-transitory computer-readable medium (e.g., a memory).

The method 1500 begins, in block 1510, with the device identifying a plurality of data items, each of the plurality of data items having a first metadata field (including a respective first metadata field value). In various implementations, each of the plurality of data items further has a second metadata field (including a respective second metadata field value). For example, in various implementations, the data items are audio files and the first metadata field is an artist metadata field (including such values as "ArtistName1," "ArtistName2", and "ArtistName3") and the second metadata field is an album metadata field (including such values as "AlbumName1," "AlbumName2," and "AlbumName3"). In various implementations, the data items are document files and the first metadata field is a document-type field (including such values as "text," "spreadsheet," and "slide presentation") and the second metadata field is an author metadata field (including such values as "Alice," "Bob," and "Carl".) In various implementations, the data items are movie files and the first metadata field is a genre metadata field and the second metadata field is year-of-release metadata field. In various implementations, the data items are webpages for an online store and the first metadata field is a brand metadata field and the second metadata field is a price metadata field. In various implementations, the data items can have additional and/or other metadata fields.

In various implementations, identifying the plurality of data items includes populating, for each of the plurality of data items, the first metadata field with a first metadata field value. In various implementations, population is performed based on inspection of the data items, e.g., by a clustering algorithm.

In various implementations, the plurality of data items are stored with metadata including a first metadata field value in the first metadata field and a second metadata field value in the second metadata field.

In various implementations, the method 1500 comprises selecting a first one of a plurality of metadata fields as the first metadata field based on a default metadata field for a type of the plurality of data items. For example, in various implementations, when the plurality of data items are identified as document files, the default metadata field is a document-type metadata field. As another example, in various implementations, when the plurality of data items are identified as audio files, the default metadata field is an artist metadata field (or genre metadata field). As another example, in various implementations, when the plurality of data items are identified as webpages for an online store, the default metadata field is a brand metadata field.

In various implementations, the method 1500 comprises selecting a first one of a plurality of metadata fields as the first metadata field based on a number of data items in the plurality of first groups of data items. For example, the metadata field is selected as the first metadata field to evenly split the data items among a number of groups of data items. In various implementations, the first metadata is selected based on contextual information, such as a calendar invite or recently opened documents.

The method 1500 continues, in block 1520, with the device displaying an SR volumetric environment including a plurality of first SR group representations respectively corresponding to a plurality of first groups of data items, each of the plurality of first groups of data items respectively including data items of the plurality of data items having respective ones of a plurality of first metadata field values of the first metadata field.

For example, in FIG. 5A, the device displays an SR volumetric environment 500 including a plurality of first SR group representations 541A-541D respectively corresponding to a plurality of first groups of data items (e.g., document files). Each of the plurality of first groups of data items respectively includes data items of the plurality of data items having respective ones of a plurality of first metadata field values (e.g., "text," "spreadsheet," and "slide presentation") of the first metadata field (e.g., the document-type metadata field).

As another example, in FIG. 6A, the device displays an SR volumetric environment 600 including a plurality of first SR group representations 641A-641D respectively corresponding to plurality of first groups of data items (e.g., audio files). Each of the plurality of first groups of data items respectively includes data items of the plurality of data items having respective ones of the plurality of first metadata field values (e.g., "ArtistName1," "ArtistName2," and "ArtistName3") of the first metadata field (e.g., the artist metadata field).

In various implementations, displaying the SR volumetric environment includes displaying the plurality of first SR group representations at a plurality of locations in the SR volumetric environment on the display at a first plurality of locations on the display. In various implementations, displaying the SR volumetric environment includes detecting a change in a user position and/or orientation in the SR volumetric environment. For example, in FIG. 5D, the first SR group representations 541A-541D are displayed at a plurality of locations in the SR volumetric environment 500 at a first plurality of locations on a display and the user changes position and/or orientation in the SR volumetric environment 500. In various implementations, displaying the SR volumetric environment includes, in response to detecting the change in the user position and/or orientation in the SR volumetric environment, displaying the plurality of first SR group representations at the plurality of locations in the SR volumetric environment on the display at a second plurality of locations on the display. For example, n FIG. 5E, in response to detecting the change in user position and/or orientation, the first SR group representations 541A-541D are displayed at the plurality of locations in the SR volumetric environment 500 at a second plurality of locations on the display.

In various implementations, each of the plurality of first SR group representations is displayed with indicia of the respective one of the plurality of first metadata field values. For example, in FIG. 5A, the first SR group representations 541A-541D are displayed with icons of applications for opening document files of the document type. As another example, in FIG. 6A, the first SR group representations 641A-641D are displayed with artist photos and text indicating the artist metadata field value.

In various implementations, the indicia of the respective one of the plurality of first metadata field value includes a plurality of indicia of respective ones of the plurality of second metadata field values. For example, in FIG. 6B-6D, the indicia of the respective one of the plurality of first metadata field values are in the form of a plurality of indicia of respective second metadata field values (e.g., album covers) associated with the first metadata field value. Accordingly, in various implementations, a first one of the first SR group representations appears differently than a second one of the first SR group representations.

The method 1500 continues, in block 1530, with the device detecting a first user input directed toward a particular one of the plurality of first SR group representations corresponding to a particular one of the first groups of data items, the particular one of the first groups of data items including data items of the plurality of data items having a first metadata field including a particular one of the plurality of first metadata field values. For example, FIG. 5F illustrates a user input directed toward the text group representation 541D. As another example, FIG. 6D illustrates a user input directed toward the ArtistName3 group representation 641C.

In various implementations, detecting the first user input includes detecting a location of a least a portion of a user in the SR volumetric environment. For example, in FIG. 6D, the device detects the position of the user's hand selecting the ArtistName3 group representation 641C. As another example, in FIG. 7A, the device detects the position of the user's hand in pulling the ArtistName4 group representation 641D closer. As another example, in FIG. 8A, the device detects the position of the user's hands pulling apart the ArtistName4 group representation 641D. As another example, in FIGS. 10A-10B, the device detects the position of the user moving from a first location to a second location.

In various implementations, detecting the first user input includes detecting a gaze point of a user in the SR volumetric environment. For example, in FIG. 9A, the device detects the gaze point of the user when a selection trigger is triggered.

In various implementations, detecting the first user input includes detecting a verbal input of a user or the position of a cursor.

The method 1500 continues, in block 1540, with the device, in response to detecting the first user input, replacing the particular one of the plurality of first SR group representations with a plurality of second SR group representations respectively corresponding to a plurality of second groups of data items, each of the plurality of second groups of data items respectively including data items of the plurality of data items having the first metadata field including the particular one of the plurality of first metadata field values and the second metadata field including respective ones of a plurality of second metadata field values.

For example, in FIG. 5G, in response to detecting the user input of FIG. 5F, the text group representation 541D is replaced with a plurality of second SR group representations 542A-542D, each respectively including data items of the plurality of data items having the first metadata field (e.g., the documents-type metadata field) including the particular one of the plurality of first metadata field values (e.g., "text") and the second metadata field (e.g., the author metadata field) including respective ones of a plurality of second metadata field values (e.g., "Alice," "Bob," "Carl," and "Dave").

As another example, in FIG. 6E, in response to detecting the user input of FIG. 6D, the ArtistName3 group representation 641C is replaced with a plurality of second SR group representations 642A-642D, each respectively including data items of the plurality of data items having the first metadata field (e.g., the artist metadata field) including the particular one of the plurality of first metadata field values (e.g., "ArtistName3") and the second metadata field (e.g., the album metadata field) including respective ones of a plurality of second metadata field values (e.g., "AlbumName1," "AlbumName2," "AlbumName3," and "AlbumName4").

In various implementations, replacing the particular one of the plurality of first SR group representations with a plurality of second SR group representations includes displaying an animation in which the plurality of indicia of respective ones of the plurality of second metadata field values are expanded and moved to respective locations becoming the plurality of second SR group representations. For example, FIG. 6F1-6F4 illustrate an animation in which the plurality of indicia of respective ones of the plurality of second metadata field values (e.g., "AlbumName1," "AlbumName2," "AlbumName3," and "AlbumName4") are expanded and moved to respective locations becoming the plurality of second SR group representations 642A-642D.

In various implementations, replacing the particular one of the plurality of first SR group representations with a plurality of second SR group representations includes ceasing to display others of the plurality of first SR group representations. For example, in FIG. 6E, when the ArtistName3 group representation 641C is replaced with a plurality of second SR group representations 642A-642D, the others of the first SR group representations 641A, 641B, and 641D cease to be displayed. In various implementations, the others of the plurality of SR group representations are displayed in a faded, shrunk, or grayed-out state.

In various implementations, the method 1500 further includes detecting a second user input directed toward a particular one of the plurality of second SR group representations corresponding to a particular one of the second groups of data items including data items of the plurality of data items having a particular one of the plurality of second metadata field values of the second metadata field. For example, in FIG. 5G, the user selects the Dave-text group representation 542D. As another example, in FIG. 6G, the user selects the AlbumName4 group representation 642D.

In various implementations, the method 1500 further includes, in response to detecting the second user input, replacing the particular one of the plurality of second SR group representations with a plurality of SR item representations respectively corresponding to data items of the plurality of data items having the particular one of the plurality of first metadata field values of the first metadata field and the particular one of the plurality of second metadata field values of the second metadata field.

For example, in FIG. 5H, in response to the user input of FIG. 5G, the particular one of the second SR group representations (e.g., the Dave-text group representation 542D) is replaced with a plurality of SR item representations 543A-543D respectively corresponding to data items of the plurality of data items having the particular one of the plurality of first metadata field values (e.g., "text") of the first metadata field (e.g., the document-type metadata field) and the particular one of the plurality of second metadata field values (e.g., "Dave") of the second metadata field (e.g., the author metadata field).

As another example, in FIG. 6H, in response to the user input of FIG. 6G, the particular one of the second SR group representations (e.g., the AlbumName4 group representation 642D) is replaced with a plurality of SR item representations 643A-643D respectively corresponding to data items of the plurality of data items having the particular one of the plurality of first metadata field values (e.g., "ArtistName3") of the first metadata field (e.g., the artist metadata field) and the particular one of the plurality of second metadata field values (e.g., "AlbumName4") of the second metadata field (e.g., the album metadata field).

In various implementations, the method 1500 further includes detecting a third user input directed toward a particular one of the plurality of SR item representations corresponding to a particular one of the data items. For example, in FIG. 5H, the user selects the third SR item representation 543C corresponding to the document file entitled "three.txt." As another example, in FIG. 6H, the user selects the fourth SR item representation 643D corresponding to the audio file entitled "SongName4."

In various implementations, the method 1500 further includes, in response to detecting the third user input, opening the particular one of the data items. For example, in FIG. 5I, in response to detecting the user input in FIG. 5H, the SR volumetric environment 500 includes a text display window 544 including the content 545 of the document file entitled "three.txt" and a close affordance 546 which, when selected via a user input, dismisses the text display window 544. As another example, in response to detecting the user input in FIG. 6H, the device plays, via a speaker, the audio file entitled "SongName4."

In various implementations, the method 1500 further includes detecting, while the second SR group representations are displayed, a third user input dismissing the second SR group representations. For example, in FIG. 8C, a user input includes the user squishing (or de-spreading) the plurality of second SR group representations 647A-647D with the user's left hand and the user's right hand.

In various implementations, the method 1500 further includes, in response to detecting the third user input, replacing the plurality of second SR group representations with the plurality of first SR group representations. For example, in FIG. 8E, the plurality of second SR group representations 647A-647D are replaced with the first SR group representations 641A-641D.

Figure 16:
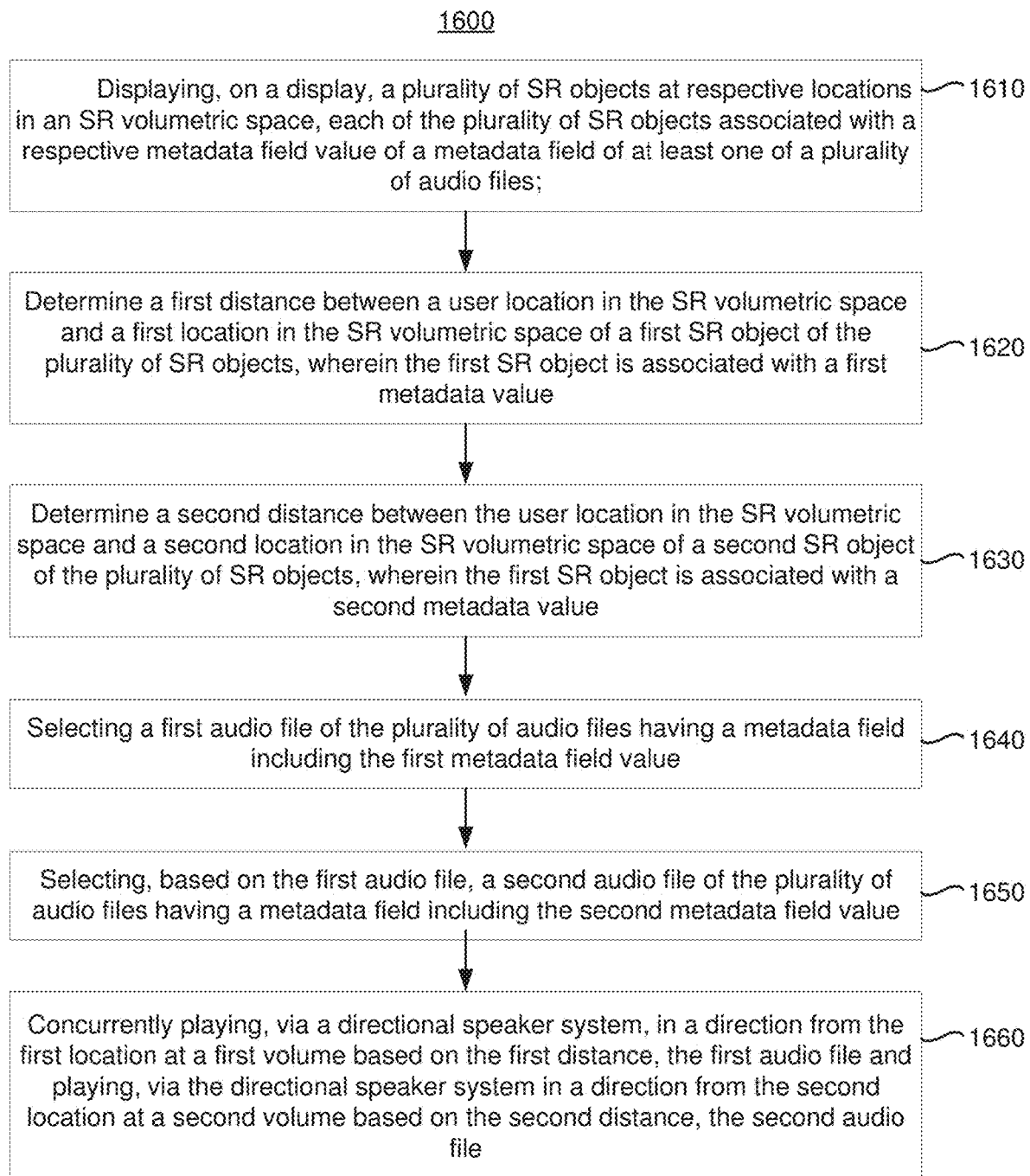
FIG. 16 is a flowchart representation of a method of playing two audio files in accordance with some implementations.

FIG. 16 is a flowchart representation of a method 1600 of playing two audio files in accordance with some implementations. In various implementations, the method 1600 is performed by a device with one or more processors, non-transitory memory, and one or more SR displays (e.g., the HMD 120B of FIG. 3). In some implementations, the method 1600 is performed by processing logic, including hardware, firmware, software, or a combination thereof. In some implementations, the method 1600 is performed by a processor executing instructions (e.g., code) stored in a non-transitory computer-readable medium (e.g., a memory).

The method 1600 begins, in block 1610, with the device displaying, on a display, a plurality of SR objects at respective locations in an SR volumetric space, each of the plurality of SR objects associated with a respective metadata field value of a metadata field of at least one of a plurality of audio files. For example, in FIG. 11A, a plurality of SR objects (e.g., the first SR group representations 741A-741C) are displayed at respective locations in an SR volumetric space 700. Each of the plurality of objects are associated with a respective metadata field value (e.g., "ArtistName1," "ArtistName2," and "ArtistName3") of a metadata field (e.g., the artist metadata field) of at least one of a plurality of audio files.

The method 1600 continues, in block 1620, with the device determining a first distance between a user location in the SR volumetric space and a first location in the SR volumetric space of a first SR object of the plurality of SR objects, wherein the first SR object is associated with a first metadata value. In various implementations, the user location corresponds to a location of the user's body in the SR environment, a location of a user's hand in the SR environment, or a location of a gaze point of the user in the SR environment. For example, in FIG. 11A, the volumetric space includes a first SR object (e.g., the ArtistName1 group representation 741A) associated with a first metadata value (e.g., "ArtistName1").

The method 1600 continues, in block 1630, with the device determining a second distance between the user location in the SR volumetric space and a second location in the SR volumetric space of a second SR object of the plurality of SR objects, wherein the second SR object is associated with a second metadata value. For example, in FIG. 11A, the volumetric space includes a second SR object (e.g., the ArtistName2 group representation 741B) associated with a second metadata value (e.g., "ArtistName2").

The method 1600 continues, in block 1640, with the device selecting a first audio file of the plurality of audio files having a metadata field including the first metadata field value. For example, in FIG. 11A, the device selects an audio file including "ArtistName1" in the artist metadata field. In various implementations, the first audio file is selected at random. In various implementations, the first audio file is selected based on the second audio file.

The method 1600 continues, in block 1650, with the device selecting, based on the first audio file, a second audio file of the plurality of audio files having a metadata field including the second metadata field value. In various implementations, the second audio file is selected to reduce discordance between the first audio file and the second audio file. In various implementations, the second audio file is based on audio data of first audio file and the second audio file. Thus, in various implementations, selecting the second audio file is based on one or more of the key of the first audio file and the second audio file, the rhythm of the first audio file and the second audio file, or the tempo of the first audio file and the second audio file. In various implementations, the second audio file is based on metadata of the first audio file and the second audio file, such as song title or genre.

In various implementations, selecting the second audio file is based on an instrumentation of the first audio file and the second audio file. In various implementations, selecting the second audio file is based on a sample common to the first audio file and the second audio file. In various implementations, selecting the second audio files is further based on a random selection.

The method 1600 continues, in block 1660, with the device concurrently playing, via a directional speaker system, in a direction from the first location at a first volume based on the first distance, the first audio file and playing, via the directional speaker system in a direction from the second location at a second volume based on the second distance, the second audio file.

In various implementations, the second audio file is processed or modified to reduce discordance between the first audio file and the second audio file. For example, in various implementations, the key and/or tempo of the second audio file is changed to better match that of the first audio file. Accordingly, in various implementations, playing the second audio file is based on the first audio file.

In various implementations, the method 1600 further includes determining a distance between a user location in the SR volumetric space and a third location in the SR volumetric space of a third SR object of the plurality of SR objects, wherein the first SR object is associated with a third metadata field value; selecting, based on the first audio file and the second audio file, a third audio file of the plurality of audio files having a metadata field including the third metadata field value; and playing, concurrently with the first audio file and the second audio file via the directional speaker system in a direction from the third location at a third volume based on the third distance, the third audio file. In various implementations, the third audio file is selected and played in response to determining that the third distance is below a threshold. Accordingly, in various implementations, an SR object which is far away from the user location does not emit sound (even weakly).

In various implementations, the method 1600 further includes detecting a change in the user location in the SR volumetric space to a new user location, determining an updated first distance between the new user location and the first location of the first SR object, determining an updated second distance between the new user location and the second location of the second SR object, and changing the first volume and the second volume based on the updated first distance and the updated second distance. For example, in FIG. 11B, the user moves to a new location, changing the distance between the user and the first SR volumetric representations.

Figure 17:
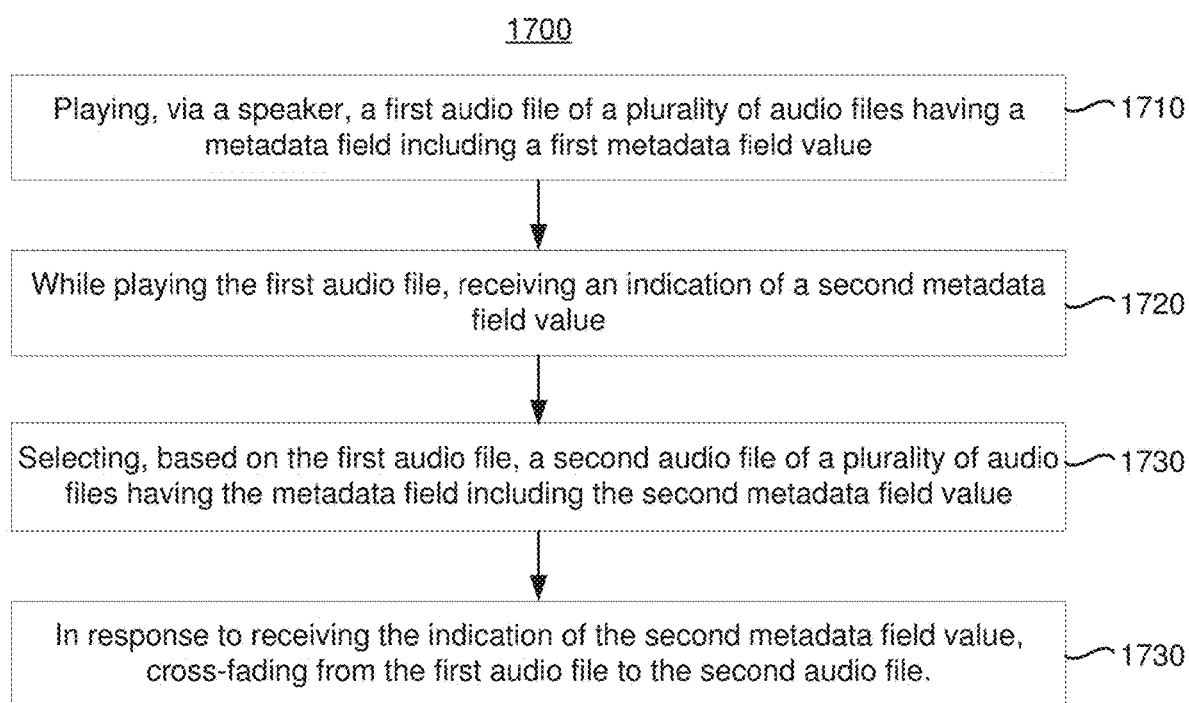
FIG. 17 is a flowchart representation of a method of cross-fading between two audio files in accordance with some implementations.

FIG. 17 is a flowchart representation of a method 1700 of cross-fading between two audio files in accordance with some implementations. In various implementations, the method 1700 is performed by a device with one or more processors, non-transitory memory, and one or more SR displays (e.g., the HMD 120B of FIG. 3). In some implementations, the method 1700 is performed by processing logic, including hardware, firmware, software, or a combination thereof. In some implementations, the method 1700 is performed by a processor executing instructions (e.g., code) stored in a non-transitory computer-readable medium (e.g., a memory).

The method 1700 begins, in block 1710, with the device playing, via a speaker, a first audio file of a plurality of audio files having a metadata field including a first metadata field value. For example, in FIG. 12A, in response to the user looking at the ArtistName4 group representation 841D, the device plays a first audio file from a plurality of audio files having an artist metadata field including a value of "ArtistName4."

The method 1700 continues, in block 1720, with device receiving, while playing the first audio file, an indication of a second metadata field value. For example, in FIG. 12B, the user begin looking towards the ArtistName3 group representation 841C indicating a second metadata field value of "ArtistName3."

The method 1700 continues, in block 1730, with the device selecting, based on the first audio file, a second audio file of a plurality of audio files having the metadata field including the second metadata field value. In various implementations, the second audio file is selected to reduce discordance between the first audio file and the second audio file. In various implementations, the second audio file is based on audio data of first audio file and the second audio file. Thus, in various implementations, selecting the second audio file is based on one or more of the key of the first audio file and the second audio file, the rhythm of the first audio file and the second audio file, or the tempo of the first audio file and the second audio file. In various implementations, the second audio file is based on metadata of the first audio file and the second audio file, such as song title or genre.

In various implementations, selecting the second audio file is based on an instrumentation of the first audio file and the second audio file. In various implementations, selecting the second audio file is based on a sample common to the first audio file and the second audio file. In various implementations, selecting the second audio files is further based on a random selection.

The method 1700 continues, in block 1740, with the device, in response to receiving the indication of the second metadata field value, cross-fading from the first audio file to the second audio file. For example, in FIGS. 12A-12C, the device cross-fades from a ArtistName4 song to a ArtistName3 song (selected based on the ArtistName4 song). In various implementations, cross-fading including concurrently playing the first audio files and the second audio file while decreasing the volume of the first audio file and increasing the volume of the second audio file.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device and including a processor, non-transitory memory, and a display:
      identifying a plurality of data items, each of the plurality of data items having a first metadata field and a second metadata field different from the first metadata field;
      displaying, on the display, a volumetric environment including a first plurality of synthesized reality (SR) objects corresponding to a first plurality of data items from among the identified plurality of data items, wherein each of the first plurality of data items includes the first metadata field with a respective one of a plurality of first metadata field values, and wherein each of the first plurality of SR objects includes different graphical indicia representing a corresponding first metadata field value from among the plurality of first metadata field values;
      detecting a first user input indicative of the second metadata field; and
      in response to detecting the first user input, replacing the first plurality of SR objects within the volumetric environment with a second plurality of SR objects corresponding to a second plurality of data items from among the identified plurality of data items, wherein each of the second plurality of data items includes the second metadata field with a respective one of a plurality of second metadata field values, and wherein each of the second plurality of SR objects includes different graphical indicia representing a corresponding second metadata field value from among the plurality of second metadata field values.

2. The method of claim 1, further comprising:
   detecting a second user input directed to a first SR object among the second plurality of SR objects corresponding to a first data item among the second plurality of data items, wherein the first data item includes the second metadata field with a particular one of the plurality of second metadata field values; and
   in response to detecting the second user input directed to the first SR object:
      replacing the first SR object within the volumetric environment with a third plurality of SR objects corresponding to a third plurality of data items, each of the third plurality of data items includes the second metadata field with the particular one of the plurality of second metadata field values; and
      maintaining display of a balance of the second plurality of SR objects, not including the first SR object, within the volumetric environment.

3. The method of claim 1, wherein replacing the first plurality of SR objects within the volumetric environment with the second plurality of SR objects includes displaying an animation in which the first plurality of SR objects is replaced by a plurality of SR object representations which is rearranged in the volumetric environment and replaced with the second plurality of SR objects.

4. The method of claim 1, further comprising:
   selecting a first one from among a plurality of metadata fields as the first metadata field based on a default metadata field for a type of the identified plurality of data items.

5. The method of claim 1, further comprising:
   selecting a first one from among a plurality of metadata fields as the first metadata field based on a number of data items in the identified plurality of data items.

6. The method of claim 1, further comprising:
   selecting a first one from among a plurality of metadata fields as the first metadata field based on contextual information.

7. The method of claim 1, wherein detecting the first user input includes detecting a verbal input from a user of the device.

8. The method of claim 1, wherein identifying the plurality of data items includes populating, for each of the plurality of data items, at least one of the first metadata field with a first metadata field value or the second metadata field with a second metadata field value.

9. The method of claim 1, wherein each of the first plurality of SR objects is displayed with indicia of the respective one of the plurality of first metadata field values.

10. The method of claim 1, wherein displaying the volumetric environment includes:
    displaying the first plurality of SR objects at a first plurality of locations within the volumetric environment;
    detecting a change to at least one of a user position or a user orientation; and
    in response to detecting the change to at least one of the user position or the user orientation, displaying the first plurality of SR objects at a second plurality of locations, different from the first plurality of locations, within the volumetric environment based on the change to at least one of the user position or the user orientation.

11. A device comprising:
    a display;
    one or more processors;
    a non-transitory memory; and
    one or more programs stored in the non-transitory memory, wherein the one or more programs include instructions, which, when executed by one or more processors, cause the device to:
       identify a plurality of data items, each of the plurality of data items having a first metadata field and a second metadata field different from the first metadata field;

display, on the display, a volumetric environment including a first plurality of synthesized reality (SR) objects corresponding to a first plurality of data items from among the identified plurality of data items, wherein each of the first plurality of data items includes the first metadata field with a respective one of a plurality of first metadata field values, and wherein each of the first plurality of SR objects includes different graphical indicia representing a corresponding first metadata field value from among the plurality of first metadata field values;

detect a first user input indicative of the second metadata field; and in response to detecting the first user input, replace the first plurality of SR objects within the volumetric environment with a second plurality of SR objects corresponding to a second plurality of data items from among the identified plurality of data items, wherein each of the second plurality of data items includes the second metadata field with a respective one of a plurality of second metadata field values, and wherein each of the second plurality of SR objects includes different graphical indicia representing a corresponding second metadata field value from among the plurality of second metadata field values.

12. The device of claim 11, wherein replacing the first plurality of SR objects within the volumetric environment with the second plurality of SR objects includes displaying an animation in which the plurality of first plurality of SR objects is replaced by a plurality of SR object representations which is rearranged in the volumetric environment and replaced with the second plurality of SR objects.

13. The device of claim 11, wherein the instructions further cause the device to:
select a first one from among a plurality of metadata fields as the first metadata field based on a default metadata field for a type of the identified plurality of data items.

14. The device of claim 11, wherein the instructions further cause the device to:
select a first one from among a plurality of metadata fields as the first metadata field based on a number of data items in the identified plurality of data items.

15. The device of claim 11, wherein the instructions further cause the device to:
select a first one from among a plurality of metadata fields as the first metadata field based on contextual information.

16. A non-transitory computer readable storage medium has stored therein instructions, which, when executed by one or more processors of a device with a display, cause the device to:
identify a plurality of data items, each of the plurality of data items having a first metadata field and a second metadata field different from the first metadata field;
display, on the display, a volumetric environment including a first plurality of synthesized reality (SR) objects corresponding to a first plurality of data items from among the identified plurality of data items, wherein each of the first plurality of data items includes the first metadata field with a respective one of a plurality of first metadata field values, and wherein each of the first plurality of SR objects includes different graphical indicia representing a corresponding first metadata field value from among the plurality of first metadata field values;

detect a first user input indicative of the second metadata field; and in response to detecting the first user input, replace the first plurality of SR objects within the volumetric environment with a second plurality of SR objects corresponding to a second plurality of data items from among the identified plurality of data items, wherein each of the second plurality of data items includes the second metadata field with a respective one of a plurality of second metadata field values, and wherein each of the first plurality of SR objects includes different graphical indicia representing a corresponding first metadata field value from among the plurality of first metadata field values.

17. The non-transitory computer readable storage medium of claim 16, wherein replacing the first plurality of SR objects within the volumetric environment with the second plurality of SR objects includes displaying an animation in which the plurality of first plurality of SR objects is replaced by a plurality of SR object representations which is rearranged in the volumetric environment and replaced with the second plurality of SR objects.

18. The non-transitory computer readable storage medium of claim 16, wherein the instructions further cause the device to:
select a first one from among a plurality of metadata fields as the first metadata field based on a default metadata field for a type of the identified plurality of data items.

19. The non-transitory computer readable storage medium of claim 16, wherein the instructions further cause the device to:
select a first one from among a plurality of metadata fields as the first metadata field based on a number of data items in the identified plurality of data items.

20. The non-transitory computer readable storage medium of claim 16, wherein the instructions further cause the device to:
select a first one from among a plurality of metadata fields as the first metadata field based on contextual information.

21. The non-transitory computer readable storage medium of claim 16, wherein the first and second metadata fields are independent.

22. The device of claim 11, wherein the first and second metadata fields are independent.

23. The method of claim 1, wherein the first and second metadata fields are independent.

* * * * *